US005629394A

United States Patent [19]

Cheradame et al.

[11] Patent Number: 5,629,394
[45] Date of Patent: May 13, 1997

[54] DIRECT SYNTHESIS BY LIVING CATIONIC POLYMERIZATION OF NITROGEN-CONTAINING POLYMERS

[75] Inventors: Herve M. Cheradame, Grignan, France; Frank J. Chen, Edison; Jon E. R. Stanat, Westfield, both of N.J.; Hung A. Nguyen, La Kremlin Bicetre; Behrooz R. Tabar, Paris, both of France

[73] Assignee: Exxon Chemical Patents Inc, Linden, N.J.

[21] Appl. No.: 474,043

[22] Filed: Jun. 7, 1995

Related U.S. Application Data

[62] Division of Ser. No. 992,511, Dec. 17, 1992, Pat. No. 5,444,135.

[51] Int. Cl.⁶ .................... C08F 4/00; C08F 120/06; C08F 130/08; C08F 112/08; C08F 110/10
[52] U.S. Cl. ................. 526/219.2; 526/220; 526/260; 526/267; 526/279; 526/346; 526/348.7
[58] Field of Search ................ 526/219.2, 220, 526/260, 267, 279, 346, 348.7

[56] References Cited

U.S. PATENT DOCUMENTS

| Re. 26,433 | 8/1968 | Le Suer | 252/33.6 |
|---|---|---|---|
| 3,150,088 | 9/1964 | Hunt et al. | 252/32.7 |
| 3,150,089 | 9/1964 | Hunt et al. | 252/33 |
| 3,271,310 | 9/1966 | Le Suer | 252/35 |
| 3,306,908 | 2/1967 | Le Suer | 260/326.3 |
| 3,331,776 | 7/1967 | Krukziener | 252/56 |
| 3,381,022 | 4/1968 | Le Suer | 260/404.8 |
| 3,445,441 | 5/1969 | Rushton | 260/89.5 |
| 3,522,179 | 7/1970 | Le Suer | 252/51.5 |
| 3,542,680 | 11/1970 | Le Suer | 252/57 |
| 3,645,917 | 2/1972 | Vandenberg | 260/2 A |
| 3,684,713 | 8/1972 | Piccelini | 252/47.5 |
| 3,697,428 | 10/1972 | Meinhardt et al. | 252/56 D |
| 3,755,169 | 8/1973 | Adams et al. | 252/35 |
| 3,836,469 | 9/1974 | Miller | 252/40.5 |
| 3,836,470 | 9/1974 | Miller | 252/51.5 A |
| 3,836,471 | 9/1974 | Miller | 252/51.5 A |
| 3,838,050 | 9/1974 | Miller | 252/40.5 |
| 3,838,052 | 9/1974 | Miller | 252/56 R |
| 3,879,308 | 4/1975 | Miller | 252/56 R |
| 3,957,854 | 5/1976 | Miller | 260/482 R |
| 3,957,855 | 5/1976 | Miller | 260/482 R |
| 3,993,609 | 11/1976 | Kamens et al. | 260/2.5 R |
| 4,029,615 | 6/1977 | Kamens et al. | 260/2.5 R |
| 4,102,798 | 7/1978 | Ryer et al. | 252/51.5 A |
| 4,113,639 | 9/1978 | Lonstrup et al. | 252/51.5 A |
| 4,113,804 | 9/1978 | Cotton et al. | 260/897 A |
| 4,116,876 | 9/1978 | Brois et al. | 252/49.6 |
| 4,151,113 | 4/1979 | Thaler | 252/429 R |
| 4,268,450 | 5/1981 | Frankel et al. | 260/349 |
| 4,393,199 | 7/1983 | Manser | 528/406 |
| 4,405,762 | 9/1983 | Earl et al. | 525/410 |
| 4,483,978 | 11/1984 | Manser | 528/406 |
| 4,568,732 | 2/1986 | Kennedy et al. | 526/206 |
| 4,611,037 | 9/1986 | Musch et al. | 526/135 |
| 4,857,217 | 8/1989 | Gutierrez et al. | 252/47 |
| 4,952,739 | 8/1990 | Chen | 585/18 |
| 4,956,107 | 9/1990 | Gutierrez et al. | 252/47 |
| 4,963,275 | 10/1990 | Gutierrez et al. | 252/47 |
| 5,017,299 | 5/1991 | Gutierrez et al. | 252/51.5 R |
| 5,032,653 | 7/1991 | Cheradame et al. | 526/219.2 |
| 5,066,730 | 11/1991 | Kennedy et al. | 525/319 |
| 5,102,566 | 4/1992 | Fetterman, Jr. et al. | 252/32.7 E |
| 5,122,572 | 6/1992 | Kennedy et al. | 525/314 |
| 5,444,135 | 8/1995 | Cheradame et al. | 526/219.2 |

FOREIGN PATENT DOCUMENTS

| 956397 | 10/1974 | Canada . |
|---|---|---|
| 0206756A2 | 12/1986 | European Pat. Off. . |
| 0341012A2 | 11/1989 | European Pat. Off. . |
| 984409 | 2/1965 | United Kingdom . |

OTHER PUBLICATIONS

Kennedy and Ivan, "Designed Polymers by Carbocationic Molecular Engineering", Theory and Practice, Hanser Publishers, Munich, Vienna, New York and Barcelona, Section II.3.4., pp. 39–42, (1992).

M. Miyamoto, M. Sawamoto, T. Higashimura, *Macromolecules*, vol. 17, pp. 265–268 (1984).

Discher, *Modern Inorganic Pharmaceutical Chemistry*, John Wiley & Sons, Inc., N.Y. p. 343 (1964).

Kennedy et al., "Designed Polymers by Carbocationic Macromolecular Engineering": Theory and Practice, Hanser Publishers, 1992, pp. 31 to 35.

Joseph P. Kennedy "Cationic Polymerization of Olefins, A Critical Inventory", pp. 39 to 53, (John Wiley & Sons, 1975).

Billmeyer, Textbook of Polymer Science, Second Edition, pp. 81–84 (1971).

Bastide et al., *Cycloaddition dipolaire 1–3, aux alcynes*, Bulletin De La Societe Chimique De France Nos. 7–8, pp. 2555–2579 (1973).

Bastide et al., Cycloaddition dipolaire–1,3 aux alcynes, Bulletin De La Societe Chimique De France, Nos. 9–10, pp. 2871–2887 (1973).

Kazankov et al., J. Org. Chem. USSR 77,451 (1975).

"Palladium–catalyzed Decomposition of Azides". Bulletin Chemical Society of Japan, 49, pp. 506–509 (1976).

(List continued on next page.)

*Primary Examiner*—Joseph L. Schofer
*Assistant Examiner*—Wu C. Cheng
*Attorney, Agent, or Firm*—Harvey L. Cohen

[57] ABSTRACT

A method is provided for the direct synthesis by living cationic polymerization of novel polymeric materials functionalized with desirable nitrogen-containing functional groups such as terminal azido, cyano, carbonylamino, cyanato, thiocyanato or thiocarbonylamino groups. Polymerization and functionalization occur in a substantially simultaneous manner. All necessary reactants for the functionalization are present when polymerization is initiated. The nitrogen-containing functional group is provided as a part of a molecule having a release moiety which is preferably resonance stabilized or a tertiary alkyl type and which acts to aid the nitrogen-containing species in functioning as a leaving group.

20 Claims, No Drawings

OTHER PUBLICATIONS

"Base Decomposition of Azides Leading to Nitriles". Journal Org. Chem., vol. 44, No. 16, pp. 2951–2952, (1979).
Knudsen et al., *A Convenient One–Step Conversion of Aromatic Nitro Compounds to Phenols*, J. Org. Chem., vol. 39, No. 23, pp. 3343–3346.
"The Reaction of Organic Azides with Carbon Monoxide." J. Am. Chem. Soc. 90, pp. 3295–3296, (1968).
"Addition of Aryl Nitrenes to Olefins". The J.C.S. Chem. Comm., pp. 1160–1161, (1972).
Anderson et al., *Addition of Nitrenes to Acetylene, Antiaromaticity of 1–H Azirines*, Chemical Communications, p. 147 (1969).
Moriarty et al., *The Direct and Photosensitized Decomposition of Alkyl Azides*, Tetrahedron, 26 pp. 1379–1392, (1970).
*Photodecomposition of Alykl Azides*, J. Am. Chem. Soc. 93, pp. 1537–1538, (1971).
Lwowski, *Nitrenes*, Wiley–Interscience, p. 112.
Lansbury, "Nitrenium Cations", in Lwowski, *Nitrens*, Wiley–Interscience, pp. 405–419.
*Facile Reaction of Dialkylchloroboranes with Organic Azides*, The J. Am. Chem. Soc. 94, pp. 2114–2115, (1973).
*Facile Reaction of Alkyl–and Aryldichloroboranes with Organic Acids*, The J. Am. Chem. Soc. 95, pp. 2394–2396, (1973).
Morton, *Rubber Technology*, Second Edition, Chapter 17, pp. 440–458, van Nostrand Reinhold Co., (1973).
Chemical Abstracts, vol. 117, No. 1, 13 Jul. 1992, Columbus, Ohio, U.S.; Abstract No. 8706q, Kuznetsova, M. B. "Manufacture of Polyisobutylene in Presence of Chain–Transfer Agents" p. 15.

DIRECT SYNTHESIS BY LIVING CATIONIC POLYMERIZATION OF NITROGEN-CONTAINING POLYMERS

This is a continuation of application Ser. No. 992,511, filed Dec. 17, 1992, U.S. Pat. No. 5,444,135.

BACKGROUND OF THE INVENTION

1. Field of the Invention

This invention relates to a method for direct synthesis, by living cationic polymerization, of nitrogen-containing polymers, and particularly to the production of nitrogen-containing polymeric materials in a single step Friedel-Crafts polymerization of olefinic materials containing substantial amounts of isobutylene.

2. Description of Related Art

A review of carbocationic macromolecular engineering is provided in Kennedy and Ivan, *Designed Polymers by Carbocationic Molecular Engineering: Theory and Practice*, Hanser Publishers, Munich, Vienna, New York and Barcelona, Section II.3.4 which relates to mechanistic considerations: a comprehensive view of living carbocationic polymerization and the spectrum of ionicities of active species. At page 32, living polymerizations are defined as ideal living polymerization in which charge transfer and termination are absent, and quasi-living polymerizations are defined as having rapidly reversible charge transfer and/or termination present wherein the rate of these processes is faster than that of propagation. In either case the living behavior of the polymer results in a polymer in which charge transfer and termination are absent. For the purpose of the present invention, living polymers are therefore defined as polymers which have substantially and preferably no apparent chain transfer and termination. Resulting polymers have low polydispersity indices also known as molecular weight distributions of preferably less than 1.5 and in the range of 1.5 to the ideal value of 1, one (1) being where all of the molecular chains are of the same length. Cationic living polymerization systems are disclosed to take place by the polymerization reaction of monomers in the presence of a cationic initiator. A living polymerization system is one wherein the molar ratio of the monomer to initiator is equal to the degree of polymerization. The calculated molecular weight, therefore, equals the degree of polymerization times the molecular weight of the monomer plus the molecular weight of the initiator. In a living system the measured number average molecular weight should be ideally equal to the calculated molecular weight, again evidencing the absence of true termination of the polymerization system. Further detail is described in the Kennedy reference, hereby incorporated by reference.

U.S. Pat. Nos. 5,066,730 and 5,122,572 are directed to living catalysts, complexes and polymers therefrom. There are disclosed living polymers derived from isobutylene using Lewis acid catalysts and initiating systems based on organic acids or esters. The preferred Lewis acid catalyst is boron trichloride.

An early description of living polymerization using isobutyl vinyl ether was disclosed in M. Miyamoto, M. Sawamoto, T. Higashimura, *Macromolecules*, 17, 265 (1984).

It has been disclosed that there is an improvement in a chemical process following a "living behavior", that the polydispersity index of the polymeric products is reasonably low, lower than 1.5 in many examples, while the terminal function is still a tertiary chloride. This is the case of European Patent No. 341,012 which relates to the production of uniform molecular weight polymers. This process involves a monomer, a solvent, an initiator component having an acetate, an etherate, a hydroxyl group or a halogen function of a benzylic type initiator, a Lewis acid and an electron donor component having an electron donor number of from 25 to 50.

Chain end functionalization may result from transfer reactions such as those described in U.S. Pat. No. 4,568,732 which relates to a continuous process for forming telechelic halogenated polymers wherein a cationically polymerizable monomer and an inifer (initiator-transfer agent) are contacted with a boron chloride solvent solution. Disclosed monomers are olefins of from 4 to 12 carbon atoms, e.g. isobutylene. Suitable inifers are halogenated aromatic or aliphatic hydrocarbons, vinyl halides, silane-substituted hydrocarbyl halides, dicyclopentadienyl halides, alpha-chlorostyrene homopolymers, and 2-chloro-propene homopolymers and copolymers, wherein the halide is F, Cl or Sr. In this patent, the polydispersity index of the polymer was not particularly low, and the terminal function was a tertiary chloride which necessitates subsequent chemical steps in order to obtain the desired nitrogen-containing function.

Polymers, particularly polyolefin substrates, having nitrogen-containing functional groups such as the azide, cyano, carbonylamino or thiocarbonylamino groups are useful since the functional group is polar, and imparts desirable properties to a polyolefinic substrate. Also, these groups may act as a reactive site for further modification of the polymer. Nitrogen-containing polyisobutylenes have applications such as lube additives, compatibilizers, emulsifiers, and the like. For example, azide terminal polymers may be further modified by phthalamidation or reduction of the azide group and thus result in polymer products with useful modifications. For instance, reduction of the azide group of polyisobutylenes and addition of a polar moiety to the alpha nitrogen atom may result in improved polymeric compatibilizers, emulsifiers, etc.

Prior art processes for synthesis of polymers having nitrogen-containing functional groups, such as nitrogen-containing polyisobutylene, involve several reaction steps. Chain end functionalization is known in the field of cationic polymerization.

The art further discloses that it could be possible to achieve direct functionalization by cationic polymerization of polymers end-capped by nitrogen containing functions using, for instance, an initiator having a pseudohalogen function of the benzylic type. Pseudohalogen or halogenoids include inorganic anions, e.g., $CN^-$, $CNO^-$, $CNS^-$ and $N_3$ which have properties resembling those of halide ions as disclosed in Discher, *Modern Inorganic Pharmaceutical Chemistry*, John Wiley & Sons, Inc., N.Y., p. 343 (1964). In a single chemical process a polymer is derived from the monomer, using an initiator having nitrogen-containing function such as azide, cyano, carbonylamino or thiocarbonylamino group. These types of results are referred to in U.S. Pat. No. 5,032,653. However, the polymeric products were not disclosed to have a narrow molecular distribution (i.e., monodispersed type). The molecular weight was controlled by the monomer feed rate and the amount of Lewis acid catalyst as well as the monomer to initiator ratio. The amount of initiator was based on a Lewis acid to initiator mole ratio of 3:1 to 1:3 with enhanced results as the ratio approaches 1:1. The molecular weight distribution (MWD) are controlled based on monomer feed rate and product removal rate.

There are three different desirable goals for the synthesis of polymers by cationic polymerization. The first is specific functionalization of the chain ends by a nitrogen-containing function, using direct synthesis from the monomer and the initiator which is incorporated in the resulting polymer. The second is easy control of the molecular weight by adjustment of the monomer to initiator ratios and low polydispersity index, (low MWD). Thirdly, it is a goal to control molecular weight and MWD in the absence of additive directed to molecular weight control.

The above references do not disclose the possibility of obtaining more than two of the above goals. For instance, U.S. Pat. No. 4,568,732 does not offer any of the three above advantages, European Patent No. 341,012 discloses a solution of only the second goal, while U.S. Pat. No. 5,032,653 combines only goals Nos. 1 and 3.

Other references of interest include U.S. Pat. No. 4,611,037 which relates to a process for preparing polymers having reactive halogen end groups employing cationically polymerizable monomers and a catalyst system consisting of a metal halide and an organic halide, wherein the metal halide is used in from 2 to 500 times molar excess, based on the organic halide.

Chain end functionalization may also be accomplished by termination reactions wherein a functional group is imparted to the electrophilic site of a developing polymer. Such systems entail high manufacturing costs and expend considerable process control resources due to the need to keep the electrophilic site available.

U.S. Pat. No. 3,684,713 relates to lubricating oil and fuel compositions containing oil-soluble azo compounds prepared by reacting an oil-soluble, synthetic organic polymer having at least 20 carbon atoms with an azo compound (e.g., azo esters, azo amides such as azodiformates and azodiformamides) at temperatures of from 20° C. to 200° C. oil-soluble polymers are disclosed to include polybutenes, and copolymers of isobutylene/styrene and isobutylene/1-decene.

U.S. Pat. No. 4,393,199 discloses a cationic polymerization method to produce low molecular weight polymers wherein cyclic ethers (e.g., bis(azidomethyl)oxetane-3) are polymerized in the presence of a diol/cationic catalyst for molecular weight control.

U.S. Pat. No. 4,483,978 relates to energetic copolymers by copolymerization of azido monomers (e.g., bis (azidomethyl)oxetane), wherein the $N_3$ azido group is bonded directly to a ring carbon atom, with a cyclic oxide.

U.S. Pat. Nos. 3,993,609 and 4,029,615 relate to polymeric cellular structures obtained by mixing an acid sensitive azo compound with an acidulous or acidic polymerizable medium, such as unsaturated polyesters and polymeric active resins containing one or more terminal and/or pendant functional groups that undergo free radical reaction.

U.S. Pat. Nos. 3,645,917, 4,268,450 and 4,405,762 relate to polymers having pendant alkylazide side groups prepared by reaction of a polymer with a metal azide. In U.S. Pat. No. 3,645,917, a polyether polymer is prepared from epichlorohydrin, and then reacted with a metal azide (e.g., sodium azide) at 20° C. to 150° C. to form azidomethyl groups pendant from the main polyether polymer backbone. Polyether and polyester polymers are disclosed in U.S. Pat. No. 4,268,450 to be reacted with sodium azide at 100° C. to form energetic hydroxy-terminated azido polymers having pendant alkyl azide groups. In U.S. Pat. No. 4,405,762, 3,3-bischloromethyloxetane is polymerized to yield halomethyl polymer products having hydroxy functionality which are then reacted with metal azide to form poly(azidomethyl oxetanes), which are disclosed to be useful as energenic binders for (e.g.) explosives.

U.S. Pat. No. 4,113,804 discloses compositions comprising polybutene, EPDM and polyolefin which are cross-linked by use of chemical free-radical generators or cross-linking agents which are disclosed to include azido formates (e.g., tetramethylenebis(azido formate)), aromatic polyamides (e.g., 4,4'-diphenylmethane diazide) and sulfonazides (e.g., p,p'-oxybis-(benzene sulfonyl azide).

European Patent Application 206,756 relates to olefin polymers such as polyisobutylene, polystyrene, polyoctene and polypropylene which are polymerized in the presence of a preformed catalyst complex of an organic acid or its ester and a Lewis acid, preferably boron trichloride. It is disclosed that the polymerization is believed to occur, e.g. in use of a catalyst complex of an ester and boron trichloride, by the opening of the ester bond and monomer insertion. The organic acids are disclosed to be mono-, di- and tricarboxylic acids and acids containing chloride, formate, allylic, acrylic or methacrylic.

SUMMARY OF THE INVENTION

The present invention relates to a direct synthesis of nitrogen-containing polymeric materials by a process wherein all reactants and catalysts are present at the initiation of polymerization. The polymer is terminally substituted by the nitrogen-containing functional groups.

Accordingly, the present invention relates to a method for direct synthesis by living cationic polymerization of polymeric materials which comprises providing a cationically polymerizable monomer, and initiating polymerization in the presence of a suitable cationic polymerization catalyst and an initiator. The initiator is a pseudohalogen, preferably a nitrogen-containing initiator compound which includes a nitrogen-containing functional group. The nitrogen-containing functional group is preferably chemically bound to a release moiety. The ratio of moles of the nitrogen-containing functional groups to catalyst is less than 1:3.

The present invention includes preferred initiator bis(1-azido-1-methylethyl)benzene and the method to prepare such preferred initiator.

As the polymerization reaction proceeds, the nitrogen-containing functional group may be released from the nitrogen-containing initiator compound to bind the electrophilic site of the developing polymer and become a covalently bound nitrogen-containing functional group of the polymer. When the nitrogen-containing functional group separates from the nitrogen-containing initiator compound, it leaves behind a release moiety which is preferably a resonance stabilized structure capable of delocalizing charge, thus aiding the departure of the nitrogen-containing functional group. This activity may be further aided if, as in other preferred embodiments, the nitrogen-containing functional group is bound to a secondary or tertiary carbon atom of the release moiety.

Preferred nitrogen-containing initiators include hydrocarbyl compounds and silyl compounds, substituted with at least one nitrogen-containing group comprising azido (—$N_3$), cyano also referred to as nitrile (—CN), isocyanato (carbonylamino) (—NCO), thiocarbonylamino (isothiocyanato) (—NCS), cyanato (—OCN), and thiocyanato (—SCN).

In certain preferred embodiments of the invention, polymerization is catalyzed by a Friedel-Crafts catalyst which is contacted under polymerization conditions with a mixture of the nitrogen-containing initiator with a suitable polymerizable monomer. The nitrogen-containing initiator and monomer are preferably admixed in the substantial absence of the Friedel-Crafts catalyst.

The process of the present invention is a "living polymerization" as defined. The living polymer is achieved by polymerizing the monomer with a catalyst to initiator ratio of greater than about 3:1, preferably greater than about 3:1:1, and more preferably greater than 4:1. Particularly useful ranges are greater than 6:1 and specifically greater than 6:1:1 with a most useful range of from 3:1:1 to 30:1, and more specifically 4:1 to 30:1 and 6:1 to 20:1. This results in a polymer with a narrow molecular weight distribution (MWD) ($\overline{M}w/\overline{M}n$) also referred to as a low dispersity, preferably less than 1.5, more preferably less than 1.4, and typically ranging from 1.2 to 1.3. This is obtained directly from polymerization without resort to additional steps to separate polymers at different molecular weights. The polymer made by the claimed process has as a terminal group the nitrogen-containing functional group. The molecular weight can be varied and can range from 300 or lower to 15,000,000 or higher with a specific range of from 300 to 15,000,000 and preferred ranges depending upon use.

The nitrogen containing end groups can be reacted to form a desired functional terminal group including amines to prepare new telechelic oligomers. Uses include lubricant dispersants, viscosity improvers, synthetic lubricating oils, and thermoplastic elastomers.

Where the initiator has more than one functional group, i.e., the polymer can have the plurality of arms ranging from 2 to 10 or more. This type of polymer is considered a "star polymer". The advantage is that each arm is substantially equal in length due to the low MWD.

An advantage of the polymerization method of the present invention is that the functionalization is obtained directly from the mixture of monomer, initiator, Lewis acid and solvent without the need of other functionalization effecting compounds such as electron donor type compounds disclosed in the art. The resulting polymer is characterized by the advantages of a high specificity of functionalization combined with a narrower molecular weight distribution. Additionally, the method of the present invention enables easy control over the desirable molecular weight by adjusting the initial monomer to initiator a concentration ratio without the need of an electron donor.

The present invention includes a polymer composition having the formula:

$$R((M)_p(Y))_n$$

R is selected from at least one group consisting of H, a hydrocarbyl group, and a hydrocarbyl-substituted silyl group. R can be alkyl, aryl, alkylaryl and arylalkyl. Y is selected from at least one group consisting of an azido, cyano, carbonylamino, thiocarbonylamino, cyanato and thiocyanato. A preferred Y is an azido group. L and M is at least one repeat unit derived from a cationically polymerizable monomer. Useful monomers include straight and branched chain alpha olefins, isoolefins, alicyclic monoolefins, cycloaliphatic compounds, styrene derivatives, indene and derivatives thereof, and other monoolefins and heterocyclic monomers. "p" is an integer greater than 1 and preferably sufficient to attain a desired molecular weight. "n" is an integer of at least 1, preferably 1 to 10 and most preferably 1 to 2.

DETAILED DESCRIPTION OF CERTAIN PREFERRED EMBODIMENTS

The following description is directed to preferred embodiments of the living polymer, method of preparation, functional reaction products, uses and related methods. As will be illustrated from the preferred embodiment, the present invention provides a way to obtain, at the same time, complete functionalization of the polymer by a monofunctional pseudohalogen or halogenoid initiator by direct synthesis using living cationic polymerization. When using a monofunctional initiator, the polymer product has a functionality of up to about 1, and preferably about 1. When using a bifunctional initiator, the polymer product has a functionality of up to about 2, and preferably about 2. The polymer has a narrow molecular weight distribution (MWD) or a low polydispersity index measured as weight average molecular weight divided by number average molecular weight. The MWD should ideally be 1.0, preferably less than 1.5, preferably from about 1.0 up to about 1.5, more preferably about 1.0 to about 1.4, with preferred values typically at about 1.1 to about 1.4.

Preferred polymers produced in accordance with the method of the present invention are telechelic polymers. The functional groups are derived from the initiator with at least one functional group preferably containing nitrogen. In the living polymerization process using an initiator having one functional nitrogen-containing group, the functionality of the polymer is close to the theoretical 1, and typically greater than 0.7. Where the initiator contains more than one pseudohalide function the functionality would be expected to be close to a multiple of the number of functional groups. For example, an initiator containing two pseudohalide functional groups would be expected to have a functionality of greater than 1.4 and preferably close to 2.

The foregoing and other aspects of the invention are provided by a process for producing polymers characterized in a living cationic polymerization. The process comprises polymerization of a monomer in the presence of an initiator and a catalyst, preferably in a solvent under conditions which result in a living polymerization.

Nitrogen-Containing Initiator

The nitrogen-containing compound employed as initiator in this invention can comprise at least one member selected from the group consisting of (i) compounds of the formula:

$$R(Y)_n \qquad (Ia)$$

wherein R is hydrogen or a hydrocarbyl group, n is a positive integer, preferably an integer of from 1 to 10, more preferably 1 or 2 and Y is —$N_3$, —CN, —NCO, —OC≡N; —SC≡N; or —NCS; and (ii) compounds of the formula:

$$R^*(Y)_n \qquad (Ib)$$

wherein n and Y are as defined above, and R* comprises a hydrocarbyl-substituted silyl group of the formula:

$$\begin{array}{c} R \\ | \\ R-Si- \\ | \\ R \end{array} \qquad (Ic)$$

wherein each R is the same or different and is hydrocarbyl.

Exemplary of R groups are alkyl of from 3 to 100 carbon atoms, preferably 4 to 20 carbon atoms, aryl of from 6 to 20 carbon atoms, preferably from 6 to 15 carbon atoms, alkaryl and aralkyl of from 7 to 100 carbon atoms (e.g., 7 to 20 carbon atoms), and cycloaliphatic of from 3 to 20 carbon atoms, preferably from 3 to 12 carbon atoms. When n is 1, R in Formula (Ia) generally comprises an alkyl group of from 3 to 12 carbon atoms, preferably from 3 to 20 carbon atoms, such as propyl, butyl, pentyl, octyl, decyl, dodecyl, and the like, and can be a polymeric group.

Most preferably R in Formula (Ia) comprises a moiety of the formula:

 (IIa)

wherein $R^1$, $R^2$ and $R^3$ are the same or different and are H or hydrocarbyl (e.g., alkyl, aryl, alkaryl, aralkyl, heterocyclic or cycloalkyl) with the proviso that at least two of $R^1$, $R^2$, and $R^3$ are hydrocarbyl Most preferably all of $R^1$, $R^2$ and $R^3$ are hydrocarbyl Exemplary of such secondary and tertiary alkyl groups are isopropyl, tert-butyl, 1-methylpropyl, 1-ethylbutyl, 1,2-dimethylbutyl, and the like. Exemplary of such alkaryl $R^1$, $R^2$ or $R^3$ groups are $\phi CH_2$—, $CH_3\phi CH_2$—, —$\phi C_2H_5$ and the like. Exemplary of such $R^1$, $R^2$ or $R^3$ groups are $CH_3\phi$, $(CH_3)_2\phi$— and the like.

It will be understood that the hydrocarbyl-substituted nitrogen-containing initiators of Formula (Ia) can comprise a polymer, for example, a polyalkene, such as a $C_2$ to $C_{10}$ monoolefin homopolymer or a copolymer (e.g., polyisobutylene, ethylene-propylene copolymer), polydiene, such as hydrogenated or nonhydrogenated polyisoprene, polybutadiene and isoprene-butadiene, and aromatic-containing polymers (e.g., styrene-isoprene, styrene-butadiene, methyl-styrene-isoprene-butadiene polymers), ethylene-propylene-conjugated diene terpolymer having one or more Y-functional groups which can be added by grafting.

Illustrative of hydrocarbyl compounds of Formula I(a) monosubstituted with azido (—$N_3$), cyano (—CN), carbonylamino (—NCO), thiocarbonylamino (—NCS), cyanato (—OCN), thiocyanato (—SCN) and groups are hydrazoic acid, HCN, HCNO, HCNS, ethylazide, tert-butylazide, isobutylazide, propylazide, isopropylazide, 2-ethylhexylazide, hexylazide, 1,1-diethylheptylazide, benzylazide, phenylazide, tolylazide, xylylazide, cumylazide, cyclohexylazide, carbonylaminoethane, carbonylaminopropane, 1-carbonylamino-1,1,1-trimethylmethane, 2-carbonylaminobutane, 2-carbonylamino-propane, 3-carbonylamino-2-methylheptane, 3-carbonylamino-3-ethylnonane, 1-carbonylamino-1-phenylmethane, 1-carbonylamino-1-tolylmethane, 1-carbonylamino-1,1-dimethyl-1-phenylmethane, 1-carbonylamino-1-methyl-2-phenylethane, carbonylaminocyclohexane, thiocarbonylaminoethane, thiocarbonylaminopropane, 1-thiocarbonyl-amino-1,1,1-trimethylmethane, 2-thiocarbonylaminobutane, 2-thiocarbonylaminopropane, 3-thiocarbonylaminomethylheptane, 3-thiocarbonylamino-3-ethylnonane, 1-thiocarbonylamino-1-phenyl-methane, 1-thiocarbonylamino-1-tolyl-methane, 1-thiocarbonylamino-1,1-dimethyl-1-phenyl-methane, 1-thiocarbonylamino-1-methyl-2-phenylethane, thiocarbonylaminocyclohexane, cyanoethane, cyanopropane, 1-cyano-1,1,1-trimethylmethane, 2-cyanobutane, 2-cyanopropane, 3-cyanomethylheptane, 3-cyano-3-ethyl-nonane, 1-cyano-1-phenylmethane, 1-cyano-1-tolyl-methane, 1-cyano-1,1-dimethyl-1-phenylmethane, 1-cyano-1,1-methyl-2-phenylethane, cyanocyclohexane, cyanatoethane, cyanatopropane, 1-cyanato-1,1,1-trimethylmethane, 2-cyanato-butane, 2-cyanatopropane, 3-cyanatomethyl-heptane, 3-cyanato-3-ethyl-nonane, 1 -cyanato-1-phenyl-methane, 1-cyanato-1-tolyl-methane, 1-cyanato- 1,1-dimethyl-1-phenylmethane, 1-cyanato-1-methyl-2-phenylethane, cyanatocyclohexane, thiocyanatoethane, thiocyanatopropane, 1-thiocyanato-1,1, 1-trimethylmethane, 2-thiocyanato-butane, 2-thiocyanato-propane, 3-thiocyanatomethyl-heptane, 3-thiocyanato-3-ethyl-nonane, 1-thiocyanato-1-phenyl-methane, 1-thiocyanato-1-tolyl-methane, 1-thiocyanato-1,1-dimethyl-1-phenyl-methane, 1-thiocyanato-1-methyl-2-phenylethane, thio-cyanatocyclohexane, isothiocyanatoethane, isothiocyanatopropane, 1-isothiocyanato-1,1,1-trimethyl-methane, 2-isothiocyanatobutane, 2-isothiocyanato-propane, 3-isothiocyanatomethylheptane, 3-isothiocyanato-3-ethyl-nonane, 1-isothiocyanato-1-phenyl-methane, 1-isothiocyanato-1-tolyl-methane, 1-isothiocyanato-1,1-dimethyl-1-phenyl-methane, 1-isothiocyanato-1- methyl-2-phenylethane, isothiocyanato-cyclohexane, and the like.

The carbonylamino (—NCO) and thiocarbonylamino (—NCS) substituted compounds are isocyanates and isothiocyanates, respectively.

Illustrative of the silyl compounds of Formula I(b) are azidotrimethylsilane, azidotriethylsilane, azidoethyldimethylsilane, azidotriphenylsilane, azidomethyldiethylsilane, azidoethyldiphenylsilane, azidotrioctylsilane, azidotricumylsilane, cyanotrimethylsilane, cyanotriethylsilane, cyanoethyldimethylsilane, cyanotriphenylsilane, cyanomethyldiethylsilane, cyanoethyldiphenylsilane, cyanotrioctylsilane, cyanotricumylsilane, carbonylaminotrimethylsilane, carbonylaminotriethylsilane, carbonylaminoethyldimethylsilane, carbonylaminotriphenylsilane, carbonylaminomethyldiethylsilane, carbonylaminoethyldiphenylsilane, carbonylaminotrioctylsilane, carbonylaminotricumylsilane, thiocarbonylaminotrimethylsilane, thiocarbonylaminotriethylsilane, thiocarbonylaminoethyldimethylsilane, thiocarbonylaminotriphenylsilane, thiocarbonylaminomethyldiethylsilane, thiocarbonylaminoethyldiphenylsilane, thiocarbonylaminotrioctylsilane, thiocarbonylaminotricumylsilane, cyanatotrimethylsilane, cyanatotriethylsilane, cyanatoethyldimethylsilane, cyanatotriphenylsilane, cyanatomethyldiethylsilane, cyanatoethyldiphenylsilane, cyanatotrioctyisilane, cyanatotricumylsilane, thiocyanatotrimethyisilane, thiocyanatotriethylsilane, thiocyanatoethyldimethylsilane, thiocyanatotriphenylsilane, thiocyanatomethyldiethylsilane, thiocyanatoethyldiphenylsilane, thiocyanatotrioctylsilane, thiocyanatotricumylsilane, isothiocyanatotrimethylsilane, isothiocyanatotriethylsilane, isothiocyanatoethyldimethylsilane, isothiocyanatotriphenylsilane, isothiocyanatomethyldiethylsilane, isothiocyanatoethyldiphenylsilane, isothiocyanatotrioctylsilane, isothiocyanatctricumylsilane, and the like.

Useful as nitrogen-containing initiators include disubstituted compounds of the formula:

$$Y-Z-Y \qquad (III)$$

wherein Y is as defined above, and Z comprises a

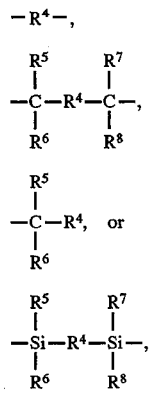

group wherein $R^5$, $R^6$, $R^7$ and $R^8$ are the same or different and comprise H or hydrocarbyl, e.g., alkyl of from 1 to 100 carbon atoms (e.g., methyl, ethyl, isopropyl, butyl and the like), cycloalkyl of from 3 to 10 carbon atoms (e.g., cyclohexyl, cyclobutyl and the like), aryl of from 6 to 20 carbon atoms (e.g., phenyl, naphthyl and the like), or aralkyl and alkaryl of from 7 to 20 carbon atoms (e.g., tolyl, cresyl, xylyl, benzyl, ethylbenzyl and the like), and $R^4$ comprises —$(CH_2)_a$—, or —Ar—, wherein a is an integer of from 3 to 20, and preferably 3 to 10, and wherein Ar is an arylene group of from 6 to 20 carbon atoms, or aryl-substituted arylene, e.g., $C_1$ to $C_{20}$ (preferably $C_1$ to $C_{10}$) alkyl mono- or disubstituted arylene group of from 7 to 40 carbon atoms (e.g., phenylene, naphthylene, mono- or dialkyl substituted derivatives of the foregoing, and the like).

Illustrative of compounds of Formula III disubstituted with the above groups (i), (ii) and (iii) are 2,4-bis(azido)-2,4-dimethylpentane, bis(azido)-methane, 1,2-bis(azido)-ethane, 1,3-bisazido-propane, 2,2-bis(azido)-propane, 2,3-bis(azido)-2,3-dimethyl-butane, 1,5-bis(azido)-pentane, 2,6-bis(azido)-heptane, 2,6-bis(azido)-2,6-dimethylheptane, bis(azido)benzene, bis(azidomethyl)benzene, bis(azidoethyl)benzene, bis(1-azidoethyl)benzene, bis-(1-azido-1-methylethyl)benzene, bis(2-azidopropyl) benzene, bis(azidomethyl)toluene, bis(azidomethyl) xylene, bis(1-azidoethyl)toluene, bis(1-azidoethyl)xylene, bis(1-azido-1-methylethyl)toluene, bis(1-azido-1-methylethyl)xylene, bis(azidophenyl) methane, bis(azido-ethylphenyl)methane, bis(azidomethylphenyl)methane, 2,2-bis(azidomethylphenyl) propane, bis(1-azido-1-methylethylphenyl)methane, 2,4-bis(cyano)-2,4-dimethylpentane, bis(cyano)-methane, 1,2bis(cyano)ethane, 1,3-bis-cyano-propane, 2,2-bis(cyano)propane, 2,3-bis-(cyano)-2,3-dimethyl-butane, 1,5-bis(cyano)-pentane, 2,6-bis(cyano)-heptane, 2,6-bis(cyano)-2,6-dimethylheptane, bis(cyano)benzene, bis(cyanomethyl)benzene, bis(cyanoethyl)benzene, bis(1-cyanoethyl)benzene, bis-(1-cyano-1-methylethyl)benzene, bis(2-cyanopropyl)benzene, bis(cyanomethyl)toluene, bis(cyanomethyl)xylene, bis(1-cyanoethyl)toluene, bis(1-cyanoethyl)xylene, bis(1-cyano-1-methylethyl)toluene, bis(1-cyano-1-methylethyl)xylene, bis(cyanophenyl) methane, bis(cyano-ethylphenyl) methane, bis(cyano-methylphenyl) methane, 2,2-bis(cyanomethylphenyl) propane, bis(1-cyano-1-methylethylphenyl)methane, 2,4-bis(carbonylamino)-2,4-dimethylpentane, bis(carbonylamino)-methane, 1,2-bis(carbonylamino)-ethane, 1,3-bis(carbonylamino)-propane, 2,2-bis(carbonylamino)-propane, 2,3 -bis(carbonylamino)-2,3-dimethylbutane, 1,5-bis(carbonylamino)-pentane, 2,6-bis(carbonylamino)heptane, 2,6-bis(carbonylamino)-2,6-dimethylheptane, bis(carbonylamino)benzene, bis(carbonylaminomethyl) benzene, bis(carbonylaminoethyl)benzene, bis(1-carbonylaminoethyl)benzene, bis(1-carbonylamino-1-methylethyl) benzene, bis(2-carbonylaminopropyl)benzene, bis(carbonylaminomethyl)toluene, bis(carbonylaminomethyl)xylene, bis (1-carbonylaminoethyl)toluene, bis (1-carbonylaminoethyl)xylene, bis(1-carbonylamino-1-methylethyl)toluene, bis(1-carbonylamino-1-methylethyl)xylene, bis(carbonylaminophenyl)methane, bis(carbonylamino-ethylphenyl) methane, bis(carbonylaminomethylphenyl)methane, 2,2-bis(carbonylaminoethylphenyl) propane, bis(1-carbonylamino-1-methylethylphenyl) methane, 2,4-bis(thiocarbonylamino)-2,4-dimethyl-pentane, bis(thiocarbonylamino)-methane, 1,2 -bis (thiocarbonylamino)-ethane, 1,3 -bis(thiocarbonyl-amino)-propane, 2,2-bis(thiocarbonylamino)-propane, 2,3-bis(thiocarbonylamino)-2,3 -dimethylbutane, 1,5-bis(thiocarbonylamino)-pentane, 2,6-bis(thiocarbonylamino)-heptane, 2,6-bis(thiocarbonylamino)-2,6-dimethylheptane, bis(thiocarbonylamino)benzene, bis(thiocarbonylaminomethyl) benzene, bis(thiocarbonylaminoethyl)benzene, bis(1-thiocarbonylaminoethyl) benzene, bis(1-thiocarbonylamino-1-methylethyl)benzene, bis(2-thiocarbonylaminopropyl)benzene, bis(thiocarbonylaminomethyl)toluene, bis(thiocarbonylaminomethyl)xylene, bis(1-thiocarbonylaminoethyl)toluene, bis(1-thiocarbonylaminoethyl)xylene, bis(1-thiocarbonylamino-1-methylethyl)toluene, bis(1-thiocarbonylamino-1-methylethyl)xylene, bis(thiocarbonylaminophenyl)methane, bis(thiocarbonylaminoethylphenyl) methane, bis(thiocarbonylaminomothylphenyl)methane, 2,2-bis (thiocarbonylaminoethylphenyl)propane, bis(1-thiocarbonylamino-1-methylethyl-phenyl)methane, 2,4-bis(cyanato)-2,4-dimethylpentane, bis(cyanato)-methane, 1,2-bis(cyanato)-ethane, 1,3-biscyanato-propane, 2,2-bis(cyanato)-propane, 3-bis(cyanato)-2,3-dimethylbutane, 1,5-bis(cyanato)-pentane, 2,6-bis(cyanato)-heptane, 2,6-bis(cyanato)-2,6-dimethylheptane, bis(cyanato)benzene, bis(cyanato-methyl)benzene, bis(cyanatoethyl)benzene, bis(1-cyanatoethyl)benzene, bis(1-cyanato-1-methylethyl)benzene, bis(2-cyanatopropyl)benzene, bis(cyanatomethyl)toluene, bis(cyanatomethyl)xylene, bis(1-cyanatoethyl)toluene, bis(1-cyanatoethyl)xylene, bis(1-cyanato-1-methylethyl)toluene, bis(1-cyanato-1-methylethyl)xylene, bis(cyanatophenyl) methane, bis(cyanatoethylphenyl) methane, bis(cyanato-methylphenyl)methane, 2,2-bis(cyanatomethylphenyl) propane, bis(1-cyanato-1-methylethylphenyl)methane, 2,4-bis(thiocyanato)-2,4-dimethylpentane, bis(thio-cyanato)-methane, 1,2-bis(thiocyanato)-ethane, 1,3-bisthiocyanato-propane, 2,2-bis(thiocyanato)-propane, 2,3-bis(thiocyanato) -2,3-dimethylbutane, 1,5-bis(thiocyanato)-pentane, 2,6-bis(thiocyanato)-heptane, 2,6-bis(thiocyanato)--2,6dimethylheptane, bis(thiocyanato) benzene, bis(thiocyanatomethyl)benzene, bis(thiocyanatoethyl)benzene, bis(1-thiocyanato-ethyl)benzene, bis(1-thiocyanato-1-methylethyl)benzene, bis(2-thiocyanatopropyl)benzene, bis(thiocyanatomethyl)toluene, bis(thiocyanatomethyl)xylene, bis(1-thiocyanatoethyl)toluene, bis(1-thiocyanatoethyl) xylene, bis(1-thiocyanato-1-methylethyl) toluene, bis(1-thiocyanato-1-methylethyl) xylene, bis(thiocyanatophenyl) methane, bis(thiocyanatoethylphenyl)methane, bis (thiocyanatomethylphenyl)methane, 2,2-bis (thiocyanatomethylphenyl) propane, bis(1-thiocyanato-1-methylethylphenyl)methane, 2,4 -bis(isothiocyanato)-2,4-dimethylpentane, bis(isothiocyanato)methane, 1,2-bis(isothiocyanato)-ethane, 1,3-bisisothiocyanato-propane, 2,2-bis(isothiocyanato)propane, 2,3-bis(isothiocyanato)-2,3-dimethylbutane, 1,5-bis(isothiocyanato)-pentane, 2,6-bis(isothiocyanato)heptane, 2,6-bis(isothiocyanato)-2,6-dimethylheptane, bis(isothiocyanato)benzene, bis(isothiocyanatomethyl)benzene, bis(isothiocyanatoethyl)benzene, bis(1-isothiocyanatoethyl)benzene, bis(1-isothiocyanato-1-methylethyl)benzene, bis(2-isothiocyanato-propyl)benzene, bis(isothiocyanatomethyl)toluene, bis(isothiocyanatomethyl)xylene, bis(1-isothiocyanatoethyl)toluene, bis(1-isothiocyanatoethyl)xylene, bis(1-isothiocyanato-1-methylethyl)toluene, bis(1-isothiocyanato-1-methylethyl) xylene, bis(isothiocyanatophenyl)methane, bis(isothiocyanatoethylphenyl)methane, bis(isothiocyanatomethylphenyl) methane, 2,2-bis(isothiocyanatomethylphenyl) propane, and the like.

Illustrative of the compounds of Formula III disubstituted with the groups (iv) are bis(1-isothiocyanato-1-methylethylphenyl)methane, bis(azidodimethylsilyl) methane, bis/azidodiethylsilyl) methane, 1,1-bis (azidodimethylsilyl) ethane, 1,2-bis azidodimethylsilyl) ethane, bis/azidoethyldimethyl-silyl) phenylmethane, 1,1-bis(azidodiethylmethylsilyl) -2-phenyl-ethane, bis (cyanodimethylsilyl ) methane, bis/cyanodi-ethylsilyl) methane, 1,1-bis(cyanodimethylsilyl) ethane, 1,2 -bis (cyanodimethylsilyl) ethane, bis/cyanoethyldimethylsilyl) phenylmethane, 1,1-bis(cyanodiethylmethylsilyl)-2-phenylethane, bis(carbonylaminodimethylsilyl)methane, bis/carbonyl-aminodiethylsilyl)methane, 1,1-bis(carbonyl-amino-dimethylsilyl)ethane, 1,2-bis (carbonylamino-dimethyl-silyl)ethane, bis/carbonylaminoethyldimethylsilyl)phenyl-methane, 1,1-bis(carbonylaminodiethylmethylsilyl)-2-phenylethane, bis(thiocarbonylaminodimethylsilyl) methane, bis/thiocarbonylaminodiethylsilyl) methane, 1,1-bis(thiocarbonylaminodimethylsilyl) ethane, 1,2-bis (thiocarbonylaminodimethylsilyl) ethane, bis/thiocarbonylaminoethyldimethylsilyl) phenylmethane, 1,1-bis(thiocarbonylaminodiethylmethylsilyl)-2-phenylethane, bis(cyanatodimethylsilyl) methane, bis/cyanatodiethylsilyl) methane, 1,1-bis(cyanatodimethylsilyl) ethane, 1,2-bis (cyanatodimethylsilyl) ethane, bis/cyanato-ethyldimethylsilyl) phenylmethane, 1,1-bis (cyanatodiethylmethylsilyl)-2-phenylethane, bis (thiocyanatodimethylsilyl)methane, bis/thiocyanatodiethylsilyl)methane, 1,1-bis (thiocyanatodimethylsilyl) ethane, 1,2-bis (thiocyanatodimethylsilyl) ethane, bis/thiocyanatoethyldimethylsilyl) phenylmethane, 1,1-bis (thiocyanatodiethylmethylsilyl)-2-phenylethane, bis (isothiocyanatodimethylsilyl)methane, bis/isothiocyanatodiethylsilyl) methane, 1,1-bis (isothiocyanatodimethylsilyl) ethane, 1,2-bis (isothiocyanatodimethylsilyl) ethane, bis/isothiocyanatoethyldimethylsilyl) phenylmethane, 1,1-bis (isothiocyanatodiethylmethyl-silyl) 2-phenylethane, and the like.

A preferred initiator of the present invention is bis(1-azido-1-methylethyl)benzene having the formula:

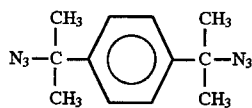

The bis(1-azido-1-methylethyl)benzene can be prepared by reacting dicumyl alcohol with a halogen containing compound to form dicumyl halide. The dicumyl halide is reacted with an azide containing compound to form the bis(1-azido-1-methylethyl)benzene.

The halogen-containing compound is preferably a bromide or chloride and more preferably HCl, and the azide containing compound is preferably NaN$_3$. The reactions can be conducted in the presence of suitable solvents under suitable conditions. The dicumyl alcohol can be reacted with HCl in a polar solvent such as methane dichloride under reflux conditions. The dicumyl chloride can be reacted with sodium azide in a solvent under reflux conditions, preferably with a weak Lewis acid catalyst such as ZnCl$_2$. The following preferred reactions have been successfully conducted:

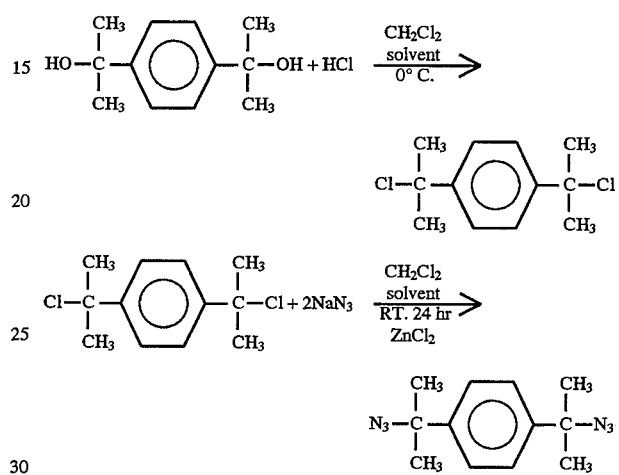

The bis(1-azido-1-methylethyl)benzene is preferred for use as an initiator to make the living polymer, and particularly useful to make linear living polymer.

The method of the instant invention may be illustrated, for instance, by the production of polyisobutylene functionalized with terminal azido, cyano, carbonylamino or thiocarbonylamino groups. In preferred embodiments of the invention, isobutene monomer is provided in a low-boiling, low-freezing alkyl halide solvent. An azido-providing species such as a substituted benzylic type azide such as cumyl azide may be added to the monomer.

Functionalization by the azide, cyano, carbonylamino, cyanato, thiocyanato, isothiocyanato, or thiocarbonylamino group can be obtained during the cationic polymerization of the selected monomer (e.g., isobutylene) in the liquid phase. In order to obtain this result, the azide, cyano, carbonylamino, cyanato, thiocyanato, isothiocyanato, or thiocarbonylamino group is introduced in the form of a suitably designed molecule including a release moiety enabling the Y- group to migrate to the electrophilic site of a growing polymer chain.

Without being bound, it is believed that the polymerization in accordance with the process of the present invention is a living cationic polymerization. The criteria for such living polymerization are known in the art and are disclosed for example in Kennedy et al., Designed Polymers by Carbocationic Macromolecular Engineering: Theory and Practice, Hanser Publishers, 1992, pp. 31 to 35. At page 32 it is disclosed that ideal living polymerization is one wherein chain transfer and termination are absent. It is disclosed that in living polymerization the concentration of active propagating sites remains constant during the experiment (reaction) and provided initiation is fast the number average degree of polymerization increases linearly with the amount of monomer consumed. That is, the degree of polymerization is equal to the concentration of monomer consumed and incorporated in the polymer divided by the initiator concentration. If the rate of initiation is equal to or higher than that of propagation, living polymerizations will yield molecular weight distributions very close to unity; i.e., Mw/Mn is about equal to 1. This latter requirement is not disclosed to be part of the rigorous definition of living polymerization. Initiation and propagation can be separated and controlled individually, for example, by first preparing a quantity of active centers and subsequently adding monomer to this seed or by continuously adding monomer to the active centers. The Kennedy reference provides a comprehensive classification of ideal living, as well as quasi-living and non-living cationic polymerization systems.

It is believed that in accordance with the present invention, N-containing initiators having Y- groups, which are mobile in the presence of Friedel-Crafts catalysts, provide functionalization (during polymerization) of the growing polymer chain ends. This is believed to occur by reaction of the electrophilic site with the complex anion containing the Y-constituent. The introduction of the initiator (also herein sometimes termed the "cocatalyst") simultaneously provides an initiation site and a functionalization system enabling the following reaction:

where R is the release moiety of the cocatalyst, N3 is the nitrogen-containing functional group, "Cat." is, for instance, a metal halide catalyst, and m is the degree of polymerization.

The living polymerization in accordance with the process of this invention is believed to proceed by the formation of an ion pair of the selected nitrogen-containing initiator and Lewis acid catalyst, followed by monomer insertion. An alternative mechanism could be insertion of the monomer into a strongly polarized covalent bond, according to the mechanism of pseudocationic polymerization. In the case of monofunctional N-containing initiators of this invention (e.g., $\phi C(CH_3)_2N_3$), the resulting product then theoretically contains functionality at each end. That is, one end of the polymer corresponds to the "R" group of the nitrogen-containing initiator and the other corresponds to the "Y" group of the initiator. This can be illustrated by reference to the following equation:

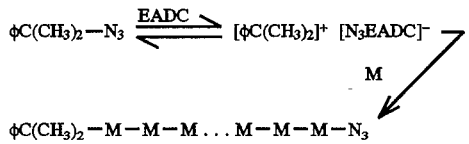

wherein EADC represents ethyl aluminum dichloride and M represents the selected cationically polymerizable monomer.

In the case of a difunctional initiator of this invention e.g., $N_3C(CH_3)_2[phenylene]C(CH_3)_2N_3$, the resulting polymer product will theoretically contain a "Y" functionality at each end of the polymer, and a "R" group within the polymer chain, as illustrated by reference to the following equation:

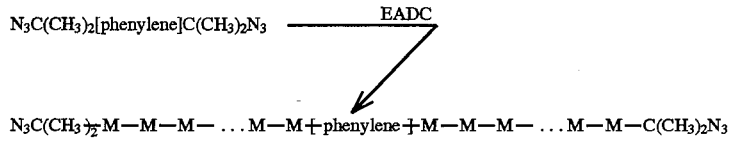

Of course, the $RY_n$ initiator compound, when n>2, is multifunctional and additional branching of the polymer can occur due to polymer growth at multiple sites on the intiators of this invention. In the living polymerization method of the present invention the polyolefin "M—M . . . " branches are ideally all of the same length. The branches emanate from the R group in a star-like structure.

In the above reactions the Y-group (e.g., the —N3, azide group) in the N-containing initiator has sufficient mobility to be transferred to the growing chain end. Preferably, the Lewis Acid selected to catalyze the polymerization is introduced at a concentration corresponding to greater than three times, preferably four and more preferably from four to twenty times, the molar equivalents of the Y functional group, i.e., azide or other N-containing group of this invention, charged to the polymerization zone.

The preferred N-containing initiators employed in this invention are those in which the "Y" group is covalently bound to a secondary or tertiary carbon, and those in which the "R" release moiety is resonance stabilized or otherwise capable of delocalizing charge. Preferably the "R" release moiety is an allylic or benzylic species. As explained above, the initiator can be monofunctional, di- or multifunctional, and can contain more than one of the above Y functional groups, although it is preferred that di- or multifunctional initiators contain only a single such type of "Y" group. The functionality of the polymer product is then equal to one, two or more, accordingly. Preferred initiator molecules include 1-azido-1-methylethyl benzene, and 2-azido-2-phenyl-propane in which the azide group is at the same time tertiary and of the benzylic type, and bis(1-azido-1-methylethyl)benzene. Hydrazoic acid is also useful as the initiator molecule containing an azide group. In the latter case, the proton of the acid is the fragment on which polymerization is initiated (by cocatalysts), and the functionalization is the result of the termination reaction.

Particularly preferred is bis(1-azido-1-methylethyl) benzene, and the compounds derived therefrom where the two azide groups were replaced by any one of the members of the pseudohalide functions, it was possible to obtain the synthesis of end-capped oligomers in an ideal situation, i.e. specific functionalization with nitrogen-containing groups, low polydispersity and predetermined molecular weight, without the help of any substance of the electron donor type, provided that the concentration of the Lewis acid is adjusted to a proper value which is higher than that of the nitrogen containing function.

The catalyst can comprise a Friedel-Crafts catalyst or other Lewis Acid cationic polymerization catalyst. The Friedel-Crafts catalyst can comprise an organometallic compound of the formula:

wherein M' is a metal selected from the group consisting of Ti, Al, Sn, Fe and Zn, $R^9$ is a hydrocarbyl group (preferably a $C_1$ to $C_7$ alkyl group, and most preferably a $C_1$ to $C_4$ alkyl group), T is a halogen or mixture of halogens, preferably chlorine or bromine, and most preferably chlorine, or a group of atoms corresponding to the conjugated base of strong Bronsted acids such as $ClO_4^-$ or $CF_3SO_3^-$, and wherein n' is an integer of from 0 to (v−1) and n" is an integer of from 1, wherein v is the valence of M', with the proviso that (n'+n")<or=v. Preferred are organoaluminum halides, aluminum halides, boron trifluoride, and titanium halides. Most preferred are organoaluminum chlorides. The foregoing organometallic halide compounds are known in the art and can be prepared by conventional means, e.g., by the process described in U.S. Pat. No. 4,151,113 and the references cited therein. Other Lewis Acid catalysts comprise halides (preferably chlorides or bromides) e.g. B and As, such as $BCl_3$, $BF_3$, $AsF_5$, and the mixed halides thereof such as $BClF_2$, and the various "sesqui" derivatives of elements of Group IIIA of the Periodic Table, such as $B_2(C_2H_5)_3(CF_3SO_3)_3$, $Al_2(C_2H_5)_3Cl_3$, and the like. Preferred catalysts are diethylaluminum chloride, ethylaluminum dichloride. The preferred Lewis acids are amongst the relatively "weak" Lewis acids such as diethylaluminum chloride. Stronger Lewis acids, such as boron chloride or titanium tetrachloride, depending on the solvent and monomer used, are useful although not preferred since control of molecular weight and MWD is not as good as with the "weak" Lewis acids. When the Lewis acids are too weak, no polymerization is observed. Most preferred Friedel-Crafts Lewis acid catalysts are organohaluminum halides.

Although insoluble catalysts may be used, the catalyst is preferably soluble in the reaction medium, and the exact concentration of the catalyst depends on the concentration of the molecule containing the "Y" group. Preferably, the Lewis acid catalyst and N-containing initiator are charged to the polymerization zone in moles of Lewis acid to moles of initiator catalyst in a ratio of greater than 3.1 to 1, preferably from 4:1 to 30:1 and more preferably from 5:1 to 20:1. Molecular weight of the product may be controlled by controlling the ratio of the moles of monomer "M" to moles of initiator "T". Molecular weight increases as this latter ratio increases.

Suitable solvents include, but are not limited to, low-boiling alkyl halides, whether they are mono- or polyhalides, the requirement being a reasonably low freezing point to De used at the preferred polymerization temperature. Illustrative solvents include alkanes (generally $C_2$ to $C_{10}$ alkanes, including normal alkanes such as propane, normal butane, normal pentane, normal hexane, normal heptane, normal octane, normal nonane and normal decane, and branched alkanes including isobutane, isopentane, isohexane, 3-methylpentane, 2,2-dimethylbutane, 2,3-dimethylbutane and the like), alkenes and alkenyl halides (such as vinyl chloride), carbon disulfide, chloroform, ethylchloride, N-butyl chloride, methylene chloride, methylchloride, 1,2-dichloroethane, 1,1,2,2-tetrachloroethane, sulfur dioxide, acetic anhydride, carbon tetrachloride, nitroethane, acetonitrile, neopentane, benzene, toluene, methylcyclohexane, chlorobenzene, ethylidene dichloride, propyl dichloride, to name a few of the representative liquid diluents or solvents useful in cationic polymerizations. Mixed solvents can also be used. The preferred solvents are methyl and ethyl chloride, methylene dichloride and propyl chloride, hexane, heptane and purified petroleum ether.

Any cationically polymerizable monomers may be used, including straight and branched chain alpha olefins, isoolefins, alicyclic monoolefins, cycloaliphatic compounds, styrene derivatives, indene and derivatives and other monoolefins and heterocyclic cationically polymerizable monomers identified in Joseph P. Kennedy "Cationic Polymerization of Olefins: A Critical Inventory" pages 39 to 53 (John Wiley & Sons, 1975). Vinyl ethers can also be used.

Exemplary of useful cationic polymerizable monomers are ethylene-cyclopropane, 2-cyclopropylpropylene, 1,1-dicyclo-propylethylene, cyclopentene, methylenecyclopropane, methylenecyclobutane, methylenecyctopentene, ethylene-cyclopentene, 3-methylcyclopentene, 1-methylcyclo-pentene, 3-cyclopentyl-prop-1-ene, cyclohexene, 1-methylcyclohexene, 3-methylcyclohexene, methylenecyclo-hexane, 1-methyl-2-methylenecyclohexane, 1-methyl-3-methylenecyclohexane, ethylenecyclohexane, 3-cyclohexyl-prop-1-ene, methylenecycloheptene, methylenecyclooctene, methylenecyclotridecene, cyclopropane, ethylcyclo-propane, 3-cyclopropylpropane, 2-cyclopropylpropane, 1,1-dimethylcyclopropane, 1,2-dimethylcyclopropane, bicyclo [3.1.0 ]hexane, bicyclo[4.1.0]heptane, bicyclo[5.1.0]octane, bicyclo[6.1.0]nonane, bicyclo[10.1.0]tridecane, 1-methylbicyclo[4.1.0 ]heptane, 2-methyl-bicyclo [4.1.0]heptane, 1-methyl-bicyclo[5.1.0 ]octane, 1-methyl-bicyclo[6.1.0] nonane, spiro[2.2]pentane, spiro [2.4]heptane, spiro[2.5] octane, spirol[2.6]nonane, spiro[2.7]decane, spiro[2.12] pentadecane, bicyclo [6.1.0]non-3-ene, bicyclo[2.2.1]hept-2 -ene, 5-methyl-bicyclo[2.2.1]hept-2 -ene, 2-methylene-bicyclo[2.2.1]heptane, 2-methylene-3,3-bimethyl-bicyclo [2.2.1]heptane, 2-ethylene-bicyclo[2.2.1]heptane, 2 [1-methylethylene]-bicyclo[2.2.1]heptane, 6-methyl-bicyclo[2.2.2]oct-2-ene, styrene, methylstyrene, ethylstyrene, dodecylstyrene, isopropylstyrene, tertiarybutylstyrene, indene, biocyclopentane, 1-methylindene, 2-methylindene, 3-methylindene, 5-methylindene, 6-methylindene, 7-methylindene, 1,1-dimethylindene, 2,3-dimethylindene, 4,7-dimethylindene, and the like. Particularly valuable polymers can be prepared from isoolefins of from 4 to 20 carbon atoms or mixtures thereof to produce homopolymers and copolymers. Examples of such unsaturated hydrocarbons include, but are not restricted isobutylene, 2-methylbutene, 3-methylbutene-1,4-methylpentene-1, and beta-pinene. Other cationically polymerizable monomers which may be employed include heterocyclic monomers such as oxazolines and others known to add onto polarized covalent bonds.

Mixtures of cationically polymerizable monomers can be employed as feedstock to the polymerization zone if desired, e.g., copolymers, terpolymers and higher interpolymers can be prepared by employing a mixture of two, three or more of the above monomers.

Preferred feedstocks to the polymerization zone comprise pure isobutylene and mixed $C_4$ hydrocarbon feedstocks containing isobutylene, such as a $C_4$ cut resulting from the thermal or catalytic cracking operation of, for example, naphtha. Thus, suitable isobutylene feedstocks will typically contain at least 10%, and up to 100% isobutylene, by weight, based on the weight of the feed. In addition to isobutylene, conventional $C_4$ cuts suitable for use as a feedstock which are of industrial importance typically will contain between about 10 and 40% butene-1, between about 10 and 40% butene-2, between about 40 and 60% isobutane, between about 4 and 10% n-butane, and up to about 0.5 butadiene, all percentages being by weight based on the feed weight. Feedstocks containing isobutylene may also contain other non-$C_4$ polymerizable olefin monomers in minor amounts, e.g., typically less than about 25%, preferably less than about 10%, and most preferably less than 5%, such as propadiene, propylene and $C_5$ olefins.

The term "polyisobutene" as employed herein is intended to include not only homopolymers of isobutylene but also copolymers of isobutylene and one or more other $C_4$ polymerizable monomers of conventional $C_4$ cuts as well as non-$C_4$ ethylenically unsaturated olefin monomers containing typically from about 3 to about 6, and preferably from about 3 to about 5 carbon atoms, provided such copolymers contain typically at least 50%, preferably at least 65%, and most preferably at least 80% isobutylene units, by weight, based on the polymer number average molecular weight (Mn). The substantially selective polymerizability of isobutylene under the conditions specified herein ensures the aforedescribed minimum isobutylene content.

Preferably the polymerization medium is substantially free of substances which are capable of initiating the catalysts other than the selected N-containing initiator (or mixtures of initiators) of this invention. Therefore, the polymerization medium preferably should be substantially free of added conventionally employed cationic polymerization initiators or promoters (i.e., cocatalysts) such as water, alcohols, carboxylic acids and acid anhydrides, HF, ethers or mixtures thereof. The alcohols which should be excluded are straight or branched chain, aliphatic, aromatic, or mixed aliphatic/aromatic alcohols containing from 1 to 30 carbon atoms. Likewise, the carboxylic acid, acid anhydride and/or ether promoters to be excluded are halogen substituted or unsubstituted, straight or branched chain, aliphatic, aromatic or mixed aliphatic/aromatic acids and ether containing from about 1 to about 30 carbon atoms.

The polymerization reaction medium preferably contains less than about 20 weight ppm of water, and less than 5 weight ppm of mercaptans, all of which can function as poisons to Lewis Acid catalysts. The olefin feed can be treated to achieve the above desired levels by conventional means, e.g., by use of mole sieves and caustic washing to remove mercaptans and water to the above, and dienes (if desired).

The polymerization reaction may be conducted batchwise or in semicontinuous or continuous operation in which continuous streams of ingredients are delivered to the reactor, and an overflow of a slurry or solution of polymer is taken out for the recovery of the polymer therefrom. The preferred mode of reaction, however, is on a continuous basis using a continuous flow stirred reactor wherein feed is continuously introduced into the reactor and product continuously removed from the reactor. Typically, the monomer feed rate and product removal rate can be controlled.

The amount of Lewis Acid catalyst employed in the process of the present invention can be controlled in conjunction with the reaction temperature to achieve the target number average molecular weight of polymer but is also sought to be minimized to reduce undesired isomerizations believed to be induced thereby. The lower the initiator concentration in the reaction phase, the higher will be the polymer molecular weight and vice versa. Control of the polymer molecular weight within defined limits of a selected target polymer molecular weight is particularly important when the polymer is intended for use in lubricating oils as a dispersant.

The catalyst amount also affects the conversion of the olefin monomer and yield of polymer, with higher amounts of Lewis Acid catalyst typically achieving higher conversions and yields. Strong Lewis Acid catalyst can lead to isomerizations which reduce the functionality of the polymer, and can produce chain transfer. Thus, in the process of the present invention, a weaker or milder Lewis acid is preferred.

In view of the above, and of the fact that the Lewis Acid is complexed more or less strongly by the nitrogen-containing groups present in the reaction medium, the catalyst should be employed in sufficient amount to enable the reaction to be a "living" cationic polymerization. In other words, the preferred catalyst concentration corresponds to about the quantitative formation of complex between the catalyst and the nitrogen-containing compound. More specifically, the catalyst is employed at a ratio of moles of Lewis Acid to equivalents of nitrogen-containing functional groups of more than 3:1:1, preferably more than 4:1, more preferably more than 6:1, with a preferred range of from 3:1:1 to 30:1, more preferably 4:1 to 20:1 and most preferably 6:1 to 10:1. When using bifunctional initiators, the Lewis acid to initiator molar ratios are preferably from 3:1 to 5:1.

The polymerization reaction is conducted in the liquid phase to induce linear or chain type polymerization in contradistinction to ring or branch formation. If a feed is used which is gaseous under ambient conditions, it is preferred to control the reaction pressure and/or dissolve the feed in an inert solvent or liquid diluent, in order to maintain the feed in the liquid phase. Typical $C_4$ cuts comprising the feed are liquid under pressure and do not need a solvent or diluent.

Where the selected Lewis Acid catalyst is normally a gas (e.g., $BF_3$, and the like) the catalyst is typically introduced into the reactor as gas which is partially or completely dissolved in a pressurized liquid in the reactor.

Polymerization pressures can range typically from about 25 to about 500, and preferably from about 100 to about 300, kpa.

The N-containing initiator can be introduced to the monomer feed, or to the reaction mixture, in liquid form preferably separately from the Lewis Acid catalyst. Preferably, the monomer is not contacted with the Lewis Acid catalyst in the absence of the N-containing initiator of this invention.

The temperature at which the polymerizations are carried out is important, since temperatures which are too high tend to decrease the functionalization degree. The usual polymerization temperature range is between about −100° C. and +10° C. Preferably, the polymerizations are performed at a temperature below about −10° C., preferably below −20° C., and preferably between −80° C. and −20° C., e.g. at a temperature of about −50° C.

The liquid phase reaction mixture temperature is controlled by conventional means. The particular reaction temperature is selected to achieve the target living behavior, and preferably is not allowed to vary more than +or −5° C. from the selected value, while the catalyst and/or promoter feed rate is varied to achieve the desired Mn to compensate for variations in monomer distribution in the feed composition.

The polymerization reaction can be conducted batchwise, semi-continuously or completely continuously in the conventional manner. Preferably, the reactor contents are stirred to achieve even catalyst distribution therein.

Average polymerization times can vary from 10 to about 120, preferably from about 15 to about 45 (e.g., about 20 to about 30), and most preferably from about 15 to about 25 minutes.

The quench materials used to achieve quench are conventional and include the same materials discussed above as conventional cationic polymerization initiators or promoters with the exception that excess quantities are employed in amounts sufficient to deactivate the catalyst. Thus, while any amount of quenching medium effective to deactivate the catalyst may be employed, it is contemplated that such effective amount be sufficient to achieve a molar ratio of quench medium to Lewis Acid catalyst of typically from about 1:1 to about 100:1, preferably from about 3:1 to about 50:1, and most preferably from about 10:1 to about 30:1.

Quench is conducted by introducing the quench medium into the polymer product. Typically, the polymer product is maintained under pressure during the quench sufficient to avoid vaporization of any gaseous Lewis Acid catalyst (if one is employed) and other components of the mixture. The temperature of the quenching medium is not critical and, e.g., can comprise room temperature or lower.

In a batch system, quench can be performed in the reactor or preferably on the product after it is withdrawn from the reactor. In a continuous system, the quench will typically be performed after it exits the reactor.

After quench, the polymerization product is typically subjected to conventional finishing steps which include a caustic/H20 wash to extract catalyst residue, a hydrocarbon/aqueous phase separation step wherein deactivated and extracted Lewis Acid catalyst is isolated in the aqueous phase, and a water washing step to remove residual amounts of neutralized catalyst. The polymer is then typically stripped in a debutanizer to remove unreacted volatile monomers, followed by a further stripping procedure to remove light end polymer (e.g., $C_{24}$ carbon polymer). The stripped polymer is then typically dried by $N_2$.

The present invention includes a polymer composition having the formula:

$$R((M)_p(Y))_n \qquad (IV)$$

R is selected from at least one group consisting of H, a hydrocarbyl group, and a hydrocarbyl-substituted silyl group. R can be alkyl, aryl, alkylaryl and arylalkyl. Y is selected from at least one group consisting of an azido, cyano, carbonylamino, thiocarbonylamino, cyanato and thiocyanato. A preferred Y is an azido group. M is at least one repeat unit derived from a cationically polymerizable monomer. Useful monomers include straight and branched chain alpha olefins, isoolefins, alicyclic monoolefins, cycloaliphatic compounds, styrene derivatives, indene and derivatives thereof, and other monoolefins and heterocyclic monomers. "p" is an integer greater than 1 and preferably sufficient to attain a desired molecular weight. "n" is an integer of at least 1, preferably 1 to 10 and most preferably 1 to 2.

The novel polymers of this invention comprise terminally substituted polymers derived from any of the above-discussed cationically polymerizable monomers. The polymers will preferably contain at least 5 monomer units (M) per polymer chain, and will more usually be characterized by number average molecular weights of at least 350 or less and up to 15,000,000 or more with a useful range of from 350 to 15,000,000. The molecular weight range can be determined for particular polymers. However, preferred polymers generally range from 500 to 2,000,000 with derivatives of functionalized polymer used as lubricant additives generally up to 100,000 and with specific ranges of from 500 to 20,000 for use as dispersants and 20,000 to 100,000 for use as viscosity improvers.

The preparation of the polymers of the present invention can be conducted in a manner and under conditions to attain various molecular weight polymers. The polymers can be conveniently characterized based on molecular weight range. Polymers and copolymers of low, intermediate and high molecular weights can be prepared.

Low molecular weight polymers are considered to be polymers having a number average molecular weight of less than 20,000, preferably from 500 to 10,000, (e.g. from 2,000 to 8,000) and most preferably from 1,500 to 5,000. The low molecular weights are number average molecular weights measured by vapor phase osmometry. Low molecular weight polymers are useful in forming dispersants for lubricant additives.

Medium molecular weight materials having a number average molecular weight range of from 20,000 to 200,000, preferably 25,000 to 100,000; and more preferably from 25,000 to 80,000 are useful for viscosity improvers for lubricating oil compositions, adhesive coatings, tackifiers and sealants. The medium number average molecular weights can be determined by membrane osmometry.

The higher molecular weight materials have a number average molecular weight range of greater than 200,000 to 15,000,000, and specific embodiment of 300,000 to 10,000,000 and more specifically 500,000 to 2,000,000. These polymers are useful in polymeric compositions and blends including elastomeric compositions. Higher molecular weight materials having number average molecular weights of from 20,000 to 15,000,000 can be measured by gel permeation chromatography with universal calibration, or by light scattering as recited in Billmeyer, Textbook of Polymer Science, Second Edition, pp. 81–84 (1971).

The values of the ratio Mw/Mn, also referred to as molecular weight distribution, (MWD) are not critical. However, a typical maximum Mw/Mn value of about 1.5 is preferred with typical ranges of about 1.1 up to about 1.4. The ideal MWD is 1.0.

Useful olefin monomers from which nitrogen-containing polyalkenes of the present invention can be derived are polymerizable monoolefin monomers characterized by the presence of one or more groups having carbon-carbon unsaturated double bonds (i.e., >C=C<); that is, they are monoolefinic monomers such as ethylene, propylene, butene-1, isobutene, and octene-1 or polyolefinic monomers (usually diolefinic monomers) such as butadiene-1,3 and isoprene.

Although the polyalkenes may include aromatic groups (especially phenyl groups and lower alkyl- and/or lower alkoxy-substituted phenyl groups such as para-(tert-butyl) phenyl) and cycloaliphatic groups such as would be obtained from polymerizable cyclic olefins or cycloaliphatic substituted-polymerizable acrylic olefins, the polyalkenes usually will be free from such groups. Again, because aromatic and cycloaliphatic groups can be present, the olefin monomers from which the polyalkenes are prepared can contain aromatic and cycloaliphatic groups.

Specific examples of polyalkenes include polypropylenes, polybutenes, ethylene-propylene copolymers, ethylene-tert-butene, styrene-isobutene copolymers, isobutene-(paramethyl)styrene copolymers, copolymers of octene-1, copolymers of 3,3-dimethylpentene-1 with hexene-1, and copolymers of isobutene and styrene. More specific examples of such interpolymers include copolymer of 95% (by weight) of isobutene with 5% (by weight) of styrene; terpolymer of 98% of isobutene with 1% of piperylene and 1% of chloroprene; terpolymer of 95% of isobutene with 2% of butene-1 and 3% of hexene-1; terpolymer of 60% of isobutene with 20% of pentene-1; and 20% of octene-1; terpolymer of 90% of isobutene with 2% of cyclohexene and 8% of propylene; and copolymer of 80% of ethylene and 20% of propylene. The poly(isobutene)s obtained by polymerization of $C_4$ refinery stream having a butene content of about 35 to about 75% by weight and an isobutene content of about 30 to about 60% by weight. These polybutenes contain predominantly (greater than about 80% of the total repeating units) of isobutene repeating units of the configuration:

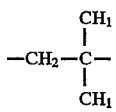

Also useful are poly-n-butenes made by the process of the present invention. A preferred source of n-butenes is petroleum feedstreams such as Raffinate II. These feedstocks are disclosed in the art such as in U.S. Pat. No. 4,952,739, hereby incorporated by reference. More specifically, Raffinate II feedstock useful in the process of this invention comprises a mixture of pressure liquefied $C_4$ hydrocarbons which comprise less than about 5% (preferably less than about 4.9 wt. %, e.g. from about 0.1 to 4.9 wt. % and typically greater than 1 or 2 wt. %) isobutylene, and at least about 12 wt. % (preferably at least about 15 wt. %, e.g. from about 15 to about 85 wt. %) total normal-butenes (i.e., butene-1, cis- and trans- butene-2), together with 10 to 70% n-butane, isobutane and less than about 0.8 wt. %, e.g. most preferably about 0% butadiene. Typically, there is about 20 to 50% of 1-butene and 5 to 35% of 2-butene. The $C_4$ feedstream preferably is substantially free of sulfur contaminants (e.g., mercaptans) e.g. <20 wppm $H_2$ and 5 wppm S. The low s levels are desired to avoid undesired side-reactions with the monomer, polymer and catalyst components, and to avoid the needs to resort to added expense and technical difficulties in removing the sulfur contaminants from the polymers thereby formed. Further, the $C_4$ feedstream is preferably substantially anhydrous, that is, it contains less than about 300 wppm water, based on the $C_4$ monomers in the feedstream. When Raffinate I is used in a process to make methyl tertiary butyl ether, the Raffinate II obtained has some methanol residue. The $C_4$ feedstream preferably contains less than about 100 ppm of methanol. The $C_4$ products other than butenes (e.g., saturated $C_4$ hydrocarbons), functions as diluent or solvent in the reaction mixture and are a non-critical aspect of this invention. The process of the present invention has enabled a new class of polymers and copolymers to be made from Raffinate II feedstock rendering a substantially low value feedstream as a valuable new raw material.

The living polymers of the present invention will comprise terminally substituent "Y" groups on one end, and a terminal "R" group on the other end when the nitrogen-containing initiator comprises a R—Y or R*—Y compound. R and R* are discussed above with regard to formulae (Ia, Ib and Ic). The polymers have the reacted functionality and molecular weight distribution. Illustrative of the monosubstituted polymers of this invention, therefore, are those set forth in Table A below:

TABLE A

| R-[polyolefin]-Y | | |
| R*-[polyolefin]-Y | | |
| R | Polyolefin | Y |
|---|---|---|
| H— | polyisobutylene | —$N_3$ |
| $CH_3$ | polyisobutylene | —$N_3$ |
| $C_2H_5$— | polyisobutylene | —$N_3$ |
| φ$C_2$ | polyisobutylene | —$N_3$ |
| $CH_3$φ- | polyisobutylene | —$N_3$ |
| φ- | polyisobutylene | —$N_3$ |
| $(CH_3)_2CH$φ- | polyisobutylene | —$N_3$ |

TABLE A-continued

| R-[polyolefin]-Y | | |
| R*-[polyolefin]-Y | | |
| R | Polyolefin | Y |
|---|---|---|
| 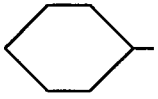 | polyisobutylene | —$N_3$ |
| φ$C(CH_3)_2$— | polyisobutylene | —$N_3$ |
| φ$C(CH_3)(C_2H_5)$— | polyisobutylene | —$N_3$ |
| φ$CH_2C(CH_3)_2$— | polyisobutylene | —$N_3$ |
| $(CH_3)_3Si$— | polyisobutylene | —$N_3$ |
| $(C_2H_5)_3Si$— | polyisobutylene | —$N_3$ |
| $(CH_3)_2Si(C_2H_5)$— | polyisobutylene | —$N_3$ |
| $(CH_3)Si(C_2H_5)_2$— | polyisobutylene | —$N_3$ |
| $(C_3H_7)_3Si$— | polyisobutylene | —$N_3$ |
| φ$Si(CH_3)_2$— | polyisobutylene | —$N_3$ |
| (φ)$_2Si(CH_3)$— | polyisobutylene | —$N_3$ |
| φ$_3Si$— | polyisobutylene | —$N_3$ |
| $(C_6H_{13})_3Si$— | polyisobutylene | —$N_3$ |
| $(C_8H_{17})_3Si$— | polyisobutylene | —$N_3$ |
| H— | polybutylene | —$N_3$ |
| $CH_3$ | polybutylene | —$N_3$ |
| $C_2H_5$— | polybutylene | —$N_3$ |
| φ$CH_2$— | polybutylene | —$N_3$ |
| $CH_3$φ- | polybutylene | —$N_3$ |
| φ- | polybutylene | —$N_3$ |
| $(CH_3)_2CH$φ- | polybutylene | —$N_3$ |
| 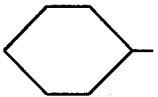 | polybutylene | —$N_3$ |
| φ$C(CH_3)_2$— | polybutylene | —$N_3$ |
| φ$C(CH_3)(C_2H_5)$— | polybutylene | —$N_3$ |
| φ$CH_2C(CH_3)_2$— | polybutylene | —$N_3$ |
| $(CH_3)_3Si$— | polybutylene | —$N_3$ |
| $(C_2H_5)_3Si$— | polybutylene | —$N_3$ |
| $(CH_3)_2Si(C_2H_5)$— | polybutylene | —$N_3$ |
| $(CH_3)Si(C_2H_5)_2$— | polybutylene | —$N_3$ |
| $(C_3H_7)_3Si$— | polybutylene | —$N_3$ |
| φ$Si(CH_3)_2$— | polybutylene | —$N_3$ |
| (φ)$_2Si(CH_3)$— | polybutylene | —$N_3$ |
| φ$_3Si$— | polybutylene | —$N_3$ |
| $(C_6H_{13})_3Si$— | polybutylene | —$N_3$ |
| $(C_8H_{17})_3Si$— | polybutylene | —$N_3$ |
| H— | polypropylene | —$N_3$ |
| $CH_3$ | polypropylene | —$N_3$ |
| $C_2H_5$— | polypropylene | —$N_3$ |
| φ$CH_2$— | polypropylene | —$N_3$ |
| $CH_3$φ- | polypropylene | —$N_3$ |
| φ- | polypropylene | —$N_3$ |
| $(CH_3)_2CH$φ- | polypropylene | —$N_3$ |
| 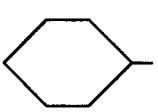 | polypropylene | —$N_3$ |
| φ$C(CH_3)_2$— | polypropylene | —$N_3$ |
| φ$C(CH_3)(C_2H_5)$— | polypropylene | —$N_3$ |
| φ$CH_2C(CH_3)_2$— | polypropylene | —$N_3$ |
| $(CH_3)_3Si$— | polypropylene | —$N_3$ |
| $(C_2H_5)_3Si$— | polypropylene | —$N_3$ |
| $(CH_3)_2Si(C_2H_5)$— | polypropylene | —$N_3$ |
| $(CH_3)Si(C_2H_5)_2$— | polypropylene | —$N_3$ |
| $(C_3H_7)_3Si$— | polypropylene | —$N_3$ |
| φ$Si(CH_3)_2$— | polypropylene | —$N_3$ |
| (φ)$_2Si(CH_3)$— | polypropylene | —$N_3$ |
| φ$_3Si$— | polypropylene | —$N_3$ |
| $(C_6H_{13})_3Si$— | polypropylene | —$N_3$ |
| $(C_8H_{17})_3Si$— | polypropylene | —$N_3$ |
| H— | polystyrene | —$N_3$ |
| $CH_3$ | polystyrene | —$N_3$ |

TABLE A-continued

| R | Polyolefin | Y |
|---|---|---|
| $C_2H_5-$ | polystyrene | $-N_3$ |
| $\phi CH_2-$ | polystyrene | $-N_3$ |
| $CH_3\phi-$ | polystyrene | $-N_3$ |
| $\phi-$ | polystyrene | $-N_3$ |
| $(CH_3)_2CH\phi-$ | polystyrene | $-N_3$ |
| 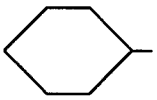 | polystyrene | $-N_3$ |
| $\phi C(CH_3)_2-$ | polystyrene | $-N_3$ |
| $\phi C(CH_3)(C_2H_5)-$ | polystyrene | $-N_3$ |
| $\phi CH_2C(CH_3)_2-$ | polystyrene | $-N_3$ |
| $(CH_3)_3Si-$ | polystyrene | $-N_3$ |
| $(C_2H_5)_3Si-$ | polystyrene | $-N_3$ |
| $(CH_3)_2Si(C_2H_5)-$ | polystyrene | $-N_3$ |
| $(CH_3)Si(C_2H_5)_2-$ | polystyrene | $-N_3$ |
| $(C_3H_7)_3Si-$ | polystyrene | $-N_3$ |
| $\phi Si(CH_3)_2-$ | polystyrene | $-N_3$ |
| $(\phi)_2Si(CH_3)-$ | polystyrene | $-N_3$ |
| $\phi_3Si-$ | polystyrene | $-N_3$ |
| $(C_6H_{13})_3Si-$ | polystyrene | $-N_3$ |
| $(C_8H_{17})_3Si-$ | polystyrene | $-N_3$ |
| $H-$ | polymethylstyrene | $-N_3$ |
| $CH_3$ | polymethylstyrene | $-N_3$ |
| $C_2H_5-$ | polymethylstyrene | $-N_3$ |
| $\phi CH_2-$ | polymethylstyrene | $-N_3$ |
| $CH_3\phi-$ | polymethylstyrene | $-N_3$ |
| $\phi-$ | polymethylstyrene | $-N_3$ |
| $(CH_3)_2CH\phi-$ | polymethylstyrene | $-N_3$ |
| 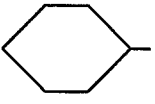 | polymethylstyrene | $-N_3$ |
| $\phi C(CH_3)_2-$ | polymethylstyrene | $-N_3$ |
| $\phi C(CH_3)(C_2H_5)-$ | polymethylstyrene | $-N_3$ |
| $\phi CH_2C(CH_3)_2-$ | polymethylstyrene | $-N_3$ |
| $(CH_3)_3Si-$ | polymethylstyrene | $-N_3$ |
| $(C_2H_5)_3Si-$ | polymethylstyrene | $-N_3$ |
| $(CH_3)_2Si(C_2H_5)-$ | polymethylstyrene | $-N_3$ |
| $(CH_3)Si(C_2H_5)_2-$ | polymethylstyrene | $-N_3$ |
| $(C_3H_7)_3Si-$ | polymethylstyrene | $-N_3$ |
| $\phi Si(CH_3)_2-$ | polymethylstyrene | $-N_3$ |
| $(\phi)_2Si(CH_3)-$ | polymethylstyrene | $-N_3$ |
| $\phi_3Si-$ | polymethylstyrene | $-N_3$ |
| $(C_6H_{13})_3Si-$ | polymethylstyrene | $-N_3$ |
| $(C_8H_{17})_3Si-$ | polymethylstyrene | $-N_3$ |
| $H-$ | polyisobutylene | $-NCO$ |
| $CH_3$ | polyisobutylene | $-NCO$ |
| $C_2H_5-$ | polyisobutylene | $-NCO$ |
| $\phi CH_2-$ | polyisobutylene | $-NCO$ |
| $CH_3\phi-$ | polyisobutylene | $-NCO$ |
| $\phi-$ | polyisobutylene | $-NCO$ |
| $(CH_3)_2CH\phi-$ | polyisobutylene | $-NCO$ |
| 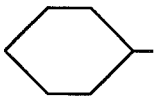 | polyisobutylene | $-NCO$ |
| $\phi C(CH_3)_2-$ | polyisobutylene | $-NCO$ |
| $\phi C(CH_3)(C_2H_5)-$ | polyisobutylene | $-NCO$ |
| $\phi CH_2C(CH_3)_2-$ | polyisobutylene | $-NCO$ |
| $(CH_3)_3Si-$ | polyisobutylene | $-NCO$ |
| $(C_2H_5)_3Si-$ | polyisobutylene | $-NCO$ |
| $(CH_3)_2Si(C_2H_5)-$ | polyisobutylene | $-NCO$ |
| $(CH_3)Si(C_2H_5)_2-$ | polyisobutylene | $-NCO$ |
| $(C_3H_7)_3Si-$ | polyisobutylene | $-NCO$ |
| $\phi Si(CH_3)_2-$ | polyisobutylene | $-NCO$ |
| $(\phi)_2Si(CH_3)-$ | polyisobutylene | $-NCO$ |
| $\phi_3Si-$ | polyisobutylene | $-NCO$ |
| $(C_6H_{13})_3Si-$ | polyisobutylene | $-NCO$ |
| $(C_8H_{17})_3Si-$ | polyisobutylene | $-NCO$ |
| $H-$ | polybutylene | $-NCO$ |
| $CH_3$ | polybutylene | $-NCO$ |
| $C_2H_5-$ | polybutylene | $-NCO$ |
| $\phi CH_2-$ | polybutylene | $-NCO$ |
| $CH_3\phi-$ | polybutylene | $-NCO$ |
| $\phi-$ | polybutylene | $-NCO$ |
| $(CH_3)_2CH\phi-$ | polybutylene | $-NCO$ |
| 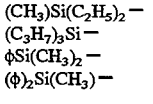 | polybutylene | $-NCO$ |
| $\phi C(CH_3)_2-$ | polybutylene | $-NCO$ |
| $\phi C(CH_3)(C_2H_5)-$ | polybutylene | $-NCO$ |
| $\phi CH_2C(CH_3)_2-$ | polybutylene | $-NCO$ |
| $(CH_3)_3Si-$ | polybutylene | $-NCO$ |
| $(C_2H_5)_3Si-$ | polybutylene | $-NCO$ |
| $(CH_3)_2Si(C_2H_5)-$ | polybutylene | $-NCO$ |
| $(CH_3)Si(C_2H_5)_2-$ | polybutylene | $-NCO$ |
| $(C_3H_7)_3Si-$ | polybutylene | $-NCO$ |
| $\phi Si(CH_3)_2-$ | polybutylene | $-NCO$ |
| $(\phi)_2Si(CH_3)-$ | polybutylene | $-NCO$ |
| $\phi_3Si-$ | polybutylene | $-NCO$ |
| $(C_6H_{13})_3Si-$ | polybutylene | $-NCO$ |
| $(C_8H_{17})_3Si-$ | polybutylene | $-NCO$ |
| $H-$ | polypropylene | $-NCO$ |
| $CH_3$ | polypropylene | $-NCO$ |
| $C_2H_5-$ | polypropylene | $-NCO$ |
| $\phi CH_2-$ | polypropylene | $-NCO$ |
| $CH_3\phi-$ | polypropylene | $-NCO$ |
| $\phi-$ | polypropylene | $-NCO$ |
| $(CH_3)_2CH\phi-$ | polypropylene | $-NCO$ |
| 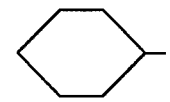 | polypropylene | $-NCO$ |
| $\phi C(CH_3)_2-$ | polypropylene | $-NCO$ |
| $\phi C(CH_3)(C_2H_5)-$ | polypropylene | $-NCO$ |
| $\phi CH_2C(CH_3)_2-$ | polypropylene | $-NCO$ |
| $(CH_3)_3Si-$ | polypropylene | $-NCO$ |
| $(C_2H_5)_3Si-$ | polypropylene | $-NCO$ |
| $(CH_3)_2Si(C_2H_5)-$ | polypropylene | $-NCO$ |
| $(CH_3)Si(C_2H_5)_2-$ | polypropylene | $-NCO$ |
| $(C_3H_7)_3Si-$ | polypropylene | $-NCO$ |
| $\phi Si(CH_3)_2-$ | polypropylene | $-NCO$ |
| $(\phi)_2Si(CH_3)-$ | polypropylene | $-NCO$ |
| $\phi_3Si-$ | polypropylene | $-NCO$ |
| $(C_6H_{13})_3Si-$ | polypropylene | $-NCO$ |
| $(C_8H_{17})_3Si-$ | polypropylene | $-NCO$ |
| $H-$ | polystyrene | $-NCO$ |
| $CH_3$ | polystyrene | $-NCO$ |
| $C_2H_5-$ | polystyrene | $-NCO$ |
| $\phi CH_2-$ | polystyrene | $-NCO$ |
| $CH_3\phi-$ | polystyrene | $-NCO$ |
| $\phi-$ | polystyrene | $-NCO$ |
| $(CH_3)_2CH\phi-$ | polystyrene | $-NCO$ |
| 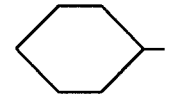 | polystyrene | $-NCO$ |
| $\phi C(CH_3)_2-$ | polystyrene | $-NCO$ |
| $\phi C(CH_3)(C_2H_5)-$ | polystyrene | $-NCO$ |
| $\phi CH_2C(CH_3)_2-$ | polystyrene | $-NCO$ |
| $(CH_3)_3Si-$ | polystyrene | $-NCO$ |
| $(C_2H_5)_3Si-$ | polystyrene | $-NCO$ |

TABLE A-continued

| R | Polyolefin | Y |
|---|---|---|
| (CH₃)₂Si(C₂H₅)— | polystyrene | —NCO |
| (CH₃)Si(C₂H₅)₂— | polystyrene | —NCO |
| (C₃H₇)₃Si— | polystyrene | —NCO |
| φSi(CH₃)₂— | polystyrene | —NCO |
| (φ)₂Si(CH₃)— | polystyrene | —NCO |
| φ₃Si— | polystyrene | —NCO |
| (C₆H₁₃)₃Si— | polystyrene | —NCO |
| (C₈H₁₇)₃Si— | polystyrene | —NCO |
| H— | polymethylstyrene | —NCO |
| CH₃ | polymethylstyrene | —NCO |
| C₂H₅— | polymethylstyrene | —NCO |
| φCH₂— | polymethylstyrene | —NCO |
| CH₃φ- | polymethylstyrene | —NCO |
| φ- | polymethylstyrene | —NCO |
| (CH₃)₂CHφ- | polymethylstyrene | —NCO |
| 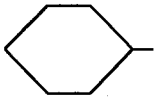 | polymethylstyrene | —NCO |
| φC(CH₃)₂— | polymethylstyrene | —NCO |
| φC(CH₃)(C₂H₅)— | polymethylstyrene | —NCO |
| φCH₂C(CH₃)₂— | polymethylstyrene | —NCO |
| (CH₃)₃Si— | polymethylstyrene | —NCO |
| (C₂H₅)₃Si— | polymethylstyrene | —NCO |
| (CH₃)₂Si(C₂H₅)— | polymethylstyrene | —NCO |
| (CH₃)Si(C₂H₅)₂— | polymethylstyrene | —NCO |
| (C₃H₇)₃Si— | polymethylstyrene | —NCO |
| φSi(CH₃)₂— | polymethylstyrene | —NCO |
| (φ)₂Si(CH₃)— | polymethylstyrene | —NCO |
| φ₃Si— | polymethylstyrene | —NCO |
| (C₆H₁₃)₃Si— | polymethylstyrene | —NCO |
| (C₈H₁₇)₃Si— | polymethylstyrene | —NCO |
| H— | polyisobutylene | —CN |
| CH₃ | polyisobutylene | —CN |
| C₂H₅— | polyisobutylene | —CN |
| φCH₂— | polyisobutylene | —CN |
| CH₃φ- | polyisobutylene | —CN |
| φ- | polyisobutylene | —CN |
| (CH₃)₂CHφ- | polyisobutylene | —CN |
| 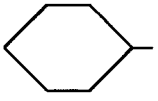 | polyisobutylene | —CN |
| φC(CH₃)₂— | polyisobutylene | —CN |
| φC(CH₃)(C₂H₅)— | polyisobutylene | —CN |
| φCH₂C(CH₃)₂— | polyisobutylene | —CN |
| (CH₃)₃Si— | polyisobutylene | —CN |
| (C₂H₅)₃Si— | polyisobutylene | —CN |
| (CH₃)₂Si(C₂H₅)— | polyisobutylene | —CN |
| (CH₃)Si(C₂H₅)₂— | polyisobutylene | —CN |
| (C₃H₇)₃Si— | polyisobutylene | —CN |
| φSi(CH₃)₂— | polyisobutylene | —CN |
| (φ)₂Si(CH₃)— | polyisobutylene | —CN |
| φ₃Si— | polyisobutylene | —CN |
| (C₆H₁₃)₃Si— | polyisobutylene | —CN |
| (C₈H₁₇)₃Si— | polyisobutylene | —CN |
| H— | polybutylene | —CN |
| CH₃ | polybutylene | —CN |
| C₂H₅— | polybutylene | —CN |
| φCH₂— | polybutylene | —CN |
| CH₃φ- | polybutylene | —CN |
| φ- | polybutylene | —CN |
| (CH₃)₂CHφ- | polybutylene | —CN |
| 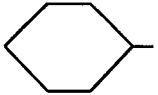 | polybutylene | —CN |
| φC(CH₃)₂— | polybutylene | —CN |
| φC(CH₃)(C₂H₅)— | polybutylene | —CN |
| φCH₂C(CH₃)₂— | polybutylene | —CN |
| (CH₃)₃Si— | polybutylene | —CN |
| (C₂H₅)₃Si— | polybutylene | —CN |
| (CH₃)₂Si(C₂H₅)— | polybutylene | —CN |
| (CH₃)Si(C₂H₅)₂— | polybutylene | —CN |
| (C₃H₇)₃Si— | polybutylene | —CN |
| φSi(CH₃)₂— | polybutylene | —CN |
| (φ)₂Si(CH₃)— | polybutylene | —CN |
| φ₃Si— | polybutylene | —CN |
| (C₆H₁₃)₃Si— | polybutylene | —CN |
| (C₈H₁₇)₃Si— | polybutylene | —CN |
| H— | polypropylene | —CN |
| CH₃ | polypropylene | —CN |
| C₂H₅— | polypropylene | —CN |
| φCH₂— | polypropylene | —CN |
| CH₃φ- | polypropylene | —CN |
| φ- | polypropylene | —CN |
| (CH₃)₂CHφ- | polypropylene | —CN |
|  | polypropylene | —CN |
| φC(CH₃)₂— | polypropylene | —CN |
| φC(CH₃)(C₂H₅)— | polypropylene | —CN |
| φCH₂C(CH₃)₂— | polypropylene | —CN |
| (CH₃)₃Si— | polypropylene | —CN |
| (C₂H₅)₃Si— | polypropylene | —CN |
| (CH₃)₂Si(C₂H₅)— | polypropylene | —CN |
| (CH₃)Si(C₂H₅)₂— | polypropylene | —CN |
| (C₃H₇)₃Si— | polypropylene | —CN |
| φSi(CH₃)₂— | polypropylene | —CN |
| (φ)₂Si(CH₃)— | polypropylene | —CN |
| φ₃Si— | polypropylene | —CN |
| (C₆H₁₃)₃Si— | polypropylene | —CN |
| (C₈H₁₇)₃Si— | polypropylene | —CN |
| H— | polystyrene | —CN |
| CH₃ | polystyrene | —CN |
| C₂H₅— | polystyrene | —CN |
| φCH₂— | polystyrene | —CN |
| CH₃φ- | polystyrene | —CN |
| φ- | polystyrene | —CN |
| (CH₃)₂CHφ- | polystyrene | —CN |
|  | polystyrene | —CN |
| φC(CH₃)₂— | polystyrene | —CN |
| φC(CH₃)(C₂H₅)— | polystyrene | —CN |
| φCH₂C(CH₃)₂— | polystyrene | —CN |
| (CH₃)₃Si— | polystyrene | —CN |
| (C₂H₅)₃Si— | polystyrene | —CN |
| (CH₃)₂Si(C₂H₅)— | polystyrene | —CN |
| (CH₃)Si(C₂H₅)₂— | polystyrene | —CN |
| (C₃H₇)₃Si— | polystyrene | —CN |
| φSi(CH₃)₂— | polystyrene | —CN |
| (φ)₂Si(CH₃)— | polystyrene | —CN |
| φ₃Si— | polystyrene | —CN |
| (C₆H₁₃)₃Si— | polystyrene | —CN |
| (C₈H₁₇)₃Si— | polystyrene | —CN |
| H— | polymethylstyrene | —CN |
| CH₃ | polymethylstyrene | —CN |
| C₂H₅— | polymethylstyrene | —CN |
| φCH₂— | polymethylstyrene | —CN |
| CH₃φ- | polymethylstyrene | —CN |
| φ- | polymethylstyrene | —CN |
| (CH₃)₂CHφ- | polymethylstyrene | —CN |

TABLE A-continued

| R | Polyolefin | Y |
|---|---|---|
| 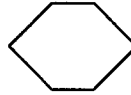 | polymethylstyrene | —CN |
| φC(CH₃)₂— | polymethylstyrene | —CN |
| φC(CH₃)(C₂H₅)— | polymethylstyrene | —CN |
| φCH₂C(CH₃)₂— | polymethylstyrene | —CN |
| (CH₃)₃Si— | polymethylstyrene | —CN |
| (C₂H₅)₃Si— | polymethylstyrene | —CN |
| (CH₃)₂Si(C₂H₅)— | polymethylstyrene | —CN |
| (CH₃)Si(C₂H₅)₂— | polymethylstyrene | —CN |
| (C₃H₇)₃Si— | polymethylstyrene | —CN |
| φSi(CH₃)₂— | polymethylstyrene | —CN |
| (φ)₂Si(CH₃)— | polymethylstyrene | —CN |
| φ₃Si— | polymethylstyrene | —CN |
| (C₆H₁₃)₃Si— | polymethylstyrene | —CN |
| (C₈H₁₇)₃Si— | polymethylstyrene | —CN |
| H— | polyisobutylene | —OCN |
| CH₃ | polyisobutylene | —OCN |
| C₂H₅— | polyisobutylene | —OCN |
| φCH₂— | polyisobutylene | —OCN |
| CH₃φ- | polyisobutylene | —OCN |
| φ- | polyisobutylene | —OCN |
| (CH₃)₂CHφ- | polyisobutylene | —OCN |
| 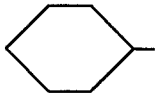 | polyisobutylene | —OCN |
| φC(CH₃)₂— | polyisobutylene | —OCN |
| φC(CH₃)(C₂H₅)— | polyisobutylene | —OCN |
| φCH₂C(CH₃)₂— | polyisobutylene | —OCN |
| (CH₃)₃Si— | polyisobutylene | —OCN |
| (C₂H₅)₃Si— | polyisobutylene | —OCN |
| (CH₃)₂Si(C₂H₅)— | polyisobutylene | —OCN |
| (CH₃)Si(C₂H₅)₂— | polyisobutylene | —OCN |
| (C₃H₇)₃Si— | polyisobutylene | —OCN |
| φSi(CH₃)₂— | polyisobutylene | —OCN |
| (φ)₂Si(CH₃)— | polyisobutylene | —OCN |
| φ₃Si— | polyisobutylene | —OCN |
| (C₆H₁₃)₃Si— | polyisobutylene | —OCN |
| (C₈H₁₇)₃Si— | polyisobutylene | —OCN |
| H— | polybutylene | —OCN |
| CH₃ | polybutylene | —OCN |
| C₂H₅— | polybutylene | —OCN |
| φCH₂— | polybutylene | —OCN |
| CH₃φ- | polybutylene | —OCN |
| φ- | polybutylene | —OCN |
| (CH₃)₂CHφ- | polybutylene | —OCN |
|  | polybutylene | —OCN |
| φC(CH₃)₂— | polybutylene | —OCN |
| φC(CH₃)(C₂H₅)— | polybutylene | —OCN |
| φCH₂C(CH₃)₂— | polybutylene | —OCN |
| (CH₃)₃Si— | polybutylene | —OCN |
| (C₂H₅)₃Si— | polybutylene | —OCN |
| (CH₃)₂Si(C₂H₅)— | polybutylene | —OCN |
| (CH₃)Si(C₂H₅)₂— | polybutylene | —OCN |
| (C₃H₇)₃Si— | polybutylene | —OCN |
| φSi(CH₃)₂— | polybutylene | —OCN |
| (φ)₂Si(CH₃)— | polybutylene | —OCN |
| φ₃Si— | polybutylene | —OCN |
| (C₆H₁₃)₃Si— | polybutylene | —OCN |
| (C₈H₁₇)₃Si— | polybutylene | —OCN |
| H— | polypropylene | —OCN |
| CH₃ | polypropylene | —OCN |
| C₂H₅— | polypropylene | —OCN |
| φCH₂— | polypropylene | —OCN |
| CH₃φ- | polypropylene | —OCN |
| φ- | polypropylene | —OCN |
| (CH₃)₂CHφ- | polypropylene | —OCN |
| 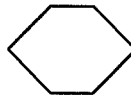 | polypropylene | —OCN |
| φC(CH₃)₂— | polypropylene | —OCN |
| φC(CH₃)(C₂H₅)— | polypropylene | —OCN |
| φCH₂C(CH₃)₂— | polypropylene | —OCN |
| (CH₃)₃Si— | polypropylene | —OCN |
| (C₂H₅)₃Si— | polypropylene | —OCN |
| (CH₃)₂Si(C₂H₅)— | polypropylene | —OCN |
| (CH₃)Si(C₂H₅)₂— | polypropylene | —OCN |
| (C₃H₇)₃Si— | polypropylene | —OCN |
| φSi(CH₃)₂— | polypropylene | —OCN |
| (φ)₂Si(CH₃)— | polypropylene | —OCN |
| φ₃Si— | polypropylene | —OCN |
| (C₆H₁₃)₃Si— | polypropylene | —OCN |
| (C₈H₁₇)₃Si— | polypropylene | —OCN |
| H— | polystyrene | —OCN |
| CH₃ | polystyrene | —OCN |
| C₂H₅— | polystyrene | —OCN |
| φCH₂— | polystyrene | —OCN |
| CH₃φ- | polystyrene | —OCN |
| φ- | polystyrene | —OCN |
| (CH₃)₂CHφ- | polystyrene | —OCN |
| 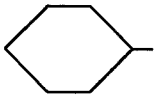 | polystyrene | —OCN |
| φC(CH₃)₂— | polystyrene | —OCN |
| φC(CH₃)(C₂H₅)— | polystyrene | —OCN |
| φCH₂C(CH₃)₂— | polystyrene | —OCN |
| (CH₃)₃Si— | polystyrene | —OCN |
| (C₂H₅)₃Si— | polystyrene | —OCN |
| (CH₃)₂Si(C₂H₅)— | polystyrene | —OCN |
| (CH₃)Si(C₂H₅)₂— | polystyrene | —OCN |
| (C₃H₇)₃Si— | polystyrene | —OCN |
| φSi(CH₃)₂— | polystyrene | —OCN |
| (φ)₂Si(CH₃)— | polystyrene | —OCN |
| φ₃Si— | polystyrene | —OCN |
| (C₆H₁₃)₃Si— | polystyrene | —OCN |
| (C₈H₁₇)₃Si— | polystyrene | —OCN |
| H— | polymethylstyrene | —OCN |
| CH₃ | polymethylstyrene | —OCN |
| C₂H₅— | polymethylstyrene | —OCN |
| φCH₂— | polymethylstyrene | —OCN |
| CH₃φ- | polymethylstyrene | —OCN |
| φ- | polymethylstyrene | —OCN |
| (CH₃)₂CHφ- | polymethylstyrene | —OCN |
|  | polymethylstyrene | —OCN |
| φC(CH₃)₂— | polymethylstyrene | —OCN |
| φC(CH₃)(C₂H₅)— | polymethylstyrene | —OCN |
| φCH₂C(CH₃)₂— | polymethylstyrene | —OCN |
| (CH₃)₃Si— | polymethylstyrene | —OCN |
| (C₂H₅)₃Si— | polymethylstyrene | —OCN |
| (CH₃)₂Si(C₂H₅)— | polymethylstyrene | —OCN |
| (CH₃)Si(C₂H₅)₂— | polymethylstyrene | —OCN |
| (C₃H₇)₃Si— | polymethylstyrene | —OCN |
| φSi(CH₃)₂— | polymethylstyrene | —OCN |
| (φ)₂Si(CH₃)— | polymethylstyrene | —OCN |
| φ₃Si— | polymethylstyrene | —OCN |

TABLE A-continued

| R | Polyolefin | Y |
|---|---|---|
| $(C_6H_{13})_3Si-$ | polymethylstyrene | $-OCN$ |
| $(C_8H_{17})_3Si-$ | polymethylstyrene | $-OCN$ |
| $H-$ | polyisobutylene | $-SCN$ |
| $CH_3$ | polyisobutylene | $-SCN$ |
| $C_2H_5-$ | polyisobutylene | $-SCN$ |
| $\phi CH_2-$ | polyisobutylene | $-SCN$ |
| $CH_3\phi-$ | polyisobutylene | $-SCN$ |
| $\phi-$ | polyisobutylene | $-SCN$ |
| $(CH_3)_2CH\phi-$ | polyisobutylene | $-SCN$ |
|  | polyisobutylene | $-SCN$ |
| $\phi C(CH_3)_2-$ | polyisobutylene | $-SCN$ |
| $\phi C(CH_3)(C_2H_5)-$ | polyisobutylene | $-SCN$ |
| $\phi CH_2C(CH_3)_2-$ | polyisobutylene | $-SCN$ |
| $(CH_3)_3Si-$ | polyisobutylene | $-SCN$ |
| $(C_2H_5)_3Si-$ | polyisobutylene | $-SCN$ |
| $(CH_3)_2Si(C_2H_5)-$ | polyisobutylene | $-SCN$ |
| $(CH_3)Si(C_2H_5)_2-$ | polyisobutylene | $-SCN$ |
| $(C_3H_7)_3Si-$ | polyisobutylene | $-SCN$ |
| $\phi Si(CH_3)_2-$ | polyisobutylene | $-SCN$ |
| $(\phi)_2Si(CH_3)-$ | polyisobutylene | $-SCN$ |
| $\phi_3Si-$ | polyisobutylene | $-SCN$ |
| $(C_6H_{13})_3Si-$ | polyisobutylene | $-SCN$ |
| $(C_8H_{17})_3Si-$ | polyisobutylene | $-SCN$ |
| $H-$ | polybutylene | $-SCN$ |
| $CH_3$ | polybutylene | $-SCN$ |
| $C_2H_5-$ | polybutylene | $-SCN$ |
| $\phi CH_2-$ | polybutylene | $-SCN$ |
| $CH_3\phi-$ | polybutylene | $-SCN$ |
| $\phi-$ | polybutylene | $-SCN$ |
| $(CH_3)_2CH\phi-$ | polybutylene | $-SCN$ |
| 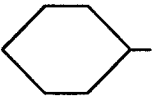 | polybutylene | $-SCN$ |
| $\phi C(CH_3)_2-$ | polybutylene | $-SCN$ |
| $\phi C(CH_3)(C_2H_5)-$ | polybutylene | $-SCN$ |
| $\phi CH_2C(CH_3)_2-$ | polybutylene | $-SCN$ |
| $(CH_3)_3Si-$ | polybutylene | $-SCN$ |
| $(C_2H_5)_3Si-$ | polybutylene | $-SCN$ |
| $(CH_3)_2Si(C_2H_5)-$ | polybutylene | $-SCN$ |
| $(CH_3)Si(C_2H_5)_2-$ | polybutylene | $-SCN$ |
| $(C_3H_7)_3Si-$ | polybutylene | $-SCN$ |
| $\phi Si(CH_3)_2-$ | polybutylene | $-SCN$ |
| $(\phi)_2Si(CH_3)-$ | polybutylene | $-SCN$ |
| $\phi_3Si-$ | polybutylene | $-SCN$ |
| $(C_6H_{13})_3Si-$ | polybutylene | $-SCN$ |
| $(C_8H_{17})_3Si-$ | polybutylene | $-SCN$ |
| $H-$ | polypropylene | $-SCN$ |
| $CH_3$ | polypropylene | $-SCN$ |
| $C_2H_5-$ | polypropylene | $-SCN$ |
| $\phi CH_2-$ | polypropylene | $-SCN$ |
| $CH_3\phi-$ | polypropylene | $-SCN$ |
| $\phi-$ | polypropylene | $-SCN$ |
| $(CH_3)_2CH\phi-$ | polypropylene | $-SCN$ |
| 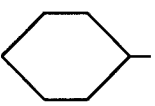 | polypropylene | $-SCN$ |
| $\phi C(CH_3)_2-$ | polypropylene | $-SCN$ |
| $\phi C(CH_3)(C_2H_5)-$ | polypropylene | $-SCN$ |
| $\phi CH_2C(CH_3)_2-$ | polypropylene | $-SCN$ |
| $(CH_3)_3Si-$ | polypropylene | $-SCN$ |
| $(C_2H_5)_3Si-$ | polypropylene | $-SCN$ |
| $(CH_3)_2Si(C_2H_5)-$ | polypropylene | $-SCN$ |
| $(CH_3)Si(C_2H_5)_2-$ | polypropylene | $-SCN$ |
| $(C_3H_7)_3Si-$ | polypropylene | $-SCN$ |
| $\phi Si(CH_3)_2-$ | polypropylene | $-SCN$ |
| $(\phi)_2Si(CH_3)-$ | polypropylene | $-SCN$ |
| $\phi_3Si-$ | polypropylene | $-SCN$ |
| $(C_6H_{13})_3Si-$ | polypropylene | $-SCN$ |
| $(C_8H_{17})_3Si-$ | polypropylene | $-SCN$ |
| $H-$ | polystyrene | $-SCN$ |
| $CH_3$ | polystyrene | $-SCN$ |
| $C_2H_5-$ | polystyrene | $-SCN$ |
| $\phi CH_2-$ | polystyrene | $-SCN$ |
| $CH_3\phi-$ | polystyrene | $-SCN$ |
| $\phi-$ | polystyrene | $-SCN$ |
| $(CH_3)_2CH\phi-$ | polystyrene | $-SCN$ |
| 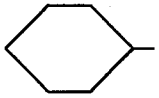 | polystyrene | $-SCN$ |
| $\phi C(CH_3)_2-$ | polystyrene | $-SCN$ |
| $\phi C(CH_3)(C_2H_5)-$ | polystyrene | $-SCN$ |
| $\phi CH_2C(CH_3)_2-$ | polystyrene | $-SCN$ |
| $(CH_3)_3Si-$ | polystyrene | $-SCN$ |
| $(C_2H_5)_3Si-$ | polystyrene | $-SCN$ |
| $(CH_3)_2Si(C_2H_5)-$ | polystyrene | $-SCN$ |
| $(CH_3)Si(C_2H_5)_2-$ | polystyrene | $-SCN$ |
| $(C_3H_7)_3Si-$ | polystyrene | $-SCN$ |
| $\phi Si(CH_3)_2-$ | polystyrene | $-SCN$ |
| $(\phi)_2Si(CH_3)-$ | polystyrene | $-SCN$ |
| $\phi_3Si-$ | polystyrene | $-SCN$ |
| $(C_6H_{13})_3Si-$ | polystyrene | $-SCN$ |
| $(C_8H_{17})_3Si-$ | polystyrene | $-SCN$ |
| $H-$ | polymethylstyrene | $-SCN$ |
| $CH_3$ | polymethylstyrene | $-SCN$ |
| $C_2H_5-$ | polymethylstyrene | $-SCN$ |
| $\phi CH_2-$ | polymethylstyrene | $-SCN$ |
| $CH_3\phi-$ | polymethylstyrene | $-SCN$ |
| $\phi-$ | polymethylstyrene | $-SCN$ |
| $(CH_3)_2CH\phi-$ | polymethylstyrene | $-SCN$ |
| 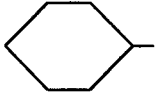 | polymethylstyrene | $-SCN$ |
| $\phi C(CH_3)_2-$ | polymethylstyrene | $-SCN$ |
| $\phi C(CH_3)(C_2H_5)-$ | polymethylstyrene | $-SCN$ |
| $\phi CH_2C(CH_3)_2-$ | polymethylstyrene | $-SCN$ |
| $(CH_3)_3Si-$ | polymethylstyrene | $-SCN$ |
| $(C_2H_5)_3Si-$ | polymethylstyrene | $-SCN$ |
| $(CH_3)_2Si(C_2H_5)-$ | polymethylstyrene | $-SCN$ |
| $(CH_3)Si(C_2H_5)_2-$ | polymethylstyrene | $-SCN$ |
| $(C_3H_7)_3Si-$ | polymethylstyrene | $-SCN$ |
| $\phi Si(CH_3)_2-$ | polymethylstyrene | $-SCN$ |
| $(\phi)_2Si(CH_3)-$ | polymethylstyrene | $-SCN$ |
| $\phi_3Si-$ | polymethylstyrene | $-SCN$ |
| $(C_6H_{13})_3Si-$ | polymethylstyrene | $-SCN$ |
| $(C_8H_{17})_3Si-$ | polymethylstyrene | $-SCN$ |
| $H-$ | polyisobutylene | $-NCS$ |
| $CH_3$ | polyisobutylene | $-NCS$ |
| $C_2H_5-$ | polyisobutylene | $-NCS$ |
| $\phi CH_2-$ | polyisobutylene | $-NCS$ |
| $CH_3\phi-$ | polyisobutylene | $-NCS$ |
| $\phi-$ | polyisobutylene | $-NCS$ |
| $(CH_3)_2CH\phi-$ | polyisobutylene | $-NCS$ |
| 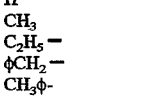 | polyisobutylene | $-NCS$ |
| $\phi C(CH_3)_2-$ | polyisobutylene | $-NCS$ |

TABLE A-continued

| R | Polyolefin | Y |
|---|---|---|
| $\phi C(CH_3)(C_2H_5)-$ | polyisobutylene | $-NCS$ |
| $\phi CH_2C(CH_3)_2-$ | polyisobutylene | $-NCS$ |
| $(CH_3)_3Si-$ | polyisobutylene | $-NCS$ |
| $(C_2H_5)_3Si-$ | polyisobutylene | $-NCS$ |
| $(CH_3)_2Si(C_2H_5)-$ | polyisobutylene | $-NCS$ |
| $(CH_3)Si(C_2H_5)_2-$ | polyisobutylene | $-NCS$ |
| $(C_3H_7)_3Si-$ | polyisobutylene | $-NCS$ |
| $\phi Si(CH_3)_2-$ | polyisobutylene | $-NCS$ |
| $(\phi)_2Si(CH_3)-$ | polyisobutylene | $-NCS$ |
| $\phi_3Si-$ | polyisobutylene | $-NCS$ |
| $(C_6H_{13})_3Si-$ | polyisobutylene | $-NCS$ |
| $(C_8H_{17})_3Si-$ | polyisobutylene | $-NCS$ |
| $H-$ | polybutylene | $-NCS$ |
| $CH_3$ | polybutylene | $-NCS$ |
| $C_2H_5-$ | polybutylene | $-NCS$ |
| $\phi CH_2-$ | polybutylene | $-NCS$ |
| $CH_3\phi-$ | polybutylene | $-NCS$ |
| $\phi-$ | polybutylene | $-NCS$ |
| $(CH_3)_2CH\phi-$ | polybutylene | $-NCS$ |
| 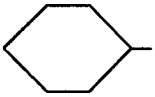 | polybutylene | $-NCS$ |
| $\phi C(CH_3)_2-$ | polybutylene | $-NCS$ |
| $\phi C(CH_3)(C_2H_5)-$ | polybutylene | $-NCS$ |
| $\phi CH_2C(CH_3)_2-$ | polybutylene | $-NCS$ |
| $(CH_3)_3Si-$ | polybutylene | $-NCS$ |
| $(C_2H_5)_3Si-$ | polybutylene | $-NCS$ |
| $(CH_3)_2Si(C_2H_5)-$ | polybutylene | $-NCS$ |
| $(CH_3)Si(C_2H_5)_2-$ | polybutylene | $-NCS$ |
| $(C_3H_7)_3Si-$ | polybutylene | $-NCS$ |
| $\phi Si(CH_3)_2-$ | polybutylene | $-NCS$ |
| $(\phi)_2Si(CH_3)-$ | polybutylene | $-NCS$ |
| $\phi_3Si-$ | polybutylene | $-NCS$ |
| $(C_6H_{13})_3Si-$ | polybutylene | $-NCS$ |
| $(C_8H_{17})_3Si-$ | polybutylene | $-NCS$ |
| $H-$ | polypropylene | $-NCS$ |
| $CH_3$ | polypropylene | $-NCS$ |
| $C_2H_5-$ | polypropylene | $-NCS$ |
| $\phi CH_2-$ | polypropylene | $-NCS$ |
| $CH_3\phi-$ | polypropylene | $-NCS$ |
| $\phi-$ | polypropylene | $-NCS$ |
| $(CH_3)_2CH\phi-$ | polypropylene | $-NCS$ |
| 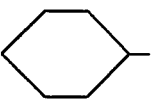 | polypropylene | $-NCS$ |
| $\phi C(CH_3)_2-$ | polypropylene | $-NCS$ |
| $\phi C(CH_3)(C_2H_5)-$ | polypropylene | $-NCS$ |
| $\phi CH_2C(CH_3)_2-$ | polypropylene | $-NCS$ |
| $(CH_3)_3Si-$ | polypropylene | $-NCS$ |
| $(C_2H_5)_3Si-$ | polypropylene | $-NCS$ |
| $(CH_3)_2Si(C_2H_5)-$ | polypropylene | $-NCS$ |
| $(CH_3)Si(C_2H_5)_2-$ | polypropylene | $-NCS$ |
| $(C_3H_7)_3Si-$ | polypropylene | $-NCS$ |
| $\phi Si(CH_3)_2-$ | polypropylene | $-NCS$ |
| $(\phi)_2Si(CH_3)-$ | polypropylene | $-NCS$ |
| $\phi_3Si-$ | polypropylene | $-NCS$ |
| $(C_6H_{13})_3Si-$ | polypropylene | $-NCS$ |
| $(C_8H_{17})_3Si-$ | polypropylene | $-NCS$ |
| $H-$ | polystyrene | $-NCS$ |
| $CH_3$ | polystyrene | $-NCS$ |
| $C_2H_5-$ | polystyrene | $-NCS$ |
| $\phi CH_2-$ | polystyrene | $-NCS$ |
| $CH_3\phi-$ | polystyrene | $-NCS$ |
| $\phi-$ | polystyrene | $-NCS$ |
| $(CH_3)_2CH\phi-$ | polystyrene | $-NCS$ |

TABLE A-continued

| R | Polyolefin | Y |
|---|---|---|
| 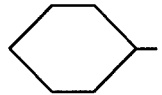 | polystyrene | $-NCS$ |
| $\phi C(CH_3)_2-$ | polystyrene | $-NCS$ |
| $\phi C(CH_3)(C_2H_5)-$ | polystyrene | $-NCS$ |
| $\phi CH_2C(CH_3)_2-$ | polystyrene | $-NCS$ |
| $(CH_3)_3Si-$ | polystyrene | $-NCS$ |
| $(C_2H_5)_3Si-$ | polystyrene | $-NCS$ |
| $(CH_3)_2Si(C_2H_5)-$ | polystyrene | $-NCS$ |
| $(CH_3)Si(C_2H_5)_2-$ | polystyrene | $-NCS$ |
| $(C_3H_7)_3Si-$ | polystyrene | $-NCS$ |
| $\phi Si(CH_3)_2-$ | polystyrene | $-NCS$ |
| $(\phi)_2Si(CH_3)-$ | polystyrene | $-NCS$ |
| $\phi_3Si-$ | polystyrene | $-NCS$ |
| $(C_6H_{13})_3Si-$ | polystyrene | $-NCS$ |
| $(C_8H_{17})_3Si-$ | polystyrene | $-NCS$ |
| $H-$ | polymethylstyrene | $-NCS$ |
| $CH_3$ | polymethylstyrene | $-NCS$ |
| $C_2H_5-$ | polymethylstyrene | $-NCS$ |
| $\phi CH_2-$ | polymethylstyrene | $-NCS$ |
| $CH_3\phi-$ | polymethylstyrene | $-NCS$ |
| $\phi-$ | polymethylstyrene | $-NCS$ |
| $(CH_3)_2CH\phi-$ | polymethylstyrene | $-NCS$ |
| | polymethylstyrene | $-NCS$ |
| $\phi C(CH_3)_2-$ | polymethylstyrene | $-NCS$ |
| $\phi C(CH_3)(C_2H_5)-$ | polymethylstyrene | $-NCS$ |
| $\phi CH_2C(CH_3)_2-$ | polymethylstyrene | $-NCS$ |
| $(CH_3)_3Si-$ | polymethylstyrene | $-NCS$ |
| $(C_2H_5)_3Si-$ | polymethylstyrene | $-NCS$ |
| $(CH_3)_2Si(C_2H_5)-$ | polymethylstyrene | $-NCS$ |
| $(CH_3)Si(C_2H_5)_2-$ | polymethylstyrene | $-NCS$ |
| $(C_3H_7)_3Si-$ | polymethylstyrene | $-NCS$ |
| $\phi Si(CH_3)_2-$ | polymethylstyrene | $-NCS$ |
| $(\phi)_2Si(CH_3)-$ | polymethylstyrene | $-NCS$ |
| $\phi_3Si-$ | polymethylstyrene | $-NCS$ |
| $(C_6H_{13})_3Si-$ | polymethylstyrene | $-NCS$ |
| $(C_8H_{17})_3Si-$ | polymethylstyrene | $-NCS$ |

When a poly-functional initiator is employed, such as the bifunctional initiator of Formula III above, the polymers will comprise terminal Y-groups on each end of the polymer and a "R" group within the polymer chain, e.g., substantially at the center of the polymer chain. Illustrative of the poly-substituted polymers of this invention therefore are those set forth in Table B below:

TABLE B

| Polyolefin | R | Y |
|---|---|---|
| polyisobutylene | $-C_3H_6-$ | $-N_3$ |
| polyisobutylene | $-C_4H_8-$ | $-N_3$ |
| polyisobutylene | $-C_5H_{10}-$ | $-N_3$ |
| polyisobutylene | $-C_6H_{12}-$ | $-N_3$ |
| polyisobutylene | $-C_8H_{16}-$ | $-N_3$ |
| polyisobutylene | $-C_{10}H_{20}-$ | $-N_3$ |
| polyisobutylene | $-C_{12}H_{24}-$ | $-N_3$ |
| polyisobutylene | $-C_{18}H_{36}-$ | $-N_3$ |
| polyisobutylene | $-C(Me)_2CH_2C(Me)_2-$ | $-N_3$ |
| polyisobutylene | $-CH(Et)C_3H_6-$ | $-N_3$ |
| polyisobutylene | $-C(Et)_2C_2H_4C(Et)_2-$ | $-N_3$ |

TABLE B-continued

| | Y-[polyolefin]-R-[polyolefin]-Y | |
|---|---|---|
| Polyolefin | R | Y |
| polyisobutylene | —Si(Me)$_2$CH$_2$Si(Me)$_2$— | —N$_3$ |
| polyisobutylene | —Si(Et)(Me)C$_2$H$_5$Si(Et)(Me)— | —N$_3$ |
| polyisobutylene | —Si(Et)$_2$C$_3$H$_6$Si(Et)$_2$— | —N$_3$ |
| polyisobutylene | —φ(Et)— | —N$_3$ |
| polyisobutylene | —CH$_2$CH(φ)- | —N$_3$ |
| polybutylene | —C$_3$H$_6$— | —N$_3$ |
| polybutylene | —C$_4$H$_8$— | —N$_3$ |
| polybutylene | —C$_5$H$_{10}$— | —N$_3$ |
| polybutylene | —C$_6$H$_{12}$— | —N$_3$ |
| polybutylene | —C$_8$H$_{16}$— | —N$_3$ |
| polybutylene | —C$_{10}$H$_{20}$— | —N$_3$ |
| polybutylene | —C$_{12}$H$_{24}$— | —N$_3$ |
| polybutylene | —C$_{18}$H$_{36}$— | —N$_3$ |
| polybutylene | —C(Me)$_2$CH$_2$C(Me)$_2$— | —N$_3$ |
| polybutylene | —CH(Et)C$_3$H$_6$— | —N$_3$ |
| polybutylene | —C(Et)$_2$C$_2$H$_4$C(Et)$_2$— | —N$_3$ |
| polybutylene | —Si(Me)$_2$CH$_2$Si(Me)$_2$— | —N$_3$ |
| polybutylene | —Si(Et)(Me)C$_2$H$_5$Si(Et)(Me)— | —N$_3$ |
| polybutylene | —Si(Et)$_2$C$_3$H$_6$Si(Et)$_2$— | —N$_3$ |
| polybutylene | —φ(Et)— | —N$_3$ |
| polybutylene | —CH$_2$CH(φ)- | —N$_3$ |
| polypropylene | —C$_3$H$_6$— | —N$_3$ |
| polypropylene | —C$_4$H$_8$— | —N$_3$ |
| polypropylene | —C$_5$H$_{10}$— | —N$_3$ |
| polypropylene | —C$_6$H$_{12}$— | —N$_3$ |
| polypropylene | —C$_8$H$_{16}$— | —N$_3$ |
| polypropylene | —C$_{10}$H$_{20}$— | —N$_3$ |
| polypropylene | —C$_{12}$H$_{24}$— | —N$_3$ |
| polypropylene | —C$_{18}$H$_{36}$— | —N$_3$ |
| polypropylene | —C(Me)$_2$CH$_2$C(Me)$_2$— | —N$_3$ |
| polypropylene | —CH(Et)C$_3$H$_6$— | —N$_3$ |
| polypropylene | —C(Et)$_2$C$_2$H$_4$C(Et)$_2$— | —N$_3$ |
| polypropylene | —Si(Me)$_2$CH$_2$Si(Me)$_2$— | —N$_3$ |
| polypropylene | —Si(Et)(Me)C$_2$H$_5$Si(Et)(Me)— | —N$_3$ |
| polypropylene | —Si(Et)$_2$C$_3$H$_6$Si(Et)$_2$— | —N$_3$ |
| polypropylene | —φ(Et)— | —N$_3$ |
| polypropylene | —CH$_2$CH(φ)- | —N$_3$ |
| polystyrene | —C$_3$H$_6$— | —N$_3$ |
| polystyrene | —C$_4$H$_8$— | —N$_3$ |
| polystyrene | —C$_5$H$_{10}$— | —N$_3$ |
| polystyrene | —C$_6$H$_{12}$— | —N$_3$ |
| polystyrene | —C$_8$H$_{16}$— | —N$_3$ |
| polystyrene | —C$_{10}$H$_{20}$— | —N$_3$ |
| polystyrene | —C$_{12}$H$_{24}$— | —N$_3$ |
| polystyrene | —C$_{18}$H$_{36}$— | —N$_3$ |
| polystyrene | —C(Me)$_2$CH$_2$C(Me)$_2$— | —N$_3$ |
| polystyrene | —CH(Et)C$_3$H$_6$— | —N$_3$ |
| polystyrene | —C(Et)$_2$C$_2$H$_4$C(Et)$_2$— | —N$_3$ |
| polystyrene | —Si(Me)$_2$CH$_2$Si(Me)$_2$— | —N$_3$ |
| polystyrene | —Si(Et)(Me)C$_2$H$_5$Si(Et)(Me)— | —N$_3$ |
| polystyrene | —Si(Et)$_2$C$_3$H$_6$Si(Et)$_2$— | —N$_3$ |
| polystyrene | —φ(Et)— | —N$_3$ |
| polystyrene | —CH$_2$CH(φ)- | —N$_3$ |
| polymethylstyrene | —C$_3$H$_6$— | —N$_3$ |
| polymethylstyrene | —C$_4$H$_8$— | —N$_3$ |
| polymethylstyrene | —C$_5$H$_{10}$— | —N$_3$ |
| polymethylstyrene | —C$_6$H$_{12}$— | —N$_3$ |
| polymethylstyrene | —C$_8$H$_{16}$— | —N$_3$ |
| polymethylstyrene | —C$_{10}$H$_{20}$— | —N$_3$ |
| polymethylstyrene | —C$_{12}$H$_{24}$— | —N$_3$ |
| polymethylstyrene | —C$_{18}$H$_{36}$— | —N$_3$ |
| polymethylstyrene | —C(Me)$_2$CH$_2$C(Me)$_2$— | —N$_3$ |
| polymethylstyrene | —CH(Et)C$_3$H$_6$— | —N$_3$ |
| polymethylstyrene | —C(Et)$_2$C$_2$H$_4$C(Et)$_2$— | —N$_3$ |
| polymethylstyrene | —Si(Me)$_2$CH$_2$Si(Me)$_2$— | —N$_3$ |
| polymethylstyrene | —Si(Et)(Me)C$_2$H$_5$Si(Et)(Me)— | —N$_3$ |
| polymethylstyrene | —Si(Et)$_2$C$_3$H$_6$Si(Et)$_2$— | —N$_3$ |
| polymethylstyrene | —φ(Et)— | —N$_3$ |
| polymethylstyrene | —CH$_2$CH(φ)- | —N$_3$ |
| polyisobutylene | —C$_3$H$_6$— | —NCO |
| polyisobutylene | —C$_4$H$_8$— | —NCO |
| polyisobutylene | —C$_5$H$_{10}$— | —NCO |
| polyisobutylene | —C$_6$H$_{12}$— | —NCO |
| polyisobutylene | —C$_8$H$_{16}$— | —NCO |
| polyisobutylene | —C$_{10}$H$_{20}$— | —NCO |
| polyisobutylene | —C$_{12}$H$_{24}$— | —NCO |
| polyisobutylene | —C$_{18}$H$_{36}$— | —NCO |
| polyisobutylene | —C(Me)$_2$CH$_2$C(Me)$_2$— | —NCO |
| polyisobutylene | —CH(Et)C$_3$H$_6$— | —NCO |
| polyisobutylene | —C(Et)$_2$C$_2$H$_4$C(Et)$_2$— | —NCO |
| polyisobutylene | —Si(Me)$_2$CH$_2$Si(Me)$_2$— | —NCO |
| polyisobutylene | —Si(Et)(Me)C$_2$H$_5$Si(Et)(Me)— | —NCO |
| polyisobutylene | —Si(Et)$_2$C$_3$H$_6$Si(Et)$_2$— | —NCO |
| polyisobutylene | —φ(Et)— | —NCO |
| polyisobutylene | —CH$_2$CH(φ)- | —NCO |
| polybutylene | —C$_3$H$_6$— | —NCO |
| polybutylene | —C$_4$H$_8$— | —NCO |
| polybutylene | —C$_5$H$_{10}$— | —NCO |
| polybutylene | —C$_6$H$_{12}$— | —NCO |
| polybutylene | —C$_8$H$_{16}$— | —NCO |
| polybutylene | —C$_{10}$H$_{20}$— | —NCO |
| polybutylene | —C$_{12}$H$_{24}$— | —NCO |
| polybutylene | —C$_{18}$H$_{36}$— | —NCO |
| polybutylene | —C(Me)$_2$CH$_2$C(Me)$_2$— | —NCO |
| polybutylene | —CH(Et)C$_3$H$_6$— | —NCO |
| polybutylene | —C(Et)$_2$C$_2$H$_4$C(Et)$_2$— | —NCO |
| polybutylene | —Si(Me)$_2$CH$_2$Si(Me)$_2$— | —NCO |
| polybutylene | —Si(Et)(Me)C$_2$H$_5$Si(Et)(Me)— | —NCO |
| polybutylene | —Si(Et)$_2$C$_3$H$_6$Si(Et)$_2$— | —NCO |
| polybutylene | —φ(Et)— | —NCO |
| polybutylene | —CH$_2$CH(φ)- | —NCO |
| polypropylene | —C$_3$H$_6$— | —NCO |
| polypropylene | —C$_4$H$_8$— | —NCO |
| polypropylene | —C$_5$H$_{10}$— | —NCO |
| polypropylene | —C$_6$H$_{12}$— | —NCO |
| polypropylene | —C$_8$H$_{16}$— | —NCO |
| polypropylene | —C$_{10}$H$_{20}$— | —NCO |
| polypropylene | —C$_{12}$H$_{24}$— | —NCO |
| polypropylene | —C$_{18}$H$_{36}$— | —NCO |
| polypropylene | —C(Me)$_2$CH$_2$C(Me)$_2$— | —NCO |
| polypropylene | —CH(Et)C$_3$H$_6$— | —NCO |
| polypropylene | —C(Et)$_2$C$_2$H$_4$C(Et)$_2$— | —NCO |
| polypropylene | —Si(Me)$_2$CH$_2$Si(Me)$_2$— | —NCO |
| polypropylene | —Si(Et)(Me)C$_2$H$_5$Si(Et)(Me)— | —NCO |
| polypropylene | —Si(Et)$_2$C$_3$H$_6$Si(Et)$_2$— | —NCO |
| polypropylene | —φ(Et)— | —NCO |
| polypropylene | —CH$_2$CH(φ)- | —NCO |
| polystyrene | —C$_3$H$_6$— | —NCO |
| polystyrene | —C$_4$H$_8$— | —NCO |
| polystyrene | —C$_5$H$_{10}$— | —NCO |
| polystyrene | —C$_6$H$_{12}$— | —NCO |
| polystyrene | —C$_8$H$_{16}$— | —NCO |
| polystyrene | —C$_{10}$H$_{20}$— | —NCO |
| polystyrene | —C$_{12}$H$_{24}$— | —NCO |
| polystyrene | —C$_{18}$H$_{36}$— | —NCO |
| polystyrene | —C(Me)$_2$CH$_2$C(Me)$_2$— | —NCO |
| polystyrene | —CH(Et)C$_3$H$_6$— | —NCO |
| polystyrene | —C(Et)$_2$C$_2$H$_4$C(Et)$_2$— | —NCO |
| polystyrene | —Si(Me)$_2$CH$_2$Si(Me)$_2$— | —NCO |
| polystyrene | —Si(Et)(Me)C$_2$H$_5$Si(Et)(Me)— | —NCO |
| polystyrene | —Si(Et)$_2$C$_3$H$_6$Si(Et)$_2$— | —NCO |
| polystyrene | —φ(Et)— | —NCO |
| polystyrene | —CH$_2$CH(φ)- | —NCO |
| polymethylstyrene | —C$_3$H$_6$— | —NCO |
| polymethylstyrene | —C$_4$H$_8$— | —NCO |
| polymethylstyrene | —C$_5$H$_{10}$— | —NCO |
| polymethylstyrene | —C$_6$H$_{12}$— | —NCO |
| polymethylstyrene | —C$_8$H$_{16}$— | —NCO |
| polymethylstyrene | —C$_{10}$H$_{20}$— | —NCO |
| polymethylstyrene | —C$_{12}$H$_{24}$— | —NCO |
| polymethylstyrene | —C$_{18}$H$_{36}$— | —NCO |
| polymethylstyrene | —C(Me)$_2$CH$_2$C(Me)$_2$— | —NCO |
| polymethylstyrene | —CH(Et)C$_3$H$_6$— | —NCO |
| polymethylstyrene | —C(Et)$_2$C$_2$H$_4$C(Et)$_2$— | —NCO |
| polymethylstyrene | —Si(Me)$_2$CH$_2$Si(Me)$_2$— | —NCO |
| polymethylstyrene | —Si(Et)(Me)C$_2$H$_5$Si(Et)(Me)— | —NCO |
| polymethylstyrene | —Si(Et)$_2$C$_3$H$_6$Si(Et)$_2$— | —NCO |
| polymethylstyrene | —φ(Et)— | —NCO |
| polymethylstyrene | —CH$_2$CH(φ)— | —NCO |
| polyisobutylene | —C$_3$H$_6$— | —NCS |

TABLE B-continued

| Polyolefin | R | Y |
|---|---|---|
| polyisobutylene | —C$_4$H$_8$— | —NCS |
| polyisobutylene | —C$_5$H$_{10}$— | —NCS |
| polyisobutylene | —C$_6$H$_{12}$— | —NCS |
| polyisobutylene | —C$_8$H$_{16}$— | —NCS |
| polyisobutylene | —C$_{10}$H$_{20}$— | —NCS |
| polyisobutylene | —C$_{12}$H$_{24}$— | —NCS |
| polyisobutylene | —C$_{18}$H$_{36}$— | —NCS |
| polyisobutylene | —C(Me)$_2$CH$_2$C(Me)$_2$— | —NCS |
| polyisobutylene | —CH(Et)C$_3$H$_6$— | —NCS |
| polyisobutylene | —C(Et)$_2$C$_2$H$_4$C(Et)$_2$— | —NCS |
| polyisobutylene | —Si(Me)$_2$CH$_2$Si(Me)$_2$— | —NCS |
| polyisobutylene | —Si(Et)(Me)C$_2$H$_5$Si(Et)(Me)— | —NCS |
| polyisobutylene | —Si(Et)$_2$C$_3$H$_6$Si(Et)$_2$— | —NCS |
| polyisobutylene | -φ(Et)— | —NCS |
| polyisobutylene | —CH$_2$CH(φ)- | —NCS |
| polybutylene | —C$_3$H$_6$— | —NCS |
| polybutylene | —C$_4$H$_8$— | —NCS |
| polybutylene | —C$_5$H$_{10}$— | —NCS |
| polybutylene | —C$_6$H$_{12}$— | —NCS |
| polybutylene | —C$_8$H$_{16}$— | —NCS |
| polybutylene | —C$_{10}$H$_{20}$— | —NCS |
| polybutylene | —C$_{12}$H$_{24}$— | —NCS |
| polybutylene | —C$_{18}$H$_{36}$— | —NCS |
| polybutylene | —C(Me)$_2$CH$_2$C(Me)$_2$— | —NCS |
| polybutylene | —CH(Et)C$_3$H$_6$— | —NCS |
| polybutylene | —C(Et)$_2$C$_2$H$_4$C(Et)$_2$— | —NCS |
| polybutylene | —Si(Me)$_2$CH$_2$Si(Me)$_2$— | —NCS |
| polybutylene | —Si(Et)(Me)C$_2$H$_5$Si(Et)(Me)— | —NCS |
| polybutylene | —Si(Et)$_2$C$_3$H$_6$Si(Et)$_2$— | —NCS |
| polybutylene | -φ(Et)— | —NCS |
| polybutylene | —CH$_2$CH(φ)— | —NCS |
| polypropylene | —C$_3$H$_6$— | —NCS |
| polypropylene | —C$_4$H$_8$— | —NCS |
| polypropylene | —C$_5$H$_{10}$— | —NCS |
| polypropylene | —C$_6$H$_{12}$— | —NCS |
| polypropylene | —C$_8$H$_{16}$— | —NCS |
| polypropylene | —C$_{10}$H$_{20}$— | —NCS |
| polypropylene | —C$_{12}$H$_{24}$— | —NCS |
| polypropylene | —C$_{18}$H$_{36}$— | —NCS |
| polypropylene | —C(Me)$_2$CH$_2$C(Me)$_2$— | —NCS |
| polypropylene | —CH(Et)C$_3$H$_6$— | —NCS |
| polypropylene | —C(Et)$_2$C$_2$H$_4$C(Et)$_2$— | —NCS |
| polypropylene | —Si(Me)$_2$CH$_2$Si(Me)$_2$— | —NCS |
| polypropylene | —Si(Et)(Me)C$_2$H$_5$Si(Et)(Me)— | —NCS |
| polypropylene | —Si(Et)$_2$C$_3$H$_6$Si(Et)$_2$— | —NCS |
| polypropylene | -φ(Et)— | —NCS |
| polypropylene | —CH$_2$CH(φ)- | —NCS |
| polystyrene | —C$_3$H$_6$— | —NCS |
| polystyrene | —C$_4$H$_8$— | —NCS |
| polystyrene | —C$_5$H$_{10}$— | —NCS |
| polystyrene | —C$_6$H$_{12}$— | —NCS |
| polystyrene | —C$_8$H$_{16}$— | —NCS |
| polystyrene | —C$_{10}$H$_{20}$— | —NCS |
| polystyrene | —C$_{12}$H$_{24}$— | —NCS |
| polystyrene | —C$_{18}$H$_{36}$— | —NCS |
| polystyrene | —C(Me)$_2$CH$_2$C(Me)$_2$— | —NCS |
| polystyrene | —CH(Et)C$_3$H$_6$— | —NCS |
| polystyrene | —C(Et)$_2$C$_2$H$_4$C(Et)$_2$— | —NCS |
| polystyrene | —Si(Me)$_2$CH$_2$Si(Me)$_2$— | —NCS |
| polystyrene | —Si(Et)(Me)C$_2$H$_5$Si(Et)(Me)— | —NCS |
| polystyrene | —Si(Et)$_2$C$_3$H$_6$Si(Et)$_2$— | —NCS |
| polystyrene | -φ(Et)— | —NCS |
| polystyrene | —CH$_2$CH(φ)- | —NCS |
| polymethylstyrene | —C$_3$H$_6$— | —NCS |
| polymethylstyrene | —C$_4$H$_8$— | —NCS |
| polymethylstyrene | —C$_5$H$_{10}$— | —NCS |
| polymethylstyrene | —C$_6$H$_{12}$— | —NCS |
| polymethylstyrene | —C$_8$H$_{16}$— | —NCS |
| polymethylstyrene | —C$_{10}$H$_{20}$— | —NCS |
| polymethylstyrene | —C$_{12}$H$_{24}$— | —NCS |
| polymethylstyrene | —C$_{18}$H$_{36}$— | —NCS |
| polymethylstyrene | —C(Me)$_2$CH$_2$C(Me)$_2$— | —NCS |
| polymethylstyrene | —CH(Et)C$_3$H$_6$— | —NCS |
| polymethylstyrene | —C(Et)$_2$C$_2$H$_4$C(Et)$_2$— | —NCS |
| polymethylstyrene | —Si(Me)$_2$CH$_2$Si(Me)$_2$— | —NCS |
| polymethylstyrene | —Si(Et)(Me)C$_2$H$_5$Si(Et)(Me)— | —NCS |
| polymethylstyrene | —Si(Et)$_2$C$_3$H$_6$Si(Et)$_2$— | —NCS |
| polymethylstyrene | -φ(Et)— | —NCS |
| polymethylstyrene | —CH$_2$CH(φ)- | —NCS |
| polyisobutylene | —C$_3$H$_6$— | —OCN |
| polyisobutylene | —C$_4$H$_8$— | —OCN |
| polyisobutylene | —C$_5$H$_{10}$— | —OCN |
| polyisobutylene | —C$_6$H$_{12}$— | —OCN |
| polyisobutylene | —C$_8$H$_{16}$— | —OCN |
| polyisobutylene | —C$_{10}$H$_{20}$— | —OCN |
| polyisobutylene | —C$_{12}$H$_{24}$— | —OCN |
| polyisobutylene | —C$_{18}$H$_{36}$— | —OCN |
| polyisobutylene | —C(Me)$_2$CH$_2$C(Me)$_2$— | —OCN |
| polyisobutylene | —CH(Et)C$_3$H$_6$— | —OCN |
| polyisobutylene | —C(Et)$_2$C$_2$H$_4$C(Et)$_2$— | —OCN |
| polyisobutylene | —Si(Me)$_2$CH$_2$Si(Me)$_2$— | —OCN |
| polyisobutylene | —Si(Et)(Me)C$_2$H$_5$Si(Et)(Me)— | —OCN |
| polyisobutylene | —Si(Et)$_2$C$_3$H$_6$Si(Et)$_2$— | —OCN |
| polyisobutylene | -φ(Et)— | —OCN |
| polyisobutylene | —CH$_2$CH(φ)- | —OCN |
| polybutylene | —C$_3$H$_6$— | —OCN |
| polybutylene | —C$_4$H$_8$— | —OCN |
| polybutylene | —C$_5$H$_{10}$— | —OCN |
| polybutylene | —C$_6$H$_{12}$— | —OCN |
| polybutylene | —C$_8$H$_{16}$— | —OCN |
| polybutylene | —C$_{10}$H$_{20}$— | —OCN |
| polybutylene | —C$_{12}$H$_{24}$— | —OCN |
| polybutylene | —C$_{18}$H$_{36}$— | —OCN |
| polybutylene | —C(Me)$_2$CH$_2$C(Me)$_2$— | —OCN |
| polybutylene | —CH(Et)C$_3$H$_6$— | —OCN |
| polybutylene | —C(Et)$_2$C$_2$H$_4$C(Et)$_2$— | —OCN |
| polybutylene | —Si(Me)$_2$CH$_2$Si(Me)$_2$— | —OCN |
| polybutylene | —Si(Et)(Me)C$_2$H$_5$Si(Et)(Me)— | —OCN |
| polybutylene | —Si(Et)$_2$C$_3$H$_6$Si(Et)$_2$— | —OCN |
| polybutylene | -φ(Et)— | —OCN |
| polybutylene | —CH$_2$CH(φ)- | —OCN |
| polypropylene | —C$_3$H$_6$— | —OCN |
| polypropylene | —C$_4$H$_8$— | —OCN |
| polypropylene | —C$_5$H$_{10}$— | —OCN |
| polypropylene | —C$_6$H$_{12}$— | —OCN |
| polypropylene | —C$_8$H$_{16}$— | —OCN |
| polypropylene | —C$_{10}$H$_{20}$— | —OCN |
| polypropylene | —C$_{12}$H$_{24}$— | —OCN |
| polypropylene | —C$_{18}$H$_{36}$— | —OCN |
| polypropylene | —C(Me)$_2$CH$_2$C(Me)$_2$— | —OCN |
| polypropylene | —CH(Et)C$_3$H$_6$— | —OCN |
| polypropylene | —C(Et)$_2$C$_2$H$_4$C(Et)$_2$— | —OCN |
| polypropylene | —Si(Me)$_2$CH$_2$Si(Me)$_2$— | —OCN |
| polypropylene | —Si(Et)(Me)C$_2$H$_5$Si(Et)(Me)— | —OCN |
| polypropylene | —Si(Et)$_2$C$_3$H$_6$Si(Et)$_2$— | —OCN |
| polypropylene | -φ(Et)— | —OCN |
| polypropylene | —CH$_2$CH(φ)- | —OCN |
| polystyrene | —C$_3$H$_6$— | —OCN |
| polystyrene | —C$_4$H$_8$— | —OCN |
| polystyrene | —C$_5$H$_{10}$— | —OCN |
| polystyrene | —C$_6$H$_{12}$— | —OCN |
| polystyrene | —C$_8$H$_{16}$— | —OCN |
| polystyrene | —C$_{10}$H$_{20}$— | —OCN |
| polystyrene | —C$_{12}$H$_{24}$— | —OCN |
| polystyrene | —C$_{18}$H$_{36}$— | —OCN |
| polystyrene | —C(Me)$_2$CH$_2$C(Me)$_2$— | —OCN |
| polystyrene | —CH(Et)C$_3$H$_6$— | —OCN |
| polystyrene | —C(Et)$_2$C$_2$H$_4$C(Et)$_2$— | —OCN |
| polystyrene | —Si(Me)$_2$CH$_2$Si(Me)$_2$— | —OCN |
| polystyrene | —Si(Et)(Me)C$_2$H$_5$Si(Et)(Me)— | —OCN |
| polystyrene | —Si(Et)$_2$C$_3$H$_6$Si(Et)$_2$— | —OCN |
| polystyrene | -φ(Et)— | —OCN |
| polystyrene | —CH$_2$CH(φ)- | —OCN |
| polymethylstyrene | —C$_3$H$_6$— | —OCN |
| polymethylstyrene | —C$_4$H$_8$— | —OCN |
| polymethylstyrene | —C$_5$H$_{10}$— | —OCN |
| polymethylstyrene | —C$_6$H$_{12}$— | —OCN |
| polymethylstyrene | —C$_8$H$_{16}$— | —OCN |
| polymethylstyrene | —C$_{10}$H$_{20}$— | —OCN |
| polymethylstyrene | —C$_{12}$H$_{24}$— | —OCN |

TABLE B-continued

Y-[polyolefin]-R-[polyolefin]-Y

| Polyolefin | R | Y |
|---|---|---|
| polymethylstyrene | —C$_{18}$H$_{36}$— | —OCN |
| polymethylstyrene | —C(Me)$_2$CH$_2$C(Me)$_2$— | —OCN |
| polymethylstyrene | —CH(Et)C$_3$H$_6$— | —OCN |
| polymethylstyrene | —C(Et)$_2$C$_2$H$_4$C(Et)$_2$— | —OCN |
| polymethylstyrene | —Si(Me)$_2$CH$_2$Si(Me)$_2$— | —OCN |
| polymethylstyrene | —Si(Et)(Me)C$_2$H$_5$Si(Et)(Me)— | —OCN |
| polymethylstyrene | —Si(Et)$_2$C$_3$H$_6$Si(Et)$_2$— | —OCN |
| polymethylstyrene | -φ(Et)— | —OCN |
| polymethylstyrene | —CH$_2$CH(φ)- | —OCN |
| polyisobutylene | —C$_3$H$_6$— | —SCN |
| polyisobutylene | —C$_4$H$_8$— | —SCN |
| polyisobutylene | —C$_5$H$_{10}$— | —SCN |
| polyisobutylene | —C$_6$H$_{12}$— | —SCN |
| polyisobutylene | —C$_8$H$_{16}$— | —SCN |
| polyisobutylene | —C$_{10}$H$_{20}$— | —SCN |
| polyisobutylene | —C$_{12}$H$_{24}$— | —SCN |
| polyisobutylene | —C$_{18}$H$_{36}$— | —SCN |
| polyisobutylene | —C(Me)$_2$CH$_2$C(Me)$_2$— | —SCN |
| polyisobutylene | —CH(Et)C$_3$H$_6$— | —SCN |
| polyisobutylene | —C(Et)$_2$C$_2$H$_4$C(Et)$_2$— | —SCN |
| polyisobutylene | —Si(Me)$_2$CH$_2$Si(Me)$_2$— | —SCN |
| polyisobutylene | —Si(Et)(Me)C$_2$H$_5$Si(Et)(Me)— | —SCN |
| polyisobutylene | —Si(Et)$_2$C$_3$H$_6$Si(Et)$_2$— | —SCN |
| polyisobutylene | -φ(Et)— | —SCN |
| polyisobutylene | —CH$_2$CH(φ)- | —SCN |
| polybutylene | —C$_3$H$_6$— | —SCN |
| polybutylene | —C$_4$H$_8$— | —SCN |
| polybutylene | —C$_5$H$_{10}$— | —SCN |
| polybutylene | —C$_6$H$_{12}$— | —SCN |
| polybutylene | —C$_8$H$_{16}$— | —SCN |
| polybutylene | —C$_{10}$H$_{20}$— | —SCN |
| polybutylene | —C$_{12}$H$_{24}$— | —SCN |
| polybutylene | —C$_{18}$H$_{36}$— | —SCN |
| polybutylene | —C(Me)$_2$CH$_2$C(Me)$_2$— | —SCN |
| polybutylene | —CH(Et)C$_3$H$_6$— | —SCN |
| polybutylene | —C(Et)$_2$C$_2$H$_4$C(Et)$_2$— | —SCN |
| polybutylene | —Si(Me)$_2$CH$_2$Si(Me)$_2$— | —SCN |
| polybutylene | —Si(Et)(Me)C$_2$H$_5$Si(Et)(Me)— | —SCN |
| polybutylene | —Si(Et)$_2$C$_3$H$_6$Si(Et)$_2$— | —SCN |
| polybutylene | -φ(Et)— | —SCN |
| polybutylene | —CH$_2$CH(φ)- | —SCN |
| polypropylene | —C$_3$H$_6$— | —SCN |
| polypropylene | —C$_4$H$_8$— | —SCN |
| polypropylene | —C$_5$H$_{10}$— | —SCN |
| polypropylene | —C$_6$H$_{12}$— | —SCN |
| polypropylene | —C$_8$H$_{16}$— | —SCN |
| polypropylene | —C$_{10}$H$_{20}$— | —SCN |
| polypropylene | —C$_{12}$H$_{24}$— | —SCN |
| polypropylene | —C$_{18}$H$_{36}$— | —SCN |
| polypropylene | —C(Me)$_2$CH$_2$C(Me)$_2$— | —SCN |
| polypropylene | —CH(Et)C$_3$H$_6$— | —SCN |
| polypropylene | —C(Et)$_2$C$_2$H$_4$C(Et)$_2$— | —SCN |
| polypropylene | —Si(Me)$_2$CH$_2$Si(Me)$_2$— | —SCN |
| polypropylene | —Si(Et)(Me)C$_2$H$_5$Si(Et)(Me)— | —SCN |
| polypropylene | —Si(Et)$_2$C$_3$H$_6$Si(Et)$_2$— | —SCN |
| polypropylene | -φ(Et)— | —SCN |
| polypropylene | —CH$_2$CH(φ)- | —SCN |
| polystyrene | —C$_3$H$_6$— | —SCN |
| polystyrene | —C$_4$H$_8$— | —SCN |
| polystyrene | —C$_5$H$_{10}$— | —SCN |
| polystyrene | —C$_6$H$_{12}$— | —SCN |
| polystyrene | —C$_8$H$_{16}$— | —SCN |
| polystyrene | —C$_{10}$H$_{20}$— | —SCN |
| polystyrene | —C$_{12}$H$_{24}$— | —SCN |
| polystyrene | —C$_{18}$H$_{36}$— | —SCN |
| polystyrene | —C(Me)$_2$CH$_2$C(Me)$_2$— | —SCN |
| polystyrene | —CH(Et)C$_3$H$_6$— | —SCN |
| polystyrene | —C(Et)$_2$C$_2$H$_4$C(Et)$_2$— | —SCN |
| polystyrene | —Si(Me)$_2$CH$_2$Si(Me)$_2$— | —SCN |
| polystyrene | —Si(Et)(Me)C$_2$H$_5$Si(Et)(Me)— | —SCN |
| polystyrene | —Si(Et)$_2$C$_3$H$_6$Si(Et)$_2$— | —SCN |
| polystyrene | -φ(Et)— | —SCN |
| polystyrene | —CH$_2$CH(φ)- | —SCN |
| polymethylstyrene | —C$_3$H$_6$— | —SCN |
| polymethylstyrene | —C$_4$H$_8$— | —SCN |
| polymethylstyrene | —C$_5$H$_{10}$— | —SCN |
| polymethylstyrene | —C$_6$H$_{12}$— | —SCN |
| polymethylstyrene | —C$_8$H$_{16}$— | —SCN |
| polymethylstyrene | —C$_{10}$H$_{20}$— | —SCN |
| polymethylstyrene | —C$_{12}$H$_{24}$— | —SCN |
| polymethylstyrene | —C$_{18}$H$_{36}$— | —SCN |
| polymethylstyrene | —C(Me)$_2$CH$_2$C(Me)$_2$— | —SCN |
| polymethylstyrene | —CH(Et)C$_3$H$_6$— | —SCN |
| polymethylstyrene | —C(Et)$_2$C$_2$H$_4$C(Et)$_2$— | —SCN |
| polymethylstyrene | —Si(Me)$_2$CH$_2$Si(Me)$_2$— | —SCN |
| polymethylstyrene | —Si(Et)(Me)C$_2$H$_5$Si(Et)(Me)— | —SCN |
| polymethylstyrene | —Si(Et)$_2$C$_3$H$_6$Si(Et)$_2$— | —SCN |
| polymethylstyrene | -φ(Et)— | —SCN |
| polymethylstyrene | —CH$_2$CH(φ)- | —SCN |
| polyisobutylene | —C$_3$H$_6$— | —CN |
| polyisobutylene | —C$_4$H$_8$— | —CN |
| polyisobutylene | —C$_5$H$_{10}$— | —CN |
| polyisobutylene | —C$_6$H$_{12}$— | —CN |
| polyisobutylene | —C$_8$H$_{16}$— | —CN |
| polyisobutylene | —C$_{10}$H$_{20}$— | —CN |
| polyisobutylene | —C$_{12}$H$_{24}$— | —CN |
| polyisobutylene | —C$_{18}$H$_{36}$— | —CN |
| polyisobutylene | —C(Me)$_2$CH$_2$C(Me)$_2$— | —CN |
| polyisobutylene | —CH(Et)C$_3$H$_6$— | —CN |
| polyisobutylene | —C(Et)$_2$C$_2$H$_4$C(Et)$_2$— | —CN |
| polyisobutylene | —Si(Me)$_2$CH$_2$Si(Me)$_2$— | —CN |
| polyisobutylene | —Si(Et)(Me)C$_2$H$_5$Si(Et)(Me)— | —CN |
| polyisobutylene | —Si(Et)$_2$C$_3$H$_6$Si(Et)$_2$— | —CN |
| polyisobutylene | -φ(Et)— | —CN |
| polyisobutylene | —CH$_2$CH(φ)- | —CN |
| polybutylene | —C$_3$H$_6$— | —CN |
| polybutylene | —C$_4$H$_8$— | —CN |
| polybutylene | —C$_5$H$_{10}$— | —CN |
| polybutylene | —C$_6$H$_{12}$— | —CN |
| polybutylene | —C$_8$H$_{16}$— | —CN |
| polybutylene | —C$_{10}$H$_{20}$— | —CN |
| polybutylene | —C$_{12}$H$_{24}$— | —CN |
| polybutylene | —C$_{18}$H$_{36}$— | —CN |
| polybutylene | —C(Me)$_2$CH$_2$C(Me)$_2$— | —CN |
| polybutylene | —CH(Et)C$_3$H$_6$— | —CN |
| polybutylene | —C(Et)$_2$C$_2$H$_4$C(Et)$_2$— | —CN |
| polybutylene | —Si(Me)$_2$CH$_2$Si(Me)$_2$— | —CN |
| polybutylene | —Si(Et)(Me)C$_2$H$_5$Si(Et)(Me)— | —CN |
| polybutylene | —Si(Et)$_2$C$_3$H$_6$Si(Et)$_2$— | —CN |
| polybutylene | -φ(Et)— | —CN |
| polybutylene | —CH$_2$CH(φ)- | —CN |
| polypropylene | —C$_3$H$_6$— | —CN |
| polypropylene | —C$_4$H$_8$— | —CN |
| polypropylene | —C$_5$H$_{10}$— | —CN |
| polypropylene | —C$_6$H$_{12}$— | —CN |
| polypropylene | —C$_8$H$_{16}$— | —CN |
| polypropylene | —C$_{10}$H$_{20}$— | —CN |
| polypropylene | —C$_{12}$H$_{24}$— | —CN |
| polypropylene | —C$_{18}$H$_{36}$— | —CN |
| polypropylene | —C(Me)$_2$CH$_2$C(Me)$_2$— | —CN |
| polypropylene | —CH(Et)C$_3$H$_6$— | —CN |
| polypropylene | —C(Et)$_2$C$_2$H$_4$C(Et)$_2$— | —CN |
| polypropylene | —Si(Me)$_2$CH$_2$Si(Me)$_2$— | —CN |
| polypropylene | —Si(Et)(Me)C$_2$H$_5$Si(Et)(Me)— | —CN |
| polypropylene | —Si(Et)$_2$C$_3$H$_6$Si(Et)$_2$— | —CN |
| polypropylene | -φ(Et)— | —CN |
| polypropylene | —CH$_2$CH(φ)- | —CN |
| polypropylene | —C$_3$H$_6$— | —CN |
| polystyrene | —C$_4$H$_8$— | —CN |
| polystyrene | —C$_5$H$_{10}$— | —CN |
| polystyrene | —C$_6$H$_{12}$— | —CN |
| polystyrene | —C$_8$H$_{16}$— | —CN |
| polystyrene | —C$_{10}$H$_{20}$— | —CN |
| polystyrene | —C$_{12}$H$_{24}$— | —CN |
| polystyrene | —C$_{18}$H$_{36}$— | —CN |
| polystyrene | —C(Me)$_2$CH$_2$C(Me)$_2$— | —CN |
| polystyrene | —CH(Et)C$_3$H$_6$— | —CN |
| polystyrene | —C(Et)$_2$C$_2$H$_4$C(Et)$_2$— | —CN |
| polystyrene | —Si(Me)$_2$CH$_2$Si(Me)$_2$— | —CN |
| polystyrene | —Si(Et)(Me)C$_2$H$_5$Si(Et)(Me)— | —CN |

TABLE B-continued

| | Y-[polyolefin]-R-[polyolefin]-Y | |
|---|---|---|
| Polyolefin | R | Y |
| polystyrene | —Si(Et)$_2$C$_3$H$_6$Si(Et)$_2$— | —CN |
| polystyrene | -φ(Et)— | —CN |
| polystyrene | —CH$_2$CH(φ)- | —CN |
| polymethylstyrene | —C$_3$H$_6$— | —CN |
| polymethylstyrene | —C$_4$H$_8$— | —CN |
| polymethylstyrene | —C$_5$H$_{10}$— | —CN |
| polymethylstyrene | —C$_6$H$_{12}$— | —CN |
| polymethylstyrene | —C$_8$H$_{16}$— | —CN |
| polymethylstyrene | —C$_{10}$H$_{20}$— | —CN |
| polymethylstyrene | —C$_{12}$H$_{24}$— | —CN |
| polymethylstyrene | —C$_{18}$H$_{36}$— | —CN |
| polymethylstyrene | —C(Me)$_2$CH$_2$C(Me)$_2$— | —CN |
| polymethylstyrene | —CH(Et)C$_3$H$_6$— | —CN |
| polymethylstyrene | —C(Et)$_2$C$_2$H$_4$C(Et)$_2$— | —CN |
| polymethylstyrene | —Si(Me)$_2$CH$_2$Si(Me)$_2$— | —CN |
| polymethylstyrene | —Si(Et)(Me)C$_2$H$_5$Si(Et)(Me)— | —CN |
| polymethylstyrene | —Si(Et)$_2$C$_3$H$_6$Si(Et)$_2$— | —CN |
| polymethylstyrene | -φ(Et)— | —CN |
| polymethylstyrene | —CH$_2$CH(φ)- | —CN |

The nitrogen functionalized polymeric material of the present invention are useful by incorporation and dissolution into an oleaginous material such as fuels and lubricating oils. When the polymers of this invention are used in normally liquid petroleum fuels such as middle distillates boiling from about 65° C. to 430° C., including kerosene, diesel fuels, home heating fuel oil, jet fuels, etc., a concentration of the polymers in the fuel in the range of typically from about 0.001 to about 0.5, and preferably 0.005 to about 0.15 wt. %, based on the total weight of the composition, will usually be employed. When the polymers of this invention are used in lubricating oils, a concentration of the polymers in the lubricating oil in the range of from about 0.01 to 15 wt. %, and preferably 0.5 to about 10 wt. %, based on the total weight of the lubricating composition, will usually be employed. The polymers may be employed in lubricating oil compositions which employ a base oil in which the polymers are dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the polymers of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the polymers of the present invention. These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, etc.

The polymers of this invention are also useful as polymerization additives, e.g. as cross-linking agents and polymerization comonomers, and the polymers can be employed to prepare molded or extruded articles such as films. The polymers of this invention are also useful components for the synthesis of block copolymers and star copolymers.

These polymer materials can be used as compatibilizer or as thermoplastic elastomers.

Functionalization

The polymers of the present invention include functional reaction products of the above-recited polymers containing nitrogen groups, particularly —N$_3$, —NCO, —OCN, —SCN, —CN and —NCS groups. Such functional reaction products are the reaction product of the nitrogen functional groups of the nitrogen-containing polymer with a functional reactant compound. This is illustrated by the reaction of —N$_3$ (azido) containing polymer derived from formula IV, where —Y is —N$_3$, i.e., (R(M)$_p$(—N$_3$))$_n$ where R, M, p and n are as defined above. For illustration purposes n shall equal one.

The azido R(M)$_p$—N$_3$ can be reacted to form functional reaction product polymers containing the following functional groups:

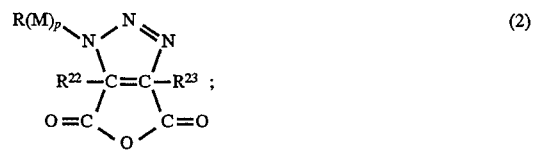   (1)

   (2)

$R(M)_pNR^{24}R^{25}$;   (3)

$R(M)_pC \equiv N$;   (4)

$R(M)_p - OH$;   (5)

$R(M)_pNCO$;   (6)

$R(M)_pR^{26}CONR^{27}R^{28}$;   (7)

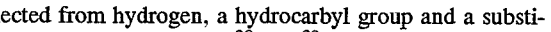   (8)

$R(M)_pN$;   (9)

$R(M)_pCH=NH$;   (10)

$R(M)_pN=NR(M)_p$;   (11)

$R(M)_pR^{33}NBX_2$; and   (12)

$R(M)_pNR^{33}$   (13)

wherein R$^{20}$ to R$^{33}$ are the same or different and can be selected from hydrogen, a hydrocarbyl group and a substituted hydrocarbyl group. R$^{20}$ to R$^{33}$ can be —H, and alkyl, aryl, alkylaryl, or arylalkyl group, X is a halide, preferably a chloride group. Useful R$^{20}$ to R$^{33}$ alkyl groups include C$_1$ to C$_{22}$ hydrocarbyl groups with methyl, ethyl, propyl and butyl groups being particularly useful.

Reactions of azides to prepare the above functional reactant product polymers include those of types known in the art. Typically, they can be conducted under mild conditions in a suitable solvent. A useful solvent is tetrahydrofuran (THF) at 0° C.–100° C. and about 1 atmosphere.

The above functional reactant azide polymeric compounds can be prepared according to methods analogous to those disclosed.

Bastide et al., *Cycloaddition dipolaire-1,3 aux alcynes,* Bulletin De La Societe Chimique De France Nos. 7–8, pp.

2555–2579 (1973), hereby incorporaed by reference, discloses a variety of reactions of azides beginning at p. 2574. A useful reaction of the present invention to form a polymer is triazole as follows:

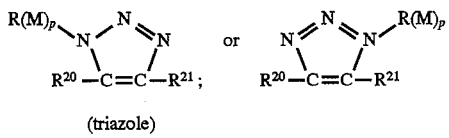

(triazole)

Such triazole are useful as lubricant additives.

Bastide et al., Cycloaddition dipolaire-1,3 aux alcynes, Bulletin De La Societe Chimique De France, Nos. 9–10, pp. 2871–2887 (1973), hereby incorporated by reference, discloses a variety of reactions including the reactions of triazoles. A useful reaction of the present invention is the reaction of an anhydride, preferably maleic anhydride with a triazole.

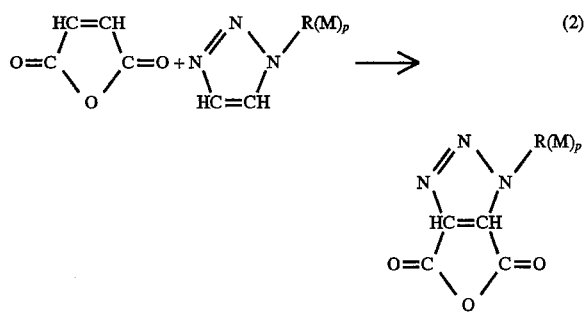

Compounds of formula (2) are useful as aditives to lubricant compositions. They can be further reacted with alcohols, metals, metal compounds and amines to form polymeric compounds which are also useful as lubricant additives.

Kazankov et al., J. Org. Chem. USSR 77,451 (1975) discloses the replacement of azo compounds. A useful replacement reaction involving the azide functionalized polymer of the present invention follows:

$$R(M)_p\text{---}N_3 + NR^{24}R^{25} \rightarrow R(M)_p\text{---}NR^{24}R^{25} \quad (3)$$

Preferably at least one of $R^{24}$ and $R^{25}$ is an —H group. With a preferred embodiment of formula (3) being $R(M)_p NH_2$. This amine can be used as an additive for lubricants. The conversion of azides to nitriles is disclosed in the Bull. Chem. Soc. of Japan, 49 p. 506 (1976) and the J. Org. Chem., Vol. 44, No. 16, p. 2951 (1976 ) hereby incorporated by reference. A useful reaction to decompose an azide of the present invention follows:

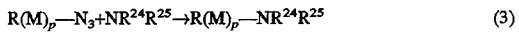

the $R(M)_p C\equiv N$ can be further reacted to form an amine, i.e., with $H_2$ to form $R(M)_p CNH_2$ \hspace{2em} (4)$^1$ The catalyst can be Pd or those referred to in the above publications. The amine is useful as an additive for lubricating oils.

An alternative and preferred method of producing amine derivatized polymer from azido functionalized polymer is by reducing the azido group to form an amine group. The reduction is preferably accomplished by reducing the azido functionalized polymer in the presence of a reducing catalyst to form the amine. Useful reducing catalysts include $LiAlH_4$, $CaH_2$ and the like, with $LiAlH_4$ most preferred. The reaction is preferably conducted in a suitable solvent for the polymer and the catalyst. A preferred solvent is a polar solvent such a tetrahydrofuran (THF). The reaction can be conducted at room temperature or under reflux conditions.

Knudsen et al., A Convenient One-Step Conversion of Aromatic Nitro Compounds to Phenols, J. Org. Chem., Vol. 39, No. 23, 1974, discloses conversion of phenolic azido to esters. A useful reaction of the present invention follows:

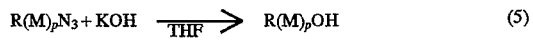

Other hydroxyl type bases and solvents for the base and polymer can be used with KOH preferred. The polymer containing hydroxyl group can be reacted with acids, i.e. carboxylic acids to form esters which are useful as additives for lubricating oil compositions.

Isocyanates can be formed by the reaction of azides and CO as disclosed in J. Am. Chem. soc. 90, 3295 (1968). A useful reaction of the present invention follows.

$$R(M)_p N_3 + CO \rightarrow R(M)_p NCO \quad (6)$$

The $R(M)_p NCO$ can be reacted with an amine to form $$R(M)_p NR^{26} CONR^{27} R^{28} \quad (7)$$

which is useful as a lubricant additive. Preferably $R^{26}$ is —H, and at least one of $R^{27}$ and $R^{28}$ is —H.

Nitrogens can be formed from azides by decomposing by heat or light.

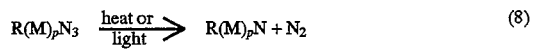

The J. Am. Soc. Chem. Comm., 1160 (1972) and Anderson et al., Addition of Nitrenes to Acetylene, Anti-aromaticity of 1-H-Azirines, Chemical Communications, 147 (1969) discloses chemistry related to the addition of nitrenes to acetylenes. The nitrene reacts with a compound having a carbon-carbon double bond as follows. A useful reaction of the present invention

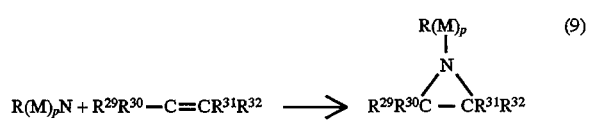

The nitrenes of formula (9) can rearrange to form imines. This type of chemistry is reviewed in Moriarty et al., The Direct and Photosensitized Decomposition of Alkyl Azides, Tetrahedron, 26, 1379 (1970) and J. Am. Chem. Soc. 93, 1537 (1971). A useful rearrangement reaction of the present invention follows:

$$R(M)_p CH_2\text{---}N \rightarrow RCH=NH \quad (10)$$

Dimerization reactions of nitrenes are reviewed in Smith, in Lwowsku; Nitrenes, Ref. 200, p. 112, pp. 405–419. A useful reaction of the present invention follows:

$$2R(M)_p N \rightarrow R(M)_p N=R(M)_p N \quad (11)$$

The J. Am. Chem. Soc. 94, p. 2114 (1973) and 95, 2394 (1973) disclose the reaction of azides with chloroboranes to form secondary amines. Useful reactions of the present invention follow:

$$R(M)_p BX_2 + R^{33}N_3 \longrightarrow R(M)_p R^{33}NBX_2 \quad (12)$$

$$R(M)_p R^{33}NBX_2 + H_2O + X^- + OH^- \longrightarrow RNHR^{33} \quad (13)$$

$$R(M)_p BX + RN_3 \xrightarrow[H_2O]{Et_2O} RNHR^{33} \quad (14)$$

The functionalized reactant product polymer can be used as a dispersant if the functional group contains the requisite polar group. However, derivatives of various of the functionalized polymers can be formed. These derivatized polymers have the requisite properties for uses such as dispersants and viscosity modifiers.

Derivatization

Reactant functional groups of the functionalized polymer can be reacted with derivative compounds to form derivatized polymers. The derivative compound comprises at least one reactive derivative group. The derivatized compound preferably contains at least one additional group which makes the derivatized group polar or reactive. Such derivatized polymers can contain amine groups, carboxyl groups or groups derived from reactive metal or reactive metal compounds. Various of the functional reactant product polymers can be further chemically modified to improve the polymer properties or impact desirable properties not otherwise present. A chemical moiety can be directly or indirectly reacted at various of the nitrogen-containing functional reactant groups included in formulae (1) to (14). Such modified, derivatized compounds include the reaction product of formula (2), particularly wherein the anhydride is maleic anhydride with derivative compounds, and formula (6) isocyanato with compounds containing carboxyl groups. The functionalized polymer having the amine groups of formulae (3) and (14), and alcohol groups of formula (5) can be used as directly, i.e. as dispersants or V.I. improvers for lubricating oil compositions or further derivatized with carboxyl-containing derivative compounds.

The derivatized polymer can include the reaction product of the above recited functionalized polymer (i.e. formula (2)) with a nucleophilic reactant such as amines, alcohols, amino-alcohols and mixtures thereof to form oil soluble salts, amides, imides, oxazoline and esters of mono- and dicarboxylic acids, esters or anhydrides. The derivatized polymers are useful as lubricant dispersants which maintain oil insolubles, resulting from oxidation during use, in suspension in the fluid thus preventing sludge flocculation and precipitation.

The compounds useful as dispersants generally are characterized by a "polar" group attached to a relatively high molecular weight hydrocarbon chain. The "polar" group generally contains up to 10 wt. %, and typically from 0.1 to 5 wt. %, one or more of the elements nitrogen, oxygen, sulfur and phosphorus. The solubilizing chains are generally higher in molecular weight than those employed with the metallic based dispersants, but in some instances they may be quite similar. Various types of dispersants can be made using the derivatized polymer of the present invention and are suitable for use in the lubricant compositions. The following are illustrative:

1. Reaction products of carboxylic acid or anhydride functionalized reactant polymer, i.e. formula (2) of the present invention (or derivatives thereof) derivatized with nitrogen-containing compounds such as amine, organic hydroxy compounds such as phenols and alcohols, and/or basic inorganic materials. More specifically, nitrogen- or ester-containing dispersants comprise members selected from the group consisting of oil-soluble salts, amides, imides, oxazolines and esters, or mixtures thereof, of the polymer of the present invention, functionalized (i.e. substituted with) mono- and dicarboxylic acids or anhydride or ester derivatives thereof.

2. Reaction products of the acid or anhydride derivatized polymer (formula (2)) of the present invention which have been halogenated.

3. Reaction products, or isocyanato derivatized polymer (formula (6)) to form urea, and alcohols to form urethanes. Such reactions are typically conducted by mixing the component with or without solvents (depending on molecular weight) at ambient conditions. Reference is made to Morton, Rubber Technology 2nd. Ed., Chapter 17, pp. 440. van Nostrand Reinhold Co. (1973), hereby incorporated by reference.

The derivatized living polymer can also be used to make ash and ashless type detergents. Typically, the living polymer for use as a detergent is an alkyl polymer having a number average molecular weight of from about 300 to 900. The ash-producing detergents are exemplified by oil-soluble neutral and basic salts of alkali or alkaline earth metals with alkyl derivatized polymers sulfonic acids, carboxylic acids, or organic phosphorus acids characterized by at least one direct carbon-to-phosphorus linkage such as those prepared by the derivatized olefin polymer of the present invention with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the derivatized polymer, such as with maleic anhydride (or acid). The commonly employed methods for preparing the basic salts involve heating a mineral oil solution of the polymer with a stoichiometric excess of a metal neutralizing agent such as metal oxide, hydroxide, carbonate, bicarbonate, or sulfide at a temperature of about 50° C. and filtering the resulting mass. The use of a "promoter" in the neutralization step to aid the incorporation of a large excess of metal likewise is known. Examples of compounds useful as the promoter include phenolic substance such as phenol, napthol, alkylphenol, thiophenol, sulfurized alkylphenol, and condensation products of formaldehyde with a phenolic substance; alcohols such as methanol, 2-propanol, octyl alcohol, cellosolve, ethylene glycol, stearyl alcohol, and cyclohexyl alcohol; and amines such as aniline, phenylenediamine, phenyl-beta-napthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60° C. to 200° C. This class of materials is discussed further hereinbelow in connection with detergents and metal rust inhibitors.

Preferred ash-producing detergents which can be derived from the functionalized reactant polymer of the present invention include the metal salts of sulfonic acid derivatives, preferably wherein the polymer is an alkyl compound, alkyl phenols, sulfurized alkyl phenols, alkyl salicylates, alkyl naphthenates and other oil soluble mono- and dicarboxylic acids. Highly basic (viz, overbased) metal salts, such as highly basic alkaline earth metal alkyl sulfonates (especially Ca and Mg salts) are frequently used as detergents. They are usually produced by heating a mixture comprising an oil-soluble sulfonate or alkaryl sulfonic acid, with an excess alkaline earth metal compound above that required for complete neutralization of any sulfonic acid present, and thereafter forming a dispersed carbonate complex reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with acid derivatized polymer.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to about 220%, although it is preferred to use at least 125% of the stoichiometric amount of metal required for complete neutralization.

Various other preparations of basic alkaline earth metal alkaryl sulfonates are known, such as those described in U.S. Pat. Nos. 3,150,088 and 3,150,089, wherein overbasing is accomplished by hydrolysis of an alkoxide-carbonate complex with the alkaryl sulfonate in a hydrocarbon solvent/diluent oil.

Amine Compounds

Useful amine compounds for derivatizing polymers having functional groups or reactive derivative groups comprise at least one amine and can comprise one or more additional amines or other reactive or polar groups. Where the reactant functional group is a carboxylic acid, ester or derivative thereof, or an isocyanato, it reacts with the amine to form an amide. Where the functional group is a halide the amine reacts to displace the halide. Where the reaction functional group is an isocyanate it reacts with an amine to form a urea, and an alcohol to form a urethane.

Amine compounds useful as nucleophilic reactants for reaction with the functionalized polymer of the present invention include those disclosed in U.S. Pat. Nos. 3,445,441, 5,017,299 and 5,102,566, all hereby incorporated by reference. Preferred amine compounds include mono- and (preferably) polyamines, of about 2 to 60, preferably 2 to 40 (e.g. 3 to 20), total carbon atoms of about 1 to 12, preferably 3 to 12, and most preferably 3 to 9 nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Hydroxy amines with 1 to 6 hydroxy groups, preferably 1 to 3 hydroxy groups, are particularly useful. Preferred amines are aliphatic saturated amines, including those of the general formulas:

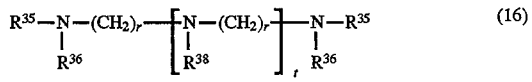

wherein $R^{35}$, $R^{36}$, $R^{37}$ and $R^{38}$ are independently selected from the group consisting of hydrogen; $C_1$ to $C_{25}$ straight or branched chain alkyl radicals; $C_1$ to $C_{12}$ alkoxy; $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein $R^{38}$ can additionally comprise a moiety of the formula:

$$\left[ (CH_2)_{r'} - \underset{R^{36}}{N} - \right]_{t'} H \qquad (17)$$

wherein $R^{36}$ is as defined above, and wherein r and r' can be the same or a different number of from 2 to 6, preferably 2 to 4; and t and t' can be the same or different and are numbers of from 0 to 10, preferably 2 to 7, and most preferably about 3 to 7. Preferably, the sum of t and t' is not greater than 15. To assure a facile reaction, it is preferred that $R^{35}$, $R^{36}$, $R^{37}$, $R^{38}$, r, r', t and t' be selected in a manner sufficient to provide the compounds of Formulas (15) and (16) with typically at least 1 primary or secondary amine group, preferably at least 2 primary or secondary amine groups. This can be achieved by selecting at least 1 of said $R^{35}$, $R^{36}$, $R^{37}$ and $R^{38}$ groups to be hydrogen or by letting t in formula (16) be at least 1 when $R^{38}$ is H or when the formula (17) moiety possesses a secondary amino group. The most preferred amine of the above formulas are represented by formula (16) and contain at least 2 primary amine groups and at least 1, and preferably at least 3, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene)triamine; N,N-dimethyl-1,3-diaminopropane; N,N-di-(2-aminoethyl) ethylene diamine; N,N-di-(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; and mixtures thereof. Monoamines include methyl ethyl amine, methyl octadecyl amines, anilines, diethylol amine, dipropyl amine, etc.

Other useful amine compounds include: alicyclic diamines such as 1,4-di(aminomethyl) cyclohexane, and heterocyclic nitrogen compounds such as imidazolines, and N-aminoalkyl piperazines of the general formula:

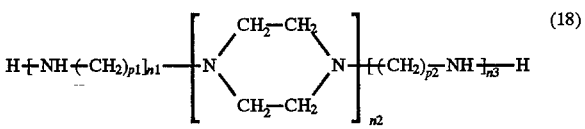

wherein $P_1$ and $P_2$ are the same or different and are each integers of from 1 to 4, and $n_1$, $n_2$ and $n_3$ are the same or different and are each integers of from 1 to 3. Nonlimiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamine) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formula:

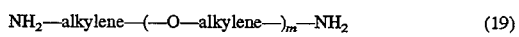  (19)

where m has a value of about 3 to 70 and preferably 10 to 35; and the formula:

  (20)

where n has a value of about 1 to 40 with the provision that the sum of all the n values is from about 3 to about 70 and preferably from about 6 to about 35, and $R^{39}$ is a polyvalent saturated hydrocarbon radical of up to 10 carbon atoms wherein the number of substituents on the $R^{38}$ group is represented by the value of "a", which is a number of from 3 to 6. The alkylene groups in either formula (19) or (20) may be straight or branched chains containing about 2 to 7, and preferably about 2 to 4 carbon atoms.

The polyoxyalkylene polyamines of formulas (19) or (20) above, preferably polyoxyalkylene diamines and polyoxyalkylene triamines, may have average molecular weights ranging from about 200 to about 4,000 and preferably from about 400 to about 2,000. The preferred polyoxyalkylene polyamines include the polyoxyethylene and polyoxypropylene diamines and the polyoxypropylene triamines having average molecular weights ranging from about 200 to 2,000. The polyoxyalkylene polyamines are commercially available and may be obtained, for example, from the Jefferson Chemical Company, Inc. under the trade name "Jeffamines D-230, D-400, D-1000, D-2000, T-403, etc.

A particularly useful class of amines are the polyamido and related amines disclosed in U.S. Pat. Nos. 4,857,217; 4,963,275 and 4,956,107, the disclosures of which are herey incorporated by reference, which comprise reaction products of a polyamine and an alpha, beta unsaturated compound of the formula:

  (21)

wherein X is sulfur or oxygen, Y is —$OR^{43}$, $SR^{43}$, or —$NR^{43}(R^{44})$, and $R^{40}$, $R^{41}$, $R^{42}$, $R^{43}$ and $R^{44}$ are the same or different and are hydrogen or substituted or unsubstituted hydrocarbyl. Any polyamine, whether aliphatic, cycloaliphatic, aromatic, heterocyclic, etc., can be employed provided it is capable of adding across the acrylic double bond and amidifying with, for example, the carbonyl group (—C(O)—) of the acrylate-type compound of formula (21), or with the thiocarbonyl group (—C(S)—) of the thioacrylate-type compound of formula (21).

When $R^{40}$, $R^{41}$, $R^{42}$, $R^{43}$ or $R^{44}$ in Formula (21) are hydrocarbyl, these groups can comprise alkyl, cycloalkyl, aryl, alkaryl, aralkyl or. heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of $R^{40}$ through $R^{44}$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $R^{40}$ through $R^{44}$ are aryl, the aryl group will generally contain from 6 to 10 carbon atoms (e.g., phenyl, naphthyl).

When one or more of $R^{40}$ through $R^{44}$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $R^{40}$ through $R^{44}$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $R^{40}$ through $R^{44}$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $R^{40}$ through $R^{44}$ are heterocyclic, the heterocyclic group generally consists of a compound having at least one ring of 6 to 12 members in which one or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

  (22)

wherein $R^{40}$, $R^{41}$, $R^{42}$ and $R^{43}$ are the same or different and are hydrogen or substituted or unsubstituted hydrocarbyl as defined above. Examples of such alpha, beta-ethylenically unsaturated carboxylate compounds of formula (22) are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl-2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate and the like.

The alpha, beta ethylenically unsaturated carboxylate thioester compounds employed herein have the following formula:

  (23)

wherein $R^{40}$, $R^{41}$, $R^{42}$ and $R^{43}$ are the same or different and are hydrogen or substituted or unsubstituted hydrocarbyl as defined above. Examples of such alpha, beta-ethylenically unsaturated carboxylate thioesters of formula (23) are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate and the like.

The alpha, beta-ethylenically unsaturated carboxyamide compounds employed herein have the following formula:

wherein $R^{40}$, $R^{41}$, $R^{42}$, $R^{43}$ and $R^{44}$ are the same or different and are hydrogen or substituted or unsubstituted hydrocarbyl as defined above. Examples of alpha, beta-ethylenically unsaturated carboxyamides of formula (24) are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

wherein $R^{40}$, $R^{41}$, $R^{42}$ and $R^{43}$ are the same or different and are hydrogen or substituted or unsubstituted hydrocarbyl as defined above. Examples of alpha, beta-ethylenically unsaturated thiocarboxylate compounds of formula (25) are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate and the like.

The alpha, beta ethylenically unsaturated dithioic acid and acid ester compounds employed herein have the following formula:

wherein $R^{40}$, $R^{41}$, $R^{42}$ $R^{43}$ and are the same or different and are hydrogen or substituted or unsubstituted hydrocarbyl as defined above. Examples of alpha, beta-ethylenically unsaturated dithioic acids and acid esters of formula (26) are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclo- hexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate and the like.

The alpha, beta ethylenically unsaturated thiocarboxyamide compounds employed herein have the following formula:

wherein $R^{40}$, $R^{41}$, $R^{42}$, $R^{43}$ and $R^{44}$ are the same or different and are hydrogen or substituted or unsubstituted hydrocarbyl as defined above. Examples of alpha, beta-ethylenically unsaturated thiocarboxyamides of formula (27) are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

where $R^{42}$ is hydrogen or a $C_1$ to $C_4$ alkyl group, such as methyl, and $R^{43}$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate. When the selected alpha, beta-unsaturated compound comprises a compound of formula (21) wherein X is oxygen, the resulting reaction product with the polyamine contains at least one amido linkage (—C(O)N<) and such materials are herein termed "amido-amines". Similarly, when the selected alpha, beta unsaturated compound of formula (21) comprises a compound wherein X is sulfur, the resulting reaction product with the polyamine contains thioamide linkage (—C(S)N<) and these materials are herein termed "thioamido-amines". For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula (21) tends to yield an amido-amine which is more cross-linked than that obtained where substantially equimolar amounts of reactants are employed. Where, for economic or other reasons, a cross-linked amido-amine using excess amine is desired, generally a molar excess of the ethylenically unsaturated reactant of about at least 10%, such as 10 to 300%, or greater, for example, 25 to 200%, is employed. For more efficient cross-linking an excess of carboxylated material should preferably be used since a cleaner reaction ensues. For example, a molar excess of about 10 to 100% or greater such as 10 to 50%, but preferably an excess of 30 to 50%, of the carboxylated material. Larger excess can be employed if desired.

In summary, without considering other factors, equimolar amounts of reactants tend to produce a more linear amido-amine whereas excess of the formula (21) reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

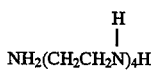

has more labile hydrogens than ethylene diamine.

These amido-amine adducts so formed are characterized by both amido and amino groups. In their simplest embodiments they may be represented by units of the following idealized formula:

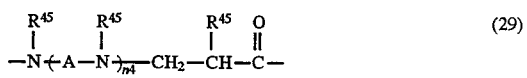

wherein the $R^{45}$'s, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and n4 is an integer such as 1 to 10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines are not cross-linked to any substantial degree, and more preferably are substantially linear.

Preferably, the polyamine reactant contains at least one primary amine, and more preferably from 2 to 4 primary amines, group per molecule, and the polyamine and the unsaturated reactant of formula (21) are contacted in an amount of from about 1 to 10, more preferably from about 2 to 6, and most preferably from about 3 to 5, equivalents of primary amine in the polyamine reactant per mole of the unsaturated reactant of formula (21).

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80° C. to 90° C., for a suitable period of time, such as a few hours. Where an acrylic-type ester is employed, the progress of the reaction can be judged by the removal of the alcohol in forming the amide.

During the early part of the reaction, alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yields of at least 95% are generally obtained.

Similarly, it will be understood that the reaction of an ethylenically unsaturated carboxylate thioester of formula (23) liberates the corresponding $HSR^{43}$ compound (e.g., $H_2S$ when $R^{43}$ is hydrogen) as a by-product, and of formula (24) liberates the corresponding $HNR^{43}$ ($R^{44}$ compound (e.g., ammonia when $R^{43}$ and $R^{44}$ are each hydrogen) as a by-product.

The reaction time to form an amido-amine material can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed. Although one can employ a solvent, the reaction can be run without the use of any solvent. In fact, where a high degree of cross-linking is desired, it is preferably to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentaamine (TEPA) with methyl methacrylate can be illustrated as follows:

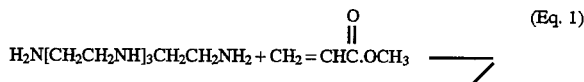 (Eq. 1)

The amine compound can be reacted with the functionalized polymer by heating an oil solution containing 5 to 95 wt. % of functionalized polymer to about 100° C. to 200° C., preferably 125° C. to 175° C., generally for 1 to 10, e.g. 2 to 6 hours until the desired amount of water is removed. The heating is preferably carried out to favor formation of imides or mixtures of imides and amides, rather than amides and salts. Reaction ratios of dicarboxylic acid material to equivalents of amine as well as the other nucleophilic reactants described herein can vary considerably, depending upon the reactants and type of bonds formed. Generally from 0.1 to 1.0, preferably about 0.2 to 0.6, e.g. 0.4 to 0.6, moles of functionalized groups present in the functionalized polymer is used, per equivalent of nucleophilic reactant, e.g. amine. For example, for imide formation, about 0.8 mole of a pentamine (having two primary amino groups and 5 equivalents of nitrogen per molecule) is preferably used to convert polymer functionalized with succinic anhydride into a mixture of amides and imides, i.e. preferably the pentamine is used in an amount sufficient to provide about 0.8 mole (that is (2) (1.6)/[0.8×5] mole) of carboxy functional groups (0.4 moles of succinic groups) per nitrogen equivalent of the amine.

Tris(hydroxymethyl) amino methane (THAM) can be reacted with the aforesaid functionalized polymers to form amides, imides or ester type additives as taught by U.K. 984,409, or to form oxazoline compounds and borated oxazoline compounds as described, for example, in U.S. Pat. Nos. 4,102,798; 4,116,876 and 4,113,639.

Derivatized Polymers From Alcohols

The polymers of the present invention functionalized with acid groups, i.e. formula (2), can be reacted with alcohols to form esters. The alcohols may be aliphatic compounds such as monohydric and polyhydric alcohols or aromatic compounds such as phenols and naphthols. The polymer containing isocyanato functionality reacted with alcohols to form urethanes. Following are useful alcohols.

The aromatic hydroxy compounds from which the esters may be derived are illustrated by the following specific examples: phenol, beta-naphthol, alpha-naphthol, cresol, resorcinol, catechol, p,p'di-hydroxybiphenyl, 2-chlorophenol, 2,4-dibutylphenol, propene tetramer-substituted phenol, didodecylphenol, 4,4'-methylene-bisphenol, alpha-decyl-beta-naphthol, polyisobutene (molecular weight of 1000)-substituted phenol, the condensation product of heptylphenol with 0.5 mole of formaldehyde, the condensation product of octyl-phenol with acetone, di(hydroxyphenyl)-oxide, di(hydroxyphenyl) sulfide, di(hydroxyphenyl)disulfide, and 4-cyclohexylphenol. Phenol and alkylated phenols having up to three alkyl substituents are preferred.

The alcohols from which the esters may be derived preferably contain up to about 40 aliphatic carbon atoms. They may be monohydric alcohols such as methanols, ethanol, isooctanol, dodecanol, cyclohexanol, cyclopentanol, behenyl alcohol, hexatriacontanol, neopentyl alcohol, isobutyl alcohol, benzyl alcohol, beta-phenyl-ethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, secpentyl alcohol, tertbutyl alcohol, 5-bromo-dodecanol, nitro-octadecanol and dioleate of glycerol. The polyhydric alcohols preferably contain from 2 to about 10 hydroxy radicals. They are illustrated by, for example, ethylene glycol, diethylene glycol, triethylene glycol, tetraethylene glycol, dipropylene glycol, tripropylene glycol, dibutylene glycol, tributylene glycol, and other alkylene glycols in which the alkylene radical contains from 2 to about 8 carbon atoms. Other useful polyhydric alcohols include glycerol, monooleate of glycerol, monostearate of glycerol, monomethyl ether of glycerol, pentaerythritol, 9,10-dihydroxy stearic acid, methyl ester of 9,10-dihydroxy stearic acid, 1,2-butanediol, 2,3-hexanediol, 2,4-hexanediol, penacol, erythritol, arabitol, sorbitol, mannitol, 1,2-cyclo-hexanediol, and xylene glycol. Carbohydrates such as sugars, starches, cellulose, etc., likewise may yield the esters of this invention. The carbohydrates may be exemplified by a glucose, fructose, sucrose, rhamnose, mannose, glyceraldehyde, and galactose.

A useful class of polyhydric alcohols are those having at least three hydroxy radicals, some of which have been esterified with a monocarboxylic acid having from about 8 to about 30 carbon atoms, such as octanoic acid, oleic acid, stearic acid, linoleic acid, dodecanoic acid, or tall oil acid. Examples of such partially esterified polyhydric alcohols are the monooleate of sorbitol, distearate of sorbitol, monooleate of glycerol, monostearate of glycerol, di-dodecanoate of erythritol.

The esters and urethanes may also be derived from unsaturated alcohols such as allyl alcohol, cinnamyl alcohol, propargyl alcohol, 1-cyclohexene-3-ol, an oleyl alcohol. Still another class of the alcohols capable of yielding the esters of this invention comprise the ether-alcohols and amino-alcohols including, for example, the oxyalkylene-, oxyarylene-, amino-alkylene-, and amino-arylene-substituted alcohols having one or more oxyalkylene, amino-alkylene or amino-arylene oxyarylene radicals. They are exemplified by Cellosolve, carbitol, phenoxyethanol, heptylphenyl-(oxypropylene)6-H, octyl-(oxyethylene)30-H, phenyl-(oxyoctylene)2-H, mono(heptylphenyl-oxypropylene)-substituted glycerol, poly(styrene oxide), aminoethanol, 3-amino ethyl-pentanol, di(hydroxyethyl) amine, p-amino-phenol, tri(hydroxypropyl)amine, N-hydroxyethyl ethylene diamine, N,N,N', N'-tetrahydroxy-triraethylene diamine, and the like. For the most part, the ether-alcohols having up to about 150 oxyalkylene radicals in which the alkylene radical contains from 1 to about 8 carbon atoms are preferred.

The esters may be diesters, e.g., of succinic acids or acidic esters, i.e., partially esterified polyhydric alcohols or phenols, i.e., esters having free alcoholic or phenolic hydroxyl radicals. Mixtures of the above-illustrated esters likewise are contemplated within the scope of the invention.

The esters may be prepared by one of several methods. The method which is preferred because of convenience and superior properties of the esters it produces, involves the reaction of a suitable alcohol or phenol with the acid or anhydride (i.e., functionalized polymer succinic anhydride). The esterification is usually carried out at a temperature above about 100° C., preferably between 150° C. and 300° C.

The water formed as a by-product is removed by distillation as the esterification proceeds. A solvent may be used in the esterification to facilitate mixing and temperature control. It also facilitates the removal of water from the reaction mixture. The useful solvents include xylene, toluene, diphenyl ether, chlorobenzene, and mineral oil.

A modification of the above process involving dicarboxylic acid involves the replacement of, for example, the succinic anhydride with the corresponding succinic acid as a functionalized compound. However, succinic acids readily undergo dehydration at temperatures above about 100° C. and are thus converted to their anhydrides which are then esterified by the reaction with the alcohol reactant. In this regard, succinic acids appear to be the substantial equivalents of their anhydrides in the process.

The relative proportions of the carboxylic acid or isocyanato functionalized polymer and the hydroxy reactant which are to be used depend to a large measure upon the type of the product desired, the functionality of the functionalized polymer, and the number of hydroxyl groups present in the molecule of the hydroxy reactant. For instance, the formation of a half ester of a succinic acid, i.e., one in which only one of the two acid radicals is esterified, involves the use of one mole of a monohydric alcohol for each mole of the succinic functional group, whereas the formation of a diester of a succinic acid involves the use of two moles of the alcohol for each mole of the acid functional group. On the other hand, one mole of a hexahydric alcohol may combine with as many as six moles of a di-acid to form an ester in which each of the six hydroxyl radicals of the alcohol is esterified with one of the two acid radicals of the succinic acid. Thus, the maximum proportion of functional groups to be used with a polyhydric alcohol is determined by the number of hydroxyl groups present in the molecule of the hydroxy reactant. Esters obtained by the reaction of stoichiometric amounts of the acid reactant and hydroxy reactant are preferred.

In some instances, it is advantageous to carry out the esterification in the presence of a catalyst such as sulfuric acid, pyridine hydrochloride, hydrochloric acid, benzenesulfonic acid, p-toluenesulfonic acid, phosphoric acid, or any other known esterification catalyst. The amount of the catalyst in the reaction may be as little as 0.01% (by weight of the reaction mixture), more often from about 0.1% to about 5%.

Ester derivatives likewise may be obtained by the reaction of acid or anhydride functionalized polymer with epoxide or a mixture of an epoxide and water. Such reaction is similar to one involving the acid or anhydride with a glycol. For instance, the product may be prepared by the reaction of a functionalized polymer with alkylene oxide to yield half esters, monoesters or diesters.

Epoxides which are commonly available for use in such reaction include, for example, ethylene oxide, propylene oxide, styrene oxide, 1,2-butylene oxide, 2,3-butylene oxide, epichlorohydrin, cyclohexene oxide, 1,2-octylene oxide, epoxidized soya bean oil, methyl ester of 9,10-epoxystearic acid, and butadiene monoepoxide. Preferred epoxides are the alkylene oxides in which the alkylene radical has from 2 to about 8 carbon atoms; or the epoxidized fatty acid esters in which the fatty acid radical has up to about 30 carbon atoms and the ester radical is derived from a lower alcohol having up to about 8 carbon atoms.

In lieu of the acid functionalized polymer, a polymer functionalized with lactone acid or a acid halide may be used in the processes illustrated above for preparing the ester derivatives of this invention. Such acid halides may be acid dibromides, acid dichlorides, acid monochlorides, and acid monobromides.

Where the carboxylic derivative compositions produced are esters, such esters include acidic esters and neutral esters. Acidic esters are those in which less than all of the functional groups in the functionalized polymer are esterified, and hence possess at least one free functional group. Obviously, acid esters are easily prepared by using an amount of alcohol insufficient to esterify all of the functional groups of the functionalized polymer.

The functionalized, e.g. acid functionalized, polymers of this invention are reacted with the alcohols according to conventional esterification techniques. This normally involves heating the functionalized polymer with the alcohol, optionally in the presence of a normally liquid, substantially inert, organic liquid solvent/diluent and/or in the presence of esterification catalyst. Temperatures of at least about 100° C. up to the decomposition point are used (the decomposition point having been defined hereinbefore). This temperature is usually within the range of about 100° C. up to about 300° C. with temperatures of about 140° C. to 250° C. often being employed.

Many issued patents disclose procedures for reacting high molecular weight carboxylic acids with alcohols to produce acidic esters and neutral esters. These same techniques are applicable to preparing esters from the functionalized polymer of this invention and the alcohols described above. All that is required is that the acylating reagents of this invention are substituted for the high molecular weight carboxylic acid acylating agents discussed in these patents, usually on an equivalent weight basis. The following U.S. Patents are expressly incorporated herein by reference for their disclosure of suitable methods for reacting the acylating reagents of this invention with the alcohols described above: U.S. Pat. Nos. 3,331,776; 3,381,022; 3,522,179; 3,542,680; 3,697,428 and 3,755,169.

Derivatized Polymers From Reactive Metals/Metal Compounds

Useful reactive metals or reactive metal compounds are those which will form metal salts or metal-containing complexes with the functionalized polymer. Metal complexes are typically achieved by reacting the carboxyl functionalized polymers with amines and/or alcohols as discussed above, and also with complex forming reactants either during or subsequent to amination.

Reactive metal compounds for use in the formation of complexes with the reaction products of functionalized polymer and amines include those disclosed in U.S. Pat. No. 3,306,908. Complex-forming metal reactants include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc). These metals are the so-called transition or coordination metals, i.e., they are capable of forming complexes by means of their secondary or coordination valence. Specific examples of the complex-forming metal compounds useful as the metal reactant are cobaltous nitrate, cobaltous oxide, cobaltic oxide, cobalt nitrite, cobaltic phosphate, cobaltous chloride, cobaltic chloride, cobaltous carbonate, chromous acetate, chromic acetate, chromic bromide, chromous chloride, chromic fluoride, chromous oxide, chromium dioxide, chromic oxide, chromic sulfite, chromous sulfate heptahydrate, chromic sulfate, chromic formate, chromic hexanoate, chromium oxychloride, chromic phosphite, manganous acetate, manganous benzoate, manganous carbonate, manganese dichloride, manganese trichloride, manganous citrate, manganous formate, manganous nitrate, manganous oxalate, manganese monooxide, manganese dioxide, manganese trioxide, manganese heptoxide, manganic phosphate, manganous pyrophosphate, manganic metaphosphate, manganous hypophosphite, manganous valerate, ferrous acetate, ferric benzoate, ferrous bromide, ferrous carbonate, ferric formate, ferrous lactate, ferrous nitrate, ferrous oxide, ferric oxide, ferric hypophosphite, ferric sulfate, ferrous sulfite, ferric hydrosulfite, nickel dibromide, nickel dichloride, nickel nitrate, nickel dioleate, nickel stearate, nickel sulfite, cupric propionate, cuptic acetate, cupric metaborate, cupric benzoate, cupric formate, cupric laurate, cupric nitrite; cupric oxychloride, cuptic palmitate, cupric salicylate, zinc benzoate, zinc borate, zinc bromide, zinc chromate, zinc dichromate, zinc iodide, zinc lactate, zinc nitrate, zinc oxide, zinc stearate, zinc sulfite, cadmium benzoate, cadmium carbonate, cadmium butyrate, cadmium chloroacetate, cadmium fumerate, cadmium nitrate, cadmium dihydrogenphosphate, cadmium sulfite, and cadmium oxide. Hydrates of the above compounds are especially convenient for use in the process of this invention.

U.S. Pat. No. 3,306,908 is expressly incorporated herein by reference for its discussion of reactive metal compounds suitable for forming such complexes and its disclosure of processes for preparing the complexes. Basically, those processes are applicable to the carboxylic derivative compositions of the functionalized polymer of this invention with the amines as described above by substituting, or on an equivalent basis, the functionalized polymer of this invention with the high molecular weight carboxylic acid functionalized polymer disclosed in U.S. Pat. No. 3,306,908.

U.S. Pat. No. Re. 26,433 discloses metals useful in preparing salts from acid functionalized polymer and/or an amine derivatized polymer as described hereinabove. Metal salts are prepared, according to this patent, from alkali metals, alkaline earth metals, zinc, cadmium, lead, cobalt and nickel. Examples of a reactive metal compound suitable for use are sodium oxide, sodium hydroxide, sodium carbonate, sodium methylate, sodium propylate, sodium pentylate, sodium phenoxide, potassium oxide, potassium hydroxide, potassium carbonate, potassium methylate, potassium pentylate, potassium phenoxide, lithium oxide, lithium hydroxide, lithium carbonate, lithium pentylate, calcium oxide, calcium hydroxide, calcium carbonate, calcium methylate, calcium ethylate, calcium propylate, calcium chloride, calcium fluoride, calcium pentylate, calcium phenoxide, calcium nitrate, barium oxide, barium hydroxide, barium carbonate, barium chloride, barium fluoride, barium methylate, barium propylate, barium pentylate, barium nitrate, magnesium oxide, magnesium hydroxide, magnesium carbonate, magnesium ethylate, magnesium propylate, magnesium chloride, magnesium bromide, barium, iodide, magnesium phenoxide, zinc oxide, zinc hydroxide, zinc carbonate, zinc methylate, zinc propylate, zinc pentylate, zinc chloride, zinc fluoride, zinc nitrate trihydrate, cadmium oxide, cadmium hydroxide, cadmium carbonate, cadmium methylate, cadmium propylate, cadmium chloride, cadmium bromide, cadmium fluoride, lead oxide, lead hydroxide, lead carbonate, lead ethylate, lead pentylate, lead chloride, lead fluoride, lead iodide, lead nitrate, nickel oxide, nickel hydroxide, nickel carbonate, nickel chloride, nickel bromide, nickel fluoride, nickel methylate, nickel pentylate, nickel nitrate hexahydrate, cobalt oxide, cobalt hydroxide, cobaltous bromide, cobaltous chloride, cobalt butylate, cobaltous nitrate hexahydrate, etc. The above metal compounds are merely illustrative of those useful in this invention and the invention is not to be considered as limited to such.

U.S. Pat. No. Re. 26,433 is expressly incorporated herein by reference for its disclosure of useful reactive metal compounds as, and processes for, utilizing these compounds in the formation of salts. Again, in applying the teachings of this patent to the present invention, it is only necessary to substitute the functionalized polymer of this invention on an equivalent weight basis for the high molecular weight carboxylic acylating agents disclosed in this reissue patent.

U.S. Pat. No. 3,271,310 discloses the preparation of metal salt of high molecular weight carboxylic acid material, in particular alkenyl succinic acids which can be adopted to make the present functionalized polymer. The metal salts disclosed therein are acid salts, neutral salts, and basic salts. Among the illustrative reactive metal compounds used to prepare the acidic, neutral and basic salts of the acid functionalized polymer are those disclosed in U.S. Pat. No. 3,271,310 including lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide, and nickel carbonate. The present invention is not to be considered as limited to the use of the above metal compounds; they are presented merely to illustrate the metal compounds included within the invention.

U.S. Pat. No. 3,271,310 is expressly incorporated herein by reference for its disclosure of suitable reactive metal compounds suitable for forming salts of the functionalized polymer of this invention as well as illustrative processes for preparing salts of these reagents. As will be apparent, the processes of U.S. Pat. No. 3,271,310 are applicable to this invention merely by substituting on an equivalent weight basis, the functionalized polymer of this invention for the high molecular weight carboxylic acids of the patent.

From the foregoing description, it is apparent that the appropriate functionalized reactive polymer of this invention can be reacted with any individual amine, alcohol, reactive metal, reactive metal compound or any combination of two or more of any of these; that is, for example, one or more amines, one or more alcohols, one or more reactive metals or reactive metal compounds, or a mixture of any of these. The mixture can be a mixture of two or more amines, a mixture of two or more alcohols, a mixture of two or more metals or reactive metal compounds, or a mixture of two or more components selected from amines and alcohols, from amines and reactive metals or reactive metal compounds, from alcohols and reactive metal compounds, or one or more components from each of the amines, alcohols, and reactive metals or reactive metal compounds. Furthermore, the appropriate functionalized polymer of this invention can be reacted with the amines, alcohols, reactive metals, reactive metal compounds, or mixtures thereof, as described above, simultaneously (concurrently) or sequentially in any order of reaction.

Canadian Patent No. 956,397 is expressly incorporated herein by reference for its disclosure of procedures which can be used for reacting the functionalized polymer of this invention with amines, alcohols, reactive metals and reactive metal compounds, or mixtures of these, sequentially and simultaneously. All that is required to apply the processes of that patent to this invention is to substitute, on an equivalent weight basis, the functionalized polymer of this invention for the high molecular weight carboxylic acid. Carboxylic acid derivatives of this invention prepared utilizing the processes disclosed in the Canadian patent constitute a preferred class of carboxylic acids or carboxylic acid derivative compositions. The following U.S. Patents are also incorporated herein by reference, being counterparts of the incorporated Canadian patent, for the same reasons given for incorporating the Canadian patent: U.S. Pat. Nos. 3,836,469; 3,836,470; 3,836,471; 3,838,050; 3,838,052; 3,879,308; 3,957,854 and 3,957,855.

Post Treatment

Another aspect of this invention involves the post treatment of derivatized polymers. The processes for post-treating the functionalized or derivatized polymers useful as dispersant materials are analogous to the post-treating processes used with respect to conventional dispersants and multi-functional viscosity index improvers useful as dispersants of the prior art. Accordingly, the same reaction conditions, ratio of reactants and the like can be used. Reference is made to U.S. Pat. No. 5,017,199.

Derivatized polymers can be post-treated with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Pat. Nos. 3,036,003; 3,200,107; 3,254,025; 3,278,550; 3,281,428; 3,282,955; 3,366,569; 3,373,111; 3,442,808; 3,455,832; 3,493,520; 3,513,093; 3,539,633; 3,579,450; 3,600,372; 3,639,242; 3,649,659; 3,703,536 and 3,708,522, which are herein incorporated by reference.

The amine derivatized polymers of the present invention as described above can be post-treated, particularly for use as dispersants and viscosity index improvers by contacting said polymers with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols, and $C_1$ to $C_{30}$ hydrocarbyl substituted succinic acids and anhydrides (e.g., succinic anhydride, dodecyl succinic anhydride and the like), fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, and the like.

For example, the amine derivatized polymers can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Borated derivatized polymers useful as dispersants can contain from about 0.05 to 2.0 wt. %, e.g. 0.05 to 0.7 wt. % boron based on the total weight of said borated nitrogen-containing dispersant compound. The boron, which appears to be in the product as dehydrated boric acid polymers (primarily $(HBO_2)_3$), is believed to attach to the derivatized polymer as amine salts, e.g., the metaborate salt of said amine derivatized polymer.

Treating is readily carried out by adding from about 0.05 to 4, e.g. 1 to 3 wt. % (based on the weight of said nitrogen compound) of said boron compound, preferably boric acid which is most usually added as a slurry to said nitrogen compound and heating with stirring at from about 135° C. to 190° C., e.g. 140° C. to 170° C., for from 1 to 5 hours followed by nitrogen stripping at said temperature ranges.

Since post-treating processes involving the use of these post-treating reagents is known insofar as application to high molecular weight nitrogen-containing dispersants of the prior art, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 2,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704; 3,551,466; 3,415,750; 3,312,619; 3,280,034; 3,718,663; 3,652,616; UK Patent No. 1,085,903; UK Patent No. 1,162,436; U.S. Pat. No. 3,558,743.

The derivatized polymers of the present invention can also be treated with polymerizable lactones (such as epsilon-caprolactone) to form dispersant adducts having the moiety —$[C(O)(C_2)_zO]_mH$, wherein z is a number of from 4 to 8 (e.g., 5 to 7) and m has an average value of from about 0 to 100 (e.g., 0.2 to 20). The functionalized or derivatized polymers of this invention, particularly for use as a dispersant, can be post-treated with a $C_5$ to $C_9$ lactone, e.g., epsilon-caprolactone, by heating a mixture of the polymers and lactone in a reaction vessel in the absence of a solvent at a temperature of about 50° C. to about 200° C., more preferably from about 75° C. to about 180° C., and most preferably from about 90° C. to about 160° C., for a sufficient period of time to effect reaction. Optionally, a solvent for the lactone, dispersant material and/or the resulting adduct may be employed to control viscosity and/or the reaction rates.

In one preferred embodiment, the $C_5$ to $C_9$ lactone, e.g., epsilon-caprolactone, is reacted with a nitrogen containing polymer (i.e., dispersant) in a 1:1 mole ratio of lactone to dispersant material. In practice, the ratio of lactone to polymer may vary considerably as a means of controlling the length of the sequence of the lactone units in the adduct. For example, the mole ratio of the lactone to the dispersant material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 00, with a degree of polymerization on the order of from about 0.2 to about 50 being preferred, and from about 0.2 to about 20 being more preferred. For optimum dispersant performance the nitrogen containing polymer as a dispersant, sequences of from about 1 to about 5 lactone units in a row are preferred.

Catalysts useful in the promotion of the lactone-dispersant material reactions are selected from the group consisting of stannous octanoate, stannous hexanoate, tetrabutyl titanate, a variety of organic-based acid catalysts and amine catalysts, as described on page 266, and forward, in a book chapter authored by R. D. Lundberg and E. F. Cox, entitled "Kinetics and Mechanisms of polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Lubricating Compositions

The above discussions relate to a variety of materials including the polymer per se, the functionalized polymer, the derivatized polymer, and post-treated derivatized polymer.

The polymer per se has a variety of utilities depending on its molecular weight including synthetic base oil (for lower molecular weights), adhesive coatings for intermediate molecular weights, and as elastomeric compositions for high molecular weights, e.g. films, extrudates, composites, and the like.

The functionalized polymer, in addition to acting as intermediates for dispersant and in multifunctional viscosity improvers (MFVI) manufacture, can be used as molding release agents, molding agents, metal working lubricants, point thickeners, and the like.

The primary utility for all the above described materials, from polymer all the way through post-treated derivatized polymer is as an additive for oleaginous compositions. For ease of discussion the above-mentioned materials are collectively and individually referred to herein as "additives" when use in the context of an oleaginous composition containing such "additives".

Accordingly, the additives of the present invention can be used by incorporation and dissolution into an oleaginous material such as fuels and lubricating oils. When the additives of this invention are used in normally liquid petroleum fuels such as middle distillates boiling from about 65° C. to 430° C., including kerosene, diesel fuels, home heating fuel oil, jet fuels, etc., a concentration of the additives in the fuel in the range of typically from about 0.001 to about 0.5, and preferably 0.005 to about 0.15 wt. %, based on the total weight of the composition, will usually be employed. Useful compositions and additives are disclosed in U.S. Pat. No. 5,102,566, hereby incorporated by reference.

The additives of the present invention find their primary utility in lubricating oil compositions which employ a base oil in which the additives are dissolved or dispersed therein. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, etc.

The additives of the present invention, particularly those adapted for use as dispersants and viscosity modifiers, can be incorporated into a lubricating oil in any convenient way. Thus, they can be added directly to the oil by dispersing or dissolving the same in the oil at the desired level of concentrations of the additive. Such blending into the additional lube oil can occur at room temperature or elevated temperatures. Alternatively, the additives can be blended with a suitable oil-soluble solvent and base oil to form a concentrate, and then blending the concentrate with a lubricating oil basestock to obtain the final formulation. Such dispersant concentrates will typically contain (on an active ingredient (A.I.) basis) from about 10 to about 80 wt. %, typically about 20 to about 60 wt. %, and preferably from about 40 to about 50 wt. % additive, and typically from about 40 to 80 wt. %, preferably from about 40 to 60 wt. % base oil, i.e., hydrocarbon oil based on the concentrate weight. The lubricating oil basestock for the additive typically is adapted to perform a selected function by the incorporation of additional additives therein to form lubricating oil compositions (i.e., formulations).

Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, the additive of the present invention and formulations containing them would usually be employed in the form of a 40 to 50 wt. % concentrate, for example, in a lubricating oil fraction.

The additives of the present invention will be generally used in admixture with a lube oil basestock, comprising an oil of lubricating viscosity, including natural and synthetic lubricating oils and mixtures thereof. Useful oils are described in U.S. Pat. Nos. 5,017,299 and 5,084,197.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.) poly(hexenes), poly(1-octenes), poly(1-decense), etc. and mixtures thereof; alkylbenzenes (e.g., dodecyl-benzenes, tetradecylbenzenes, dinonylbenzenes, di-(2-ethylhexyl)-benzenes, etc.); polyphenyls (e.g., biphenyls, terphenyls, alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methylpoly isopropylene glycol ether having an average molecular weight of 1000, diphenyl ether of polyethylene glycol having a molecular weight of 500 to 1,000, diethyl ether of polypropylene glycol having a molecular weight of 1,000 to 1,500; and mono- and polycarboxylic esters thereof, for example, the acetic acid esters, mixed $C_3$ to $C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di (2-ethylhexyl) sebacate, di-n-hexyl fumarate, dioctyl sebacate, diisooctyl azelate, diisodecyl azelate, dioctyl phthalate didecyl phthalate, dieicosyl sebacate, the 2-ethylhexyl diester of linoleic acid dimer, and the complex ester formed by reacting 1 mole of sebacic acid with 2 moles of tetraethylene glycol and 2 moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tert-butylphenyl)silicate, hexa-(4-methyl-2-pentoxy) disiloxane, poly(methyl)siloxanes and poly (methyl-phenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Additional Formulation Components

As indicated above, the additives of the present invention may be mixed with other types of additives selected to perform at least one desired function. Typical of such functions are detergent/inhibitor, viscosity modification, wear inhibitor, oxidation inhibitor, corrosion inhibitor, friction modifier, foam inhibitor, rust inhibitor, demulsifier, lube oil flow improvers, and seal swell control. Each class of such additional additives is discussed in more detail below.

Detergent/Inhibitor

Metal-containing detergents which can also act as rust inhibitors are known as "detergent/inhibitors" simply "DI". DI's include the metal salts of sulphonic acids, alkyl phenols, sulphurized alkyl phenols, alkyl salicylates, naphthenates, and other oil soluble mono- and dicarboxylic acids as well as metal-containing complexes thereof. Usually these metal-containing DI's are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Metal detergent/inhibitors are generally basic (viz, overbased) alkali or alkaline earth metal salts (or mixtures thereof, e.g. mixtures of Ca and Mg salts) of one or more organic sulfonic acid (generally a petroleum sulfonic acid or a synthetically prepared alkaryl sulfonic acid), petroleum naphthenic acids, alkyl benzene sulfonic acids, alkyl phenols, alkylene-bis-phenols, oil soluble fatty acids and the like, such as are described in U.S. Pat. Nos. 2,501,731; 2,616,904; 2,616,905; 2,616,906; 2,616,911; 2,616,924; 2,616,925; 2,617,049; 2,777,874; 3,027,325; 3,256,186; 3,282,835; 3,384,585; 3,373,108; 3,305,308; 3,365,396; 3,342,733; 3,320,162; 3,312,618; 3,318,809 and 3,562,159 the disclosures of which are hereby incorporated by reference. Among the petroleum sulfonates, the most useful products are those prepared by the sulfonation of suitable petroleum fractions with subsequent removal of acid sludge and purification. Synthetic alkaryl sulfonic acids are usually prepared from alkylated benzenes such as the Friedel-Crafts reaction product of benzene and a polymer such as tetrapropylene, $C_{18}$ to $C_{24}$ hydrocarbon polymer, etc. Suitable acids may also be obtained by sulfonation of alkylated derivatives of such compounds as diphenylene oxide thianthrene, phenolthioxine, diphenylene sulfide, phenothiazine, diphenyl oxide, diphenyl sulfide, diphenylamine, cyclohexane, decahydro naphthalene and the like.

The terms "basic salt" and "overbased salt" are used to designate metal salts wherein the metal is present in stoichiometrically larger amounts than the acid radical.

As used in this discussion, the term "complex" refers to basic metal salts which contain metal in an amount in excess of that present in a neutral or normal metal salt. The "base number" of a complex is the number of milligrams of KOH to which one gram of the complex is equivalent as measured by titration.

The commonly employed methods for preparing the basic salts involve heating a mineral oil solution of the normal metal salt of the acid with a metal neutralizing agent. The use of a "promoter" in the neutralization step to aid the incorporation of a large excess of metal is known and is preferred for the preparation of such compositions.

Examples of compounds useful as the promoter include phenolic substances such as phenol, naphthol, alkyl phenols, thiophenol, sulfurized alkyl phenols, and condensation products of formaldehyde with a phenolic substance; alcohols such as methanol, 2-propanol, octanol, cellosolve, carbitol, ethylene glycol, stearyl alcohol and cyclohexanol; and amines such as aniline, phenylene diamine, phenothiazine, phenol betanaphthylamine and dodecylamine.

The alkali and alkaline earth metal compounds which may be used in neutralizing these acids to provide the metal salts include the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

An example, convenient process for the preparation of the metal-containing complexes employs an oil-soluble sulfonic acid, such as a synthetically prepared didodecylbenzene sulfonic acid, which is mixed with an excess of lime (e.g., 10 equivalents per equivalent of the acid) and a promoter such as methanol, heptylphenol, or mixture thereof, and a solvent such as mineral oil, at 50° C. to 150° C. and the process mass is then carbonated until a homogeneous mass is obtained. Complexes of sulfonic acids, carboxylic acids, and mixtures thereof are obtainable by processes such as are described in U.S. Pat. No. 3,312,618. Another example is the preparation of a magnesium sulfonate normal magnesium salt thereof, an excess of magnesium oxide, water, and preferably also an alcohol such as methanol.

The carboxylic acids useful for preparing sulfonate carboxylate complexes, and carboxylate complexes, i.e., those obtainable from processes such as the above wherein a mixture of sulfonic acid and carboxylic acid or a carboxylic acid alone is used in lieu of the sulfonic acid, are oil-soluble acids and include primarily fatty acids which have at least about 12 aliphatic carbon atoms and not more than about 24 aliphatic carbon atoms. Examples of these acids include: palmitic, stearic, myristic, oleic, linoleic, dodecanoic, behenic, etc. Cyclic carboxylic acids may also be employed. These include aromatic and cycloaliphatic acids. The aromatic acids are those containing a benzenoid structure (i.e., benzene, naphthalene, etc.) and an oil-solubilizing radical or radicals having a total of at least about 15 to 18 carbon atoms, preferably from about 15 to about 200 carbon atoms. Examples of the aromatic acids include: stearyl-benzoic acid, phenyl stearic acid, mono- or polywax-substituted benzoic or naphthoic acids wherein the wax group consists of at least about 18 carbon atoms, cetyl hydroxybenzoic acids, etc. The cycloaliphatic acids contemplated have at least about 12, usually up to about 30 carbon atoms. Examples of such acids are petroleum naphthenic acids, cetyl cyclohexane carboxylic acids, dilauryl decahydro naphthalene carboxylic acids, dioctyl cyclopentane carboxylic acids, etc. The thiocarboxylic acid analogs of the above acids, wherein one or both of the oxygen atoms of the carboxyl group are replaced by sulfur, are also contemplated.

The ratio of the sulfonic acid to the carboxylic acid in mixtures is typically at least 1:1 (on a chemical equivalent basis) and is usually less than 5:1, preferably from 1:1 to 2:1.

Usually, the basic composition obtained according to the above-described method is treated with carbon dioxide until its total base number (TBN) is less than about 50, as determined by ASTM procedure D-2896. In many instances, it is advantageous to form the basic product by adding a Ca or Mg base portionwise and carbonating after the addition of each portion. Products with very high metal ratios (10 or above) can be obtained by this method. As used herein, the term "metal ratio" refers to the ratio of total equivalents of alkaline earth metal in the sulfonate complex to equivalents of sulfonic acid anion therein. For example, a normal sulfonate has a metal ratio of 1.0 and a calcium sulfonate complex containing twice as much calcium as the normal salt has a metal ratio of 2.0. The overbased metal detergent compositions usually have metal ratios of at least about 1.1, for example, from about 1.1 to about 30, with metal ratios of from about 2 to 20 being preferred.

Neutral metal sulfonates are frequently used as rust inhibitors. Polyvalent metal alkyl salicylate, naphthenate and phenate materials are known additives for lubricating oil compositions to improve their high temperature performance and to counteract deposition of carbonaceous matter on pistons (U.S. Pat. No. 2,744,069). They can be milkylene or sulfur bridged.

The sulfurized metal phenates represent a preferred class of phenates, and can be considered the "metal salt of a phenol sulfide" which thus refers to a metal salt whether neutral or basic, of a compound typified by the general formula (30):

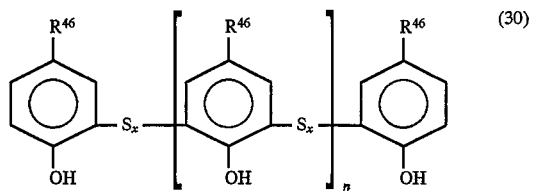

where x=1 or 2, n=0, 1 or 2; or a polymeric form of such a compound, where $R^{46}$ is an alkyl radical, n and x are each integers from 1 to 4, and the average number of carbon atoms in all of the $R^{46}$ groups is at least about 9 in order to ensure adequate solubility in oil. The individual $R^{46}$ groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14 wt. %, preferably about 4 to about 12 wt. % sulfur based on the weight of sulfurized alkyl phenol.

The sulfurized alkyl phenol may also be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate, has a metal content up to and greater than 100% in excess of the metal present in the corresponding normal sulfurized metal phenates wherein the excess metal is produced in oil-soluble or dispersible form (as by reaction with $CO_2$).

Magnesium and calcium containing detergents, although beneficial in other respects, can increase the tendency of the lubricating oil to oxidize. This is especially true of the highly basic sulphonates.

The magnesium and/or calcium is generally present as basic or neutral detergents such as the sulphonates and phenates.

Viscosity Modifiers

A viscosity index (V.I.) improver, also referred to as viscosity modifier, is typically employed in multi-grade automobile engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may include derivatized polymers recited above which include various properties or functions, including dispersancy properties. These oil soluble viscosity modifying polymers will generally have number average molecular weights of from $10^3$ to $10^6$ preferably $10^4$ to $10^6$, e.g., 20,000 to 250,000 as determined by gel permeation chromatography or osmometry.

Examples of suitable hydrocarbon polymers which can be used as viscosity improvers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example, by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g., see U.S. Pat. Nos. 4,089,794; 4,160,739 and 4,137,185; or copolymers of ethylene and propylene reacted or grafted with nitrogen compounds such as shown in U.S. Pat. Nos. 4,068,056; 4,068,058; 4,146,489 and 4,149,984.

Useful hydrocarbon polymers include ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alphaolefins. While not essential, such copolymers preferably have a degree of crystallinity of less than 25 wt. %, as determined by X-ray and differential scanning calorimetry. Copolymers of ethylene and propylene or ethylene and butene are most preferred. Other alphaolefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

Terpolymers, tetrapolymers, etc., of ethylene, said $C_3$ to $C_{28}$ alpha-olefin, and a non-conjugated diolefin or mixtures of such diolefins may also be used. The amount of the non-conjugated diolefin generally ranges from about 0.5 to 20 mole %, preferably from about 1 to about 7 mole %, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmirate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$ to $C_{20}$ aliphatic or aromatic olefin per mole of unsaturated ester, or per mole of unsaturated acid or anhydride followed by esterification. For example, copolymers or styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinylpyridine, 3-vinyl-pyridine, 3-methyl-5-vinyl-pyridine, 4-methyl-2-vinyl-pyridine, 4-ethyl-2-vinyl-pyridine and 2-butyl-1-5-vinyl-pyridine and the like. N-vinyl lactams are also suitable, e.g. N-vinyl pyrrolidones or N-vinyl piperidones. The vinyl pyrrolidones are preferred and are exemplified by N-vinyl pyrrolidone, N-(1-methylvinyl) pyrrolidone, N-vinyl-5-methyl pyrrolidone, N-vinyl-3, 3-dimethylpyrrolidone, N-vinyl-5-ethyl pyrrolidone, etc.

Such nitrogen- and ester-containing polymeric viscosity index improver dispersants are generally employed in concentrations of from about 0.05 to 10 wt. % in the fully formulated oil, and preferably from about 0.1 to 5 wt. %, and more preferably from about 0.5 to 3 wt. % can reduce (e.g., to about 0.5 wt. %) the amount of the ashless dispersant employed to provide the required dispersancy to the oil formulation.

Antiwear Agents

Antiwear agents, as their name implies, reduce wear of moving metallic parts. Representative of conventional antiwear agents which may be used include, for example, phosphorous compounds such as zinc dialkyl dithiophosphates, and the zinc diaryl dithiophosphates.

Suitable phosphates include dihydrocarbyl dithiophosphates, wherein the hydrocarbyl groups contain an average of at least 3 carbon atoms. Particularly useful are metal salts of at least one dihydrocarbyl dithiophosphoric acid wherein the hydrocarbyl groups contain an average of at least 3 carbon atoms. The acids from which the dihydrocarbyl dithiophosphates can be derived can be illustrated by acids of the formula:

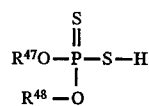

wherein $R^{47}$ and $R^{48}$ are the same or different and are alkyl, cycloalkyl, aralkyl, alkaryl or substituted substantially hydrocarbon radical derivatives of any of the above groups, and wherein the $R^{47}$ and $R^{48}$ groups in the acid each have, on average, at least 3 carbon atoms.

By "substantially hydrocarbon" is meant radicals containing substituent groups (e.g., 1 to 4 substituent groups per radical moiety) such as ether, ester, nitro or halogen which do not materially affect the hydrocarbon character of the radical.

Specific examples of suitable $R^{47}$ and $R^{48}$ radicals include isopropyl,isobutyl, n-butyl, sec-butyl, n-hexyl, heptyl, 2-ethylhexyl, diisobutyl, isooctyl, decyl, dodecyl, tetradecyl, hexadecyl, octadecyl, butylphenyl,o,p-depentylphenyl, octylphenyl, polyisobutene-(molecular weight 350)-substituted phenyl, tetrapropylene-substituted phenyl,beta-octylbutylnaphthyl, cyclopentyl, cyclohexyl, phenyl, chlorophenyl, o-dichlorophenyl, bromophenyl, naphthenyl, 2-methylcyclohexyl, benzyl, chlorobenzyl, chloropentyl, dichlorophenyl, nitrophenyl, dichlorodecyl and xenylradicals. Alkyl radicals having about 3 to 30 carbon atoms, and aryl radicals having about 6 to 30 carbon atoms, are preferred. Particularly preferred $R^{47}$ and $R^{48}$ radicals are alkyl of 4 to 18 carbons.

The phosphorodithioic acids are readily obtainable by the reaction of phosphorus pentasulfide and an alcohol or phenol. The reaction involves mixing, at a temperature of about 20° C. to 200° C., 4 moles of the alcohol or phenol with one mole of phosphorus pentasulfide. Hydrogen sulfide is liberated as the reaction takes place. Mixtures of alcohols, phenols or both can be employed, e.g., mixtures of $C_3$ to $C_{30}$ alkanols, $C_6$ to $C_{30}$ aromatic alcohols, etc.

The metals useful to make the phosphorous salts include Group I metals, Group II metals, aluminum, lead, tin, molybdenum, manganese, cobalt and nickel. Zinc is the preferred metal. Examples of metal compounds which may be reacted with the acid include lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin burylate, cobalt oxide, cobalt hydroxide, cobalt carbonate, cobalt pentylate, nickel oxide, nickel hydroxide and nickel carbonate.

In some instances, the incorporation of certain ingredients, particularly carboxylic acids or metal carboxylates such as small amounts of the metal acetate or acetic acid used in conjunction with the metal reactant will facilitate the reaction and result in an improved product. For example, the use of up to about 5% of zinc acetate in combination with the required amount of zinc oxide facilitates the formation of a zinc phosphorodithioate.

The preparation of metal phosphorodithioates is well known in the art and is described in a large number of issued patents, including U.S. Pat. Nos. 3,293,181; 3,397,145; 3,396,109 and 3,442,804, the disclosures of which are hereby incorporated by reference insofar as the preparation of metal salts of organic phosphorodithioic acids useful in this invention are described.

Also useful as antiwear additives are amine derivatives of dithiophosphoric acid compounds, such as are described in U.S. Pat. No. 3,637,499, the disclosure of which is hereby incorporated by reference in its entirety.

The zinc salts are most commonly used as antiwear additives in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved antiwear properties, and primary for thermal stability. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates are oil soluble salts of dihydrocarbyl esters of dithiophosphoric acids and may be represented by the following formula:

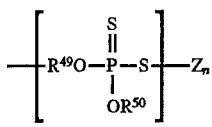

wherein $R^{49}$ and $R^{50}$ are described the same as $R^{47}$ and $R^{48}$ respectively.

Suitable antiwear agents also comprise the phosphorous- and sulfur-containing product mixtures described in U.S. application Ser. No. 210,831 filed on Jun. 24, 1988 by Ryer and Gutierrez and the continuation-in-part thereof: U.S. Ser. No. 370,315, filed Jun. 22, 1989, the disclosures thereof are incorporated herein by reference.

In a preferred embodiment of the phosphorous- and sulfur-containing product mixtures disclosed in said commonly assigned applications, the following three components, namely: (1) organic phosphite ester, (2) hydrocarbyl thioalkanol, and (3) heterodialkanol are reacted in admixture, preferably in simultaneous admixture. Preferred hydrocarbyl thioalkanol reactants include $C_8$ to $C_{18}$ thioethanols. Preferred heterodialkanols are thiodialkanols. Representative thiodialkanols include 2,2'-thiodiethanol; 3,3-'thiodipropanol; thio-bis ethoxy-ethanol; thiobisisopropoxyisopropanol; and mixtures thereof.

Oxidation Inhibitors

Oxidation inhibitors reduce the tendency of mineral oils to deteriorate in service, which deterioration can be evidenced by the products of oxidation such as sludge and varnish-like deposits on the metal surfaces and by viscosity growth.

Useful antioxidant materials include oil soluble phenolic compounds, oil soluble sulfurized organic compounds, oil soluble amine antioxidants, oil soluble organo boraxes, oil soluble organo phosphites, oil soluble organophosphates, oil soluble organo dithiophosphates and mixtures thereof. Preferably such antioxidants are metal-free (that is, free of metals which are capable of generating sulfated ash), and therefore are most preferably ashless (having a sulfated ash value of not greater than 1 wt. % SASH, as determined by ASTMD874).

Illustrative of oil soluble phenolic compounds are alkylated monophenols, alkylated hydroquinones, hydroxylated thiodiphenyl ethers, alkylidenebis phenols, benzyl compounds, acylaminophenols, and esters and amides of hindered phenol-substituted alkanoic acids.

Examples of Phenolic Antioxidants

1. Alkylated monophenols 2,6-di-tert-butyl-4-methylphenol; 2,6-di-tert-butylphenol; 2-tert-butyl-4,6 dimethylphenol; 2,6-di-tertbutyl-4-ethylphenol; 2,6- ditert-butyl-4-ethylphenol; 2,6-di-tert-butyl-4-n-butylphenol; 2,6-di-tertbutyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; o-tert-butylphenol.

2. Alkylated hydroquinones 2,6-di-tert-butyl-4-methoxyphenol; 2,5-di-tertbutyl-hydroquinone; 2,5-di-tert-amylhydroquinone; 2,6-di-phenyl-4-octadecyloxyphenol.

3. Hydroxylated thiodiphenyl ethers 2,2'-thiobis(6-tert-butyl-4-methyl-phenol); 2,2'-thiobis(4-octylphenol); 4,4'-thiobis(6-tert-butyl-3-methylphenol); 4,4'-thiobis (6-tert-butyl-2-methylphenol).

4. Alkylidenebisphenols 2,2'-methylenebis(6-tert-butyl-4-methylphenol ); 2,2'-methylenebis(6-tert-butyl-4-ethylphenol); 2,2'-methylenebis[4-methyl-6-(alpha-methylcyclohexyl)-phenol); 2,2'-methylenebis(4-methyl-6-cyclohexylphenol); 2,2'-methylenebis(6-nonyl-4-methylphenol); 2,2'-methylenebis(4,6-di-tert-butyl-phenol); 2,2'-methylidenebis(4,6-di-tert-butylphenol); 2,2'-ethylidenebis(6-tert-butyl-4-isobutylphenol); 2,2'-methylenebis[6-alphamethylbenzyl)-4-nonylphenol]; 2,2'-methylenebis[6-(alpha, alpha-dimethylbenzyl)-4-nonyl-phenol]; 4,4'-methylenebis(2,6-di-tert-butylphenol); 4,4'-methylenebis(6-tert-butyl-2-methylphenol); 1,1-bis-(5-tert-butyl-4-hydroxy-2-methylphenyl)butane; 2,6-di (3-tert-butyl-5-methyl-2-hydroxybenzyl)-4-methylphenol; 1,1,3-tris(5-tert-butyl-4-hydroxy-2-methylphenyl)-3-n-dodecylmercapobutane; ethylene glycol bis[3,3-bis(3'-tert-butyl-4'-hydroxylphenyl)butyrate]; di(3-tert-butyl-4-hydroxy-5-methylphenyl)dicyclopentadiene; di[2-(3'-tert-butyl-2'-hydroxy-5'-methylbenzyl)-6-tertbutyl-4-methylpheny]terephthalate.

5. Benzyl compounds 1,3,5-tris(3,5-di-tert-butyl-4-hydroxybenzyl)-2,4,6-trimethyl-benzene; di(3,5-di-tert-butyl-4-hydroxybenzyl)sulfide; 3,5-di-tert-butyl-4-hydroxybenzylmercaptoacetic acid isooctyl ester; bis (4-tert-butyl-3-hydroxy-2,6-dimethyl-benzyl) dithioterephthalate; 1,3,5-tris(3,5-di-tertbutyl-4-hydroxybenzyl)isocyanurate1,3,5-tris(4-tertbutyl-3-hydroxy-2,6-dimethylbenzyl)isocyanurate; 3,5-di-tert-butyl-4-hydroxybenzylphosphonic acid dioctadecyl ester 3,5-di-tert-butyl-4-hydroxybenzylphosphonic acid mono-ethyl ester calcium salt.

6. Acylaminophenols 4-hydroxylauric acid anilide; 4-hydroxystearic acid anilide; 2,4-bis-octylmercapto-6-(3,5-di-tert-butyl-4-hydroxyanilino)-s-triazine; N-(3, 5-di-tert-butyl-4-hydroxyphenyl)carbamic acid octyl ester.

7. Esters of beta-(3,5-di-tert-butyl-4-hydroxyphenyl) propionic acid with mono- or polyhydric alcohols, e.g. with methanol; octadecanol; 1,6-hexanediol; neopentyl glycol; thiodiethylene glycol; diethylene glycol; triethylene glycol; pentaerythritol; tris(hydroxy-ethyl) isocyanurate; and di(hydroxyethyl) oxalic acid diamide.

8. Esters of beta-(5-tert-butyl-4-hydroxy-3-methylphenyl)propionic acid with mono- or polyhydric alcohols, e.g. with methanol; octadecanol; 1,6-hexanediol; neopentyl glycol; thiodiethylene glycol; diethylene glycol; triethylene glycol; pentaerythritol; tris (hydroxyethyl)isocyanurate; and di(hydroyethyl)oxalic acid diamide.

9. Amides of beta -(3,5-di-tert-butyl-4-hydroxyphenyl) propionic acid, e.g., N,N'-di(3,5-di-tert-butyl-4-hydroxyphenyl-pro-prionyl)hexamethylenediamine; N,N'-di(3,5-di-tert-butyl-4-hydroxyphenylpropionyl) trimethylenediamine; N,N'-di-(3,5-di-tert-butyl-4-hydroxyphenylpropionyl)hydrazine.

Oil soluble sulfurized organic compounds include those represented by the formula:

$$R^{51}S_{x_4}R^{52}$$

wherein S represents sulfur, $x_4$ is a whole number having a value of from 1 to about 10, and $R^{51}$ and $R^{52}$ may be the same or different organic groups. The organic groups may be hydrocarbon groups or substituted hydrocarbon groups containing alkyl, aryl, aralkyl, alkaryl, alkanoate, thiazole, imidazole, phosphorothionate, beta-ketoalkyl groups, etc. The substantially hydrocarbon groups may contain other substituents such as halogen, amino, hydroxyl, mercapto, alkoxy, aryloxy, thio, nitro, sulfonic acid, carboxylic acid, carboxylic acid ester, etc.

Specific examples of types of sulfurized compositions which are useful oxidation inhibitors include aromatic, alkyl or alkenyl sulfides and polysulfides, sulfurized olefins, sulfurized carboxylic acid esters, sulfurized ester olefins, sulfurized oil, and mixtures thereof. The preparation of such oil-soluble sulfurized compositions is described in the art, and U.S. Pat. No. 4,612,129 is incorporated herein by reference in its entirety for its disclosure of such preparations; including the type and amount of reactants and catalysts (or promoters), temperatures and other process conditions, and product purification and recovery techniques (e.g., decoloring, filtering, and other solids and impurity removal steps). The sulfurized organic compounds may be aromatic and alkyl sulfides such as dibenzyl sulfide, dixylyl sulfide, dicetylsulfide, diparaffin wax sulfide and polysulfide, cracked wax oleum sulfides, etc.

Examples of dialkenyl sulfides are described in U.S. Pat. No. 2,446,072. Examples of sulfides of this type include 6,6'-dithiobis(5-methyl-4-nonene), 2-butenyl monosulfide- and disulfide, and 2-methyl-2-butenyl monosulfide and disulfide.

Representative sulfurized olefins include sulfurized olefins prepared by the reaction of an olefin (preferably containing 3 to 6 carbon atoms) or a lower molecular weight polyolefin derived therefrom, with a sulfur-containing compound such as sulfur, sulfur monochloride and/or sulfur dichloride, hydrogen sulfide, etc. Isobutene, propylene and their dimers, trimers and tetramers, and mixtures thereof are especially preferred olefinic compounds. Of these compounds, isobutylene and diisobutylene are particularly desirable because of their availability and the particularly high sulfur-containing compositions which can be prepared therefrom.

The sulfurized organic compounds may be sulfurized oils which may be prepared by treating natural or synthetic oils including mineral oils, lard oil, carboxylic acid esters derived from aliphatic alcohols and fatty acids or aliphatic carboxylic acids (e.g., myristyl oleate and oleyl oleate) sperm whale oil and synthetic sperm whale oil substitutes and synthetic unsaturated esters or glycerides.

The sulfurized fatty acid esters can be prepared by reacting sulfur, sulfur monochloride, and/or sulfur dichloride with an unsaturated fatty ester at elevated temperatures. Typical esters include $C_1$ to $C_{20}$ alkyl esters of $C_8$ to $C_{24}$ unsaturated fatty acids such as palmitoleic, oleic, ricinoleic, petroselic, vaccenic, linoleic, linolenic, oleostearic, licanic, etc. Sulfurized fatty acid esters prepared from mixed unsaturated fatty acid esters such as are obtained from animal fats and vegetable oils such as tall oil, linseed oil, olive oil, castor oil, peanut oil, rape oil, fish oil, sperm oil, etc. also are useful. Specific examples of the fatty esters which can be sulfurized include lauryl talate, methyl oleate, ethyl oleate, lauryl oleate, cetyl oleate, cetyl linoleate, lauryl ricinoleate, oleolinoleate, oleostearate, and alkyl glycerides.

Another class of organic sulfur-containing compounds includes sulfurized aliphatic esters of an olefinic monodicarboxylic acid. For example, aliphatic alcohols of from 1 to 30 carbon atoms can be used to esterify monocarboxylic acids such as acrylic acid, methacrylic acid, 2,4-pentadienic acid, etc. or fumaric acid, maleic acid, muconic acid, etc. Sulfurization of these esters is conducted with elemental sulfur, sulfur monochloride and/or sulfur dichloride.

Another class of sulfurized organic compounds include diester sulfides. Typical diesters include the butyl, amyl, hexyl, heptyl, octyl, nonyl, decyl, tridecyl, myristyl, pentadecyl, cetyl, heptadecyl, stearyl, lauryl, andeicosyl; diesters of thiodialkanoic acids such as propionic, butanoic, pentanoic and hexanoic acids. Of the diester sulfides, a specific example is dilauryl,3,3'-thiodipropionate.

Other suitable sulfurized organic compound antioxidants include those derived from a particular type of cyclic or bicyclic olefin which is a Diels-Alder adduct of at least one dienophile with at least one aliphatic conjugated diene. The sulfurized Diels-Alder adducts can be prepared by reacting various sulfurizing agents with the Diels-Alder adducts as described more fully below. Typically, the sulfurizing agent is sulfur.

The Diels-Alder adducts are a well-known, art-recognized class of compounds prepared by the diene synthesis of Diels-Alder reaction. A summary of the prior art relating to this class of compounds is found in the Russian monograph, "Dienovyi Sintes", Izdatelstwo Akademii Nauk SSSR, 1963 by A. S. Onischenko. (Translated into the English language by L. Mandel as A. S. Onischenko, "Diene Synthesis", N.Y., Daniel Davey and Co., Inc., 1964). This monograph and references cited therein are incorporated by reference into the present specification.

Still further, sulfurized organic compounds include at least one sulfurized terpene compound or a composition prepared by sulfurizing a mixture comprising at least one terpene and at least one other olefinic compound.

The term "terpene compound" as used in the specification and claims is intended to include the various isomeric terpene hydrocarbons having the empirical formula $C_{10}H_{16}$, such as contained in turpentine, pine oil and dipentenes, and the various synthetic and naturally occurring oxygen-containing derivatives. Mixtures of these various compounds generally will be utilized, especially when natural products such as pine oil and turpentine are used. Pine oil, for example, which is obtained by destructive distillation of waste pinewood with super-heated steam comprises a mixture of terpene derivatives such as alpha-terpineol, beta-terpineol, alpha-fenchol, camphor, borneol/isoborneol, fenchone, estragole, dihydro alpha-terpineol, anethole, and other monoterpene hydrocarbons. The specific ratios and amounts of the various components in a given pine oil will depend upon the particular source and the degree of purification. A group of pine oil-derived products are available commercially from Hercules Incorporated. The pine oil products generally known as terpene alcohols available from Hercules Incorporated are particularly useful in the preparation of this class of sulfurized products. Examples of such products include alpha-Terpineol containing about 95 to 97% of alpha-terpineol, a high purity tertiary terpene alcohol mixture typically containing 96.3% of tertiary alcohols; Terpineol 318 Prime which is a mixture of isomeric terpineols obtained by dehydration of terpene hydrate and contains about 60 to 65 wt. % of alpha-terpineol and 15 to 20% beta-terpineol, and 18 to 20% of other tertiary terpene alcohols. Other mixtures and grades of useful pine oil products also are available from Hercules under such designations as Yarmor 302, Herco pine oil, Yarmor 302W, Yarmor F and Yamor 60.

The above terpene compounds may be sulfurized terpene compounds, sulfurized mixtures of terpene compounds or mixtures of at least one terpene compound and at least one sulfurized terpene compound. Sulfurized terpene compounds can be prepared by sulfurizing terpene compounds with sulfur, sulfur halides, or mixtures of sulfur dioxide with hydrogen sulfide. Also, the sulfurization of various terpene compounds has been described in the prior art. For example, the sulfurization of pine oil is described in U.S. Pat. No. 2,012,446.

The other olefinic compound which may be combined with the terpene compound and sulfurized may be any of several olefinic compounds such as those described earlier.

The other olefin used in combination with the terpene also may be an unsaturated fatty acid, an unsaturated fatty acid ester, mixtures thereof, or mixtures thereof with the olefins described above. The term "fatty acid" as used herein refers to acids which may be obtained by hydrolysis of naturally occurring vegetable or animal fats or oils. These fatty acids usually contain from 16 to 20 carbon atoms and are mixtures of saturated and unsaturated fatty acids. The unsaturated fatty acids generally contained in the naturally occurring vegetable or animal fats and oils may contain one or more double bonds and such acids include palmitoleic acid, oleic acid, linoleic acid, linolenic acid, and erucic acid. The unsaturated fatty acids may comprise mixtures of acids such as those obtained from naturally occurring animal and vegetable oils such as lard oil, tall oil, peanut oil, soybean oil, cottonseed oil, sunflower seed oil, or wheat germ oil. Tall oil is a mixture of rosin acids, mainly abietic acid, and unsaturated fatty acids, mainly oleic and linoleic acids. Tall oil is a by-product of the sulfate process for the manufacture of wood pulp.

The most particularly preferred unsaturated fatty acid esters are the fatty oils, that is, naturally occurring esters of glycerol with the fatty acids described above, and synthetic esters of similar structure. Examples of naturally occurring fats and oils containing unsaturation include animal fats such as Neat's foot oil, lard oil, depot fat, beef tallow, etc. Examples of naturally occurring vegetable oils include cottonseed oil, corn oil, poppyseed oil, safflower oil, sesame oil, soybean oil, sunflower seed oil and wheat germ oil.

The fatty acid esters which are useful also may be prepared from aliphatic olefinic acids of the type described above such as oleic acid, linoleic acid, linolenic acid, and behenic acid by reaction with alcohols and polyols. Examples of aliphatic alcohols which may be reacted with the above-identified acids include monohydric alcohols such as methanol, ethanol, n-propanol, isopropanol, the butanols, etc.; and polyhydric alcohols including ethylene glycol, propylene glycol, trimethylene glycol, neopentyl glycol, glycerol, etc.

The sulfurized derivatives of the other olefin compounds can be prepared by methods known in the art utilizing sulfurizing reagents such as sulfur, sulfur halides or mixtures of sulfur or sulfur dioxide with hydrogen sulfide.

Exemplary of amine antioxidants are phenyl-substituted and phenylene-substituted amines, N-nitro phenylhydroxylamine, isoindoline compounds, phosphinodithioic acid-vinyl carboxylate adducts, phosphorodithioate ester-aldehyde reaction products, phosphorodithioate-alkylene oxide reaction products, silyl esters of terephthalic acid, bis-1,3-alkylamino-2-propanol, anthranilamide compounds, anthranilic acid esters, alpha-methyl styrenated aromatic amines, aromatic amines and substituted benzophenones, aminoguanidines, peroxide-treated phenothiazine, N-substituted phenothiazines and triazines, 3-tertiary alkyl-substituted phenothiazines, alkylated diphenyl-amines, 4-alkylphenyl-1-alkyl-2-naphthylamines, di-benzazepine compounds, fluorinated aromatic amines, alkylated polyhydroxy benzenoid compounds, substituted indans, dimethyl octadecylphosphonate-arylimino di-alkanol copolymers and substituted benzo-diazoborole.

Examples of Amine Antioxidants

N,N'-diisopropyl-p-phenylenediamine; N,N'-di-sec-butyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N,N'-diphenyl-p-phenylenediamine; N,N'-di-(naphthyl-2)-p-phenylenediamine; N-isopropyl-N'-phenyl-p-phenylenediamine; N-(1,3-dimethylbutyl)-N'-phenyl-n-phenylenediamine; N-(1-methylheptyl)-N'-phenyl-p-phenylenediamine; N-cyclohexyl-N'-phenyl-p-phenylenediamine; 4-(p-toluenesulfonamido) diphenylamine; N,N'-dimethyl-N,N'-di-sec-butyl-p-phenylenediamine diphenylamine; 4-isopropoxydiphenylamine; N-phenyl-1-naphthylamine; N-phenyl-2-naphthylamine; octylated diphenylamine; 4-n-butylaminophenol; 4-butyrylaminophenol; 4-nonanoylaminophenol; 4-dodecanoylaminophenol; 4-octadecanoylaminophenol; di-(4-methoxyphenyl)amine; di-tert-butyl-4-dimethylaminomethylphenol; 2,4'-diaminodiphenylmethane; 4,4'-diaminophenylmethane; N,N,N',N'-tetramethyl-4,4'-diaminodiphenylmethane; 1,2-di [(2-methylphenyl)amino]ethane; 1,2-di(phenylamino)-propane; (o-tolyl)biguanide; di[4-(1',3'-dimethylbutyl) phenyl]amine; tert-octylated N-phenyl-1-napthylamino; and mixture of mono- and dialkylated tert-butyl-tert-octyldiphenylamines.

Oil soluble organo-borate, phosphate and phosphite antioxidants include alkyl- and aryl- (and mixed alkyl, aryl) substituted borates, alkyl- and aryl- (and mixed alkyl, aryl) substituted phosphates, alkyl- and aryl- (and mixed alkyl, aryl) substituted phosphites, and alkyl- and aryl- (and mixed alkyl, aryl) substituted dithiophosphates such as O,O,S-trialkyl dithiophosphates, O,O,S-triaryldithiopnosphates and dithiophosphates having mixed substitution by alkyl andaryl groups, phosphorothionyl sulfide, phosphorus-containing silane, polyphenylene sulfide, amine salts of phosphinic acid and quinone phosphates.

A preferred class of anti-oxidants includes the sulfurized alkyl-substituted hydroxyaromatic compounds. Sulfurized alkyl-substituted hydroxyaromatic compounds and the methods of preparing them are known in the art and are disclosed, for example, in the following U.S. Patents (which are incorporated by reference herein): U.S. Pat. Nos. 2,139, 766; 2,198,828; 2,230,542; 2,836,565; 3,285,854; 3,538, 166; 3,844,956; 3,951,830 and 4,115,287.

In general, the sulfurized alkyl-substituted hydroxyaromatic compounds may be prepared by reacting an alkyl-substituted hydroxyaromatic compound with a sulfurizing agent such as elemental sulfur, a sulfur halide (e.g., sulfur-monochloride or sulfur dichloride), a mixture of hydrogen sulfide and sulfur dioxide, or the like. The preferred sulfurizing agents are sulfur and the sulfur halides, and especially the sulfur chlorides, with sulfur dichloride ($SCl_2$)being especially preferred.

The alkyl-substituted hydroxyaromatic compounds which are sulfurized to produce antioxidant are generally compounds containing at least one hydroxy group (e.g., from 1 to 3 hydroxy groups) and at least one alkyl radical (e.g., from 1 to 3 alkyl radicals) attached to the same aromatic ring. The alkyl radical ordinarily contains about 3 to 100, and preferably about 6 to 20, carbon atoms. The alkyl-substituted hydroxy aromatic compound may contain more than one hydroxy group as exemplified by alkyl resorcinols, hydroquinones and catechols, or it may contain more than one alkyl radical; but normally it contains only one of each. Compounds in which the alkyl and hydroxy groups are ortho, meta and pard to each other, and mixtures of such compounds, are within the scope of the invention. Illustrative alkyl-substituted hydroxyaromatic compounds are n-propylphenol, isopropylphenol, n-butylphenol, t-butylphenol, hexylphenol, heptylphenol, octylphenol, nonylphenol, n-dodecylphenol, (propenetetramer)-substituted phenol, octadecylphenol, eicosylphenol, polybutene (molecular weight about 1000)-substituted phenol, n-dodecylresorcinol and 2,4-di-t-butylphenol, and the alkyl-substituted catechols corresponding to the foregoing. Also included are methylene-bridged alkyl-substituted hydroxyaromatic compounds of the type which may be prepared by the reaction of an alkyl-substituted hydroxyaromatic compound with formaldehyde or a formaldehyde-yielding reagent such as trioxane or paraformaldehyde.

The sulfurized alkyl-substituted hydroxy-aromatic compound is typically prepared by reacting the alkyl-substituted hydroxyaromatic compound with the sulfurizing agent at a temperature within the range of about 100° C. to 250° C. The reaction may take place in a substantially inert diluent such as toluene, xylene, petroleum naphtha, mineral oil, Cellosolve or the like. If the sulfurizing agent is a sulfur halide, and especially if no diluent is used, it is frequently preferred to remove acidic materials such as hydrogen halides by vacuum stripping the reaction mixture or blowing it with an inert gas such as nitrogen. If the sulfurizing agent is sulfur, it is frequently advantageous to blow the sulfurized product with an inert gas such as nitrogen or air so as to remove sulfur oxides and the like.

Also useful herein are antioxidants disclosed in the following U.S. Patents, the disclosures of which are herein incorporated by reference in their entirety: U.S. Pat. Nos. 3,451,166; 3,458,495; 3,470,099; 3,511,780; 3,687,848; 3,770,854; 3,850,822; 3,876,733; 3,929,654; 4,115,287; 4,136,041; 4,153,562; 4,367,152 and 4,737,301.

The most preferred antioxidants include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithiophosphates wherein copper may be substituted for zinc in the compounds and reactions described above although 1 mole of cuprous or cupric oxide may be reacted with 1 or 2 moles of the dithiophosphoric acid, respectively. Alternatively, the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_nCu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, burylphenyl, cyclohexyl, methylcyclopentyl, propenyl, butenyl, etc. In order to obtain oil solubility, the total number of carbon atoms (i.e., R and R') will generally be about 5 or greater. Copper sulphonates, phenates, and acetylacetonates may also be used.

Exemplary of useful copper compound anti-oxidants are copper ($Cu^I$ and/or $Cu^{II}$) salts of alkenyl carboxylic acids or anhydrides such as succinic acids or anhydrides. The salts themselves may be basic, neutral or acidic. They may be formed by reacting (a) any of the functionalized polymers which are useful as dispersants section, which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts are Cu salts of poly-n-butene succinic anhydride (hereinafter referred to as Cu-PNBSA) polyisobutenyl succinic anhydride (hereinafter referred to as Cu-PIBSA), and Cu salts of poly-n-butene or polyisobutenyl succinic acid. Preferably, the selected metal employed is its divalent form, e.g., Cu+2. The preferred substrates are polyalkenyl carboxylic acids in which the alkenyl group has a molecular weight greater than about 700. The alkenyl group desirably has a $\overline{M}n$ from about 900 to 1,500, and up to 5,000. These materials can be dissolved in a solvent, such as a mineral oil, and heated in the presence of a water solution (or slurry) of the metal bearing material. Heating may take place between 70° C. and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-PNB, Cu-oleate, or mixtures thereof) will be generally employed in an amount of from about 50 to 500 ppm by weight of the metal, in the final lubricating or fuel composition.

The copper antioxidants are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) ppm of added copper based on the weight of the lubricating oil composition. Of course, the preferred amount may depend, amongst other factors, on the quality of the basestock lubricating oil.

Corrosion Inhibitors

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of 65° C. to 315° C. Neutralization of the phosphosulfurized hydrocarbon may be effected in the manner taught in U.S. Pat. No. 2,969,324.

Other suitable corrosion inhibitors include copper corrosion inhibitors comprising hydrocarbyl-thio-distributed derivatives of 1,3,4-thiadiazole, e.g., $C_2$ to $C_{30}$; alkyl, aryl, cycloalkyl, aralkyl and alkaryl-mono-, di-, tri-, tetra- or thio-substituted derivatives thereof.

Representative examples of such materials included 2,5-bis(octylthio)-1,3,4-thiadiazole; 2,5-bis(octyl-dithio)-1,3,4-thiadiazole; 2,5-bis(octyltrithio)-1,3,4-thiadiazole; 2,5-bis (octyltetrithio)-1,3,4-thiadiazole; 2,5-bis(nonylthio)-1,3,4-thiadiazole; 2,5-bis(dodecyldithio)-1,3,4-thiadiazole; 2-dodecyldithio-5-phenyldithio-1,3,4-thiadiazole; 2,5-bis (cyclohexyl dithio)-1,3,4-thiadiazole; and mixtures thereof.

Preferred copper corrosion inhibitors are the derivative of -1,3,4-thiadiazoles such as those described in U.S. Pat. Nos. 2,719,125, 2,719,126 and 3,087,932; especially preferred is the compound 2,5-bis(t-octyldithio)-1,3,4-thiadiazole commercially available as Amoco 150, and 2,5-bis(t-nonyldithio)-1,3,4-thiadiazole, commercially available as Amoco 158.

The preparation of such materials is further described in U.S. Pat. Nos. 2,719,125, 2,719,126, 3,087,932 and 4,410, 436, the disclosures of which are hereby incorporated by reference.

Corrosion inhibitors also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as those described in U.S. Pat. Nos. 2,719,125; 2,719,126 and 3,087,932; especially preferred is the compound 2,5 bis(t-octadithio)-1,3,4-thiadiazole, commercially available as Amoco 150. Other similar materials also suitable are described in U.S. Pat. Nos. 3,821,236; 3,904,537; 4,097, 387; 4,107,059; 4,136,043; 4,188,299 and 4,193,882.

Other suitable corrosion inhibitors are the thio and polythio sulphenamides of thiadiazoles such as those described in U.K. Patent Specification 1,560,830. These compounds can be included in the lubricating composition in an amount from 0.01 to 10, preferably 0.1 to 5.0 wt. % based on the weight of the composition.

Friction Modifiers

Friction modifiers serve to impart the proper friction characteristics to lubricating oil compositions such as automatic transmission fluids. Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxy alkylene hydrocarbyl succinamic acid and mixtures thereof; U.S. Pat. No. 3,879,306 which discloses N-(hydroxyalkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. Preferred friction modifiers include hydroxy amines as disclosed in U.S. Pat. No. 5,078,893 and the thioether hydroxy amines as disclosed in U.S. Ser. No. 211,428 filed Jun. 24, 1988; glycerol mono and dioleates; and succinate esters, or metal salts thereof, of hydrocarbyl substituted succinic acids or anhydrides and thiobis alkanols such as described in U.S. Pat. No. 4,344,853; and amide friction modifiers such as the reaction product of isostearic acid tetraethylene pentamine as disclosed in U.S. Ser. No. 425,939 filed Oct. 24, 1989 all of which are herein incorporated by reference.

Anti-Foamants

Foam control can be provided by an antifoamant of the polysiloxane type, e.g. silicone oil and polydimethyl siloxane.

Rust Inhibitors

Organic, oil-soluble compounds useful as rust inhibitors comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in the oleaginous compositions, usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyols and derivatives thereof. This class of materials are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors.

In addition to the polyols per se, the esters thereof obtained by reacting the polyols with various carboxylic acids are also suitable. Acids useful in preparing these esters are lauric acid, stearic acid, succinic acid, and alkyl- or alkenyl-substituted succinic acids wherein the alkyl or alkenyl group contains up to about 20 carbon atoms.

The preferred polyols are prepared as block polymers. Thus, a hydroxy-substituted compound, R-(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Typically, the ethylene oxide units will comprise from about 10% to about 40%, and preferably from about 10% to about 15% by weight of the molecule. The number average molecular weight of the polyol is from about 2,500 to 4,500. The polyols having a molecular weight of about 4,000 with about 10% attributable to ethylene oxide units are particularly preferred.

Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased. If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Useful rust inhibitors also include alkoxylated fatty amines, amides, alcohols and the like, including such alkoxylated fatty acid derivatives treated with $C_9$ to $C_{16}$ alkyl-substituted phenols (such as the mono- and di-heptyl, octyl, nonyl, decyl, undecyl, dodecyl and tridecyl phenols), as described in U.S. Pat. No. 3,849,501, which is also hereby incorporated by reference in its entirety.

Demulsifiers

Suitable demulsifiers include the esters disclosed in U.S. Pat. Nos. 3,098,827 and 2,674,619, herein incorporated by reference.

Lube Oil Flow Improvers

Lubricating oil flow improvers (LOFI) include all those additives which modify the size, number, and growth of wax crystals in lube oils or fuels in such a way as to impart improved low temperature handling, pumpability, and/or vehicle operability as measured by such tests as pour point and mini rotary viscometry (MRV). The majority of flow improvers are polymers or contain polymers. These polymers are generally of two types, either backbone or sidechain.

The backbone variety, such as the ethylene-vinyl acetates (EVA), have various lengths of methylene segments randomly distributed in the backbone of the polymer, which associate or cocrystallize with the wax crystals inhibiting further crystal growth due to branches and non-crystallizable segments in the polymer.

The sidechain type polymers, which are the predominant variety used as LOFI's, have methylene segments as the sidechains, preferably as straight sidechains. The polymers work similarly to the backbone type except the sidechains have been found more effective in treating isoparaffins as well as n-paraffins found in lube oils. Representative of this type of polymer are $C_8$ to $C_{18}$ dialkylfumarate/vinyl acetate copolymers, polyacrylates, polymethacrylates, and esterified styrene-maleic anhydride copolymers.

Seal Swell Agents

Seal swellants include mineral oils of the type that provoke swelling of engine seals, including aliphatic alcohols of 8 to 13 carbon atoms such as tridecyl alcohol, with a preferred seal swellant being characterized as an oil-soluble, saturated, aliphatic or aromatic hydrocarbon ester of from 10 to 60 carbon atoms and 2 to 4 linkages, e.g., dihexyl phthalate, as are described in U.S. Pat. No. 3,974,081.

Some of the above additives can provide a multiplicity of effects e.g., a dispersant oxidation inhibitor. This approach is well known and need not be further elaborated herein.

Compositions, when containing these additives, typically are blended into the base oil in amounts which are effective to provide their normal attendant function. Representative effective amounts of such additives are illustrated as follows:

| Compositions | (Broad) Wt % | (Preferred) Wt % |
|---|---|---|
| V.I. Improver | 1–12 | 1–4 |
| Corrosion Inhibitor | 0.01–3 | 0.01–1.5 |
| Oxidation Inhibitor | 0.01–5 | 0.01–1.5 |
| Dispersant | 0.1–10 | 0.1–5 |
| Lube Oil Flow Improver | 0.01–2 | 0.01–1.5 |
| Detergents and Rust Inhibitors | 0.01–6 | 0.01–3 |
| Pour Point Depressant | 0.01–1.5 | 0.01–1.5 |
| Anti-Foaming Agents | 0.001–0.1 | 0.001–0.01 |
| Antiwear Agents | 0.001–5 | 0.001–1.5 |
| Seal Swellant | 0.1–8 | 0.1–4 |
| Friction Modifiers | 0.01–3 | 0.01–1.5 |
| Lubricating Base Oil | Balance | Balance |

When other additives are employed, it may be desirable, although not necessary, to prepare additive concentrates comprising concentrated solutions or dispersions of the subject additives of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the subject additives of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

The following examples illustrate the invention. The examples were conducted in a batch polymerization employing a cooled reactor dipped in an external cold bath.

EXAMPLES

Example 1 (Comparative)

In a three necked round bottom 250 ml flask, equipped with a magnetic stirrer, Teflon (PTFE) taps and rubber cap for the introduction of some of the reactants by a syringe, connected to a vacuum line, 0.73 g of 1-azido-1-methylethyl benzene were introduced followed by 100 ml of methylene dichloride. This solvent was previously dried by storage under vacuum after purification over phosphorous pentoxide. The reactor was pumped off and 12 ml of isobutylene, previously dried under calcium hydride, were condensed inside the flask. The reactor was then cooled down to $-50°$ C., and 11 ml of a one molar solution of diethylaluminum chloride in heptane were introduced by a syringe through a rubber cap. The system was allowed to stand for 50 minutes and quenching was carried out by the introduction of 10 ml of methanol. The mixture was then treated by 100 ml of heptane filtrated to eliminate catalyst residues and concentrated. Polyisobutylene polymer (PIB) was collected by precipitation in acetone, filtrated and dried under secondary vacuum to constant weight. The yield (7.2 g) was considered as complete and the polymer was analyzed by NMR and infrared spectroscopy and size exclusion chromatography (SEC). Using the peak at 2,100 $cm^{-1}$ on the infrared spectrum characteristic of the azide group, and by comparison with the peaks at 1,475, 1,390 and 1,365 $cm^{-1}$ characteristic of polyisobutylene and used as internal standard, and using the average number molecular weight (Mn=1600) determined by size exclusion chromatography which was calibrated with known samples, an azide group functionality was found equal to 0.9 allowing to conclude that there is nearly one azide group per macromolecule. The polydispersity ($\overline{Mn}/\overline{Mw}$) index was found equal to 1.5. Using the NMR spectrum, the aromatic nuclei content of the polymer was determined and was found to correspond to 1,500 g of polymer per mole of aromatic nucleus. This resulted in the calculation of an aromatic functionality of 1.07, supporting the conclusion that there was one aromatic nucleus per macromolecule within experimental accuracy. The monomer to initiator azido group ratio was 135/4.53=29.8 is the degree of polymerization. The calculated molecular weight of the PIB plus end groups was 1668+161=1829. The measured molecular weight was $\overline{Mn}$=1600. The initiator azido group to catalyst molar ratio was calculated to be —$N_3$:catalyst=1:2.43.

This example is provided for comparison with Examples 2–5. The initiator in Example 1 was 1-azido-methylethyl benzene while that in Examples 2–5 was bis(1-azido-1-methylethyl)benzene. Additionally, Comparative Example 1 was carried out in such conditions that the molar ratio of Lewis acid to azide group is equal to 2.43, that is to say lower than 3. It shows that the number average molecular weight is close to, but lower than the theoretical one which could be calculated from the M:I molar ratio (Mn cal=1829). The experimental molecular weight of 1,600 falls outside of the desired range. This example illustrates what is happening just above the upper limit of about 1:3 of the useful range for the ratio of pseudohalide group to Lewis acid, showing that the system begins to deviate from the apparently living behavior. Examples 2-5 below show the results when the molar ratio pseudohalide to Lewis acid group is within the desired range.

Example 2

In a three necked double walled reactor, equipped with a magnetic stirrer, Teflon taps and rubber cap for the introduction of some of the reactants by a syringe, connected to a vacuum line and cooled to −50° C., 2.2 mmole of bis(1-azido-1-methylethyl)benzene were introduced under nitrogen. The reactor was then pumped off and 100 ml of methylene dichloride were introduced by condensation, followed by 60 mmole of isobutylene (5.3 ml at −10° C.). When the temperature of the reaction medium was stabilized at −50° C., 18 mmole of diethylaluminum chloride were introduced as 18 ml of a molar solution of this Lewis acid in heptane. The system was allowed to stand at this temperature for 50 minutes. The reaction medium was then quenched using 5 ml of methanol. The mixture was then treated by 100 ml of heptane filtrated o eliminate catalyst residues and concentrated. Polyisobutylene polymer was collected by precipitation in acetone, filtrated and dried under secondary vacuum to constant weight. The yield was complete and the polymer was analyzed by NMR and infrared spectroscopy and size exclusion chromatography (SEC). Using the peak at 2100 cm$^{-1}$ on the infrared spectrum characteristic of the azide group, and by comparison with the peaks at 1,475, 1,390 and 1,365 cm$^{-1}$ characteristic of polyisobutylene and used as internal standard, and using the average number molecular weight (Mn=1650) determined by size exclusion chromatography which was calibrated with known samples, an azide group functionality was found equal to 2.0 allowing to conclude that there are 2 azide groups per macromolecule. The polydispersity index was found equal to 1.3. On the NMR spectrum, the aromatic nuclei content of the polymer was determined and was found to correspond to 1,500 g of polymer per mole of aromatic nucleus. This figure resulted in the calculation of an aromatic functionality of 1.09, supporting the conclusion that there was one aromatic nucleus per macromolecule within experimental accuracy. The monomer to initiator azido group ratio was 60:2.2 which corresponds to a degree of polymerization of 27.27. The calculated molecular weight was (27.27×56)+244=1,771. The measured molecular weight was 1,650. The initiator to catalyst ratio was 2.2:18= 1:8.18, and —N$_3$:cat was 1:4.09. The results support apparently living polymer having substantially no chain transfer reactions.

Example 3

Using the same technology as in the case of Example 2, 2.2 mmoles of bis(1-azido-1-methylethyl)-benzene were introduced followed by 90 mmole of isobutylene and 18 mmoles of diethylaluminum chloride. The yield was complete and the polymer was analyzed by NMR and infrared spectroscopy and size exclusion chromatography (SEC), as in the case of Example 2. Using the average number molecular weight (Mn=2350) determined by size exclusion chromatography, an azide group functionality was found equal to 2.07 allowing to conclude that there are approximately 2 azide groups per macromolecule. The polydispersity index was found equal to 1.3. By NMR spectroscopy, the aromatic nuclei content of the polymer was found to correspond to 2,200 g of polymer per mole of aromatic nucleus. This figure resulted in the calculation of an aromatic functionality of 1.08, supporting the conclusion that there was one aromatic nucleus per macromolecule within experimental accuracy. The monomer to initiator azido group ratio is 90:2.2 which corresponds to a degree of polymerization of 40.90. This calculated molecular weight was (40.90×56) +244=2,535. The measured molecular weight was 2,350. The initiator to catalyst ratio was 2.2:18= 1:8.18, and —N$_3$:cat was 1:4.09.

Example 4

Using the same technology as in the case of Example 2, 2.2 mmoles of bis(1-azido-1-methylethyl)benzene were introduced followed by 160 mmole of isobutylene and 18 mmoles of diethylaluminum chloride. The yield was complete and the polymer was analyzed by NMR and infrared spectroscopy and size exclusion chromatography (SEC), as in the case of Example 2. Using the average number molecular weight (Mn=4250) determined by size exclusion chromatography, an azide group functionality was found equal to 2.10 allowing to conclude that there was about 2 azide groups per macromolecule. A polydispersity index of 1.2 was found. The aromatic nuclei content of the polymer was found to correspond to 4,500 g of polymer per mole of aromatic nucleus. This figure resulted in the calculation of an aromatic functionality of 0.95, supporting the conclusion that there was one aromatic nucleus per macromolecule within experimental accuracy. The monomer to initiator azido group ratio is 160:2.2 which corresponds to a degree of polymerization of 72.73. The calculated molecular weight was 4,317. The measured molecular weight was 4,250. The initiator to catalyst ratio was 2.2:18=1:8.18, and —N$_3$:cat was 1:4.09.

Example 5

Using the same technology as in the case of Example 2, 2.2 mmoles of bis(1-azido-1-methylethyl)-benzene were introduced followed by 215 mmoles of isobutylene and 18 mmole of diethylaluminum chloride. The yield was complete and the polymer was analyzed by NMR and infrared spectroscopy and size exclusion chromatography (SEC), as in the case of Example 2. Using the average number molecular weight (Mn=5,,450) determined by size exclusion chromatography and the function content measured by infrared spectroscopy, an azide group functionality was found equal to 2.12 allowing to conclude that there was about 2 azide groups per macromolecule. The polydispersity index was 1.3. The aromatic nuclei content of the polymer was found to correspond to 5,900 g of polymer per mole of aromatic nucleus. This figure resulted in the calculation of an aromatic functionality of 0.94, supporting the conclusion that there was one aromatic nucleus per macromolecule within experimental accuracy. The monomer to initiator azido group ratio is 215:2.2 which corresponds to a degree of polymerization of 97.73. The calculated molecular weight is 5,717. The measured molecular weight was 5,450. The initiator to catalyst ratio was 2:2:18=8.1, and —N$_3$:cat was 1:4.09.

Example 6 (Comparative)

Using the same technology as in the case of Example 2, 1 mmoles of bis(1-azido-1-methylethyl)benzene (0.24 g) was introduced followed by 103 mmole of isobutylene (9.2 ml) and 6 mmole of titanium tetrachloride. The yield was nearly complete (90%), and the polymer was analyzed by NMR and infrared spectroscopy and size exclusion chromatography (SEC), as in the case of Example 2. Using the average number molecular weight (Mn=5,300) determined by size exclusion chromatography and the function content measured by infrared spectroscopy, an azide group functionality was found equal to 1.7 allowing to conclude that there are about 2 azide groups per macromolecule. The polydispersity index was 1.7. The aromatic nuclei content of the polymer was found to correspond to 5,600 g of polymer per mole of aromatic nucleus. This figure resulted in the calculation of an aromatic functionality of 0.95, supporting the conclusion that there was one aromatic nucleus per macromolecule within experimental accuracy. The monomer to initiator azido group ratio was 103:1 which corresponds to a degree of polymerization of 103. The calculated molecular weight was 6,012. The measured molecular weight was 5,300. The initiator to catalyst ratio was 1:6, and —$N_3$:cat was 1:3.

Example 7 (Comparative)

Using the same technology as in the case of Example 2, 4.3 mmole of bis(1-azido-1-methylethyl)benzene (1.05 g) were introduced followed by 103 mmole of isobutylene (9.2 ml) and 80 ml of methylene dichloride, so that the total volume of reaction medium was about 100 ml. Then 9.4 mmole of boron trichloride as a 9.3 ml of a one molar solution in methylene dichloride was introduced. The polymerization was carried out at −70° C. The yield was nearly complete (92%), and the polymer was analyzed by NMR and infrared spectroscopy and size exclusion chromatography (SEC), as in the case of Example 2. Using the average number molecular weight (Mn=2,100) determined by size exclusion chromatography, an azide group functionality was found equal to 2.1 allowing to conclude that there are about 2 azide groups per macromolecule. The polydispersity index was 1.8. The monomer to initiator azido group ratio was 103:4.3 which corresponds to a degree of polymerization of 23.95. The calculated molecular weight was 1,585. The measured molecular weight was 2,100. The initiator to catalyst ratio was 4:3:9.4, and —$N_3$:cat was 1:2.10.

This Comparative example shows that with a molar ratio of $BCl_3$ to azide group above 1:3, the system had a loss of living behavior. Possible side reactions induced by the strong Lewis acid include dehydroazidation of the initiator.

Example 8

A three necked round bottom 250 ml flask, equipped with a magnetic stirrer, Teflon taps and rubber cap for the introduction of some of the reactants by a syringe, was connected to a vacuum line. The reactor was then flushed with dry nitrogen and 47 mg of bis-1,4-(1-azido-1-methylethyl)benzene were introduced, followed by 90 ml of methylene dichloride. This solvent was previously dried by distillation over phosphorous pentoxide and stored under vacuum before use. The reactor was rapidly pumped off and 7.5 ml of isobutylene, previously dried under calcium hydride, were condensed inside the flask. The reactor was then cooled down to −50° C., and 1.5 ml of a one molar solution of diethylaluminum chloride in heptane were introduced by a syringe through a rubber cap. Thus, the isobutene concentration was 0.84 mole/l, the concentration of initiator was $1.9.10^{-3}$ mole/l and the diethylaluminum chloride was $1.5.10^{-2}$ mole/l. Accordingly, the molar ratio Lewis acid/azide group was 3.95. The system was allowed to stand for 50 mm before quenching by the introduction of 10 ml of methanol. The mixture was then treated with 100 ml of heptane and filtrated to eliminate catalyst residues and concentrated. The polymer was collected by precipitation in acetone, filtrated and dried under secondary vacuum to constant weight. The yield (4.7 g) was considered as complete and the polymer was analyzed by NMR and infrared spectroscopy and size exclusion chromatography (SEC). Using the peak at 2,100 $cm^{-1}$ on the infrared spectrum characteristic of the azide group, and by comparison with the peaks at 1,475, 1,390 and 1,365 $cm^{-1}$ characteristic of polyisobutylene and used as internal standards, and using the average number molecular weight (Mn=24,300) determined by size exclusion chromatography which was calibrated with known samples, an azide group functionality was found equal to 2.0 allowing to conclude that there is two azide groups per macromolecule. The polydispersity index was found to be 1.3. On the NMR spectrum, the aromatic nuclei content of the polymer was determined and was found to correspond to one aromatic nucleus per macromolecule within experimental accuracy. The theoretical molecular weight ($\overline{Mn}$ cal) was 25,001 which is close to the experimental one is a good indication that the system behaves as a living system. The monomer to initiator azido group ratio was 0.84:0.0019 which corresponds to a degree of polymerization of 442. The calculated molecular weight was 25,001 and the measured molecular weight was 24,300. The initiator to catalyst ratio was $1.9 \times 10^{-3}:1.5 \times 10^{-2} = 1:7.89$, and —$N_3$:cat was 1:3.95.

The results of the Examples 1–8 are summarized on Table 1, with "M" being moles of monomer, "I" moles of initiator, "Cat." moles of catalyst, "—$N_3$" moles of azide functional group, "$\overline{Mn}$ cal" calculated number average molecular weight, "$\overline{Mn}$ m" measured number average molecular weight, "D$\overline{Mn}$" the difference between "$\overline{Mn}$ cal" and "$\overline{Mn}$ m", and "MWD" molecular weight distribution also called polydispersity index. The calculated or theoretical molecular weight Mn cal was determined from the molar ratio of initial monomer concentration "Mo" to initial initiator concentration "Io" plus the molecular weight of initiator "I". ($\overline{Mn}$ cal=Mo/Io+I).

TABLE 1

| Ex. | M/I | I/CAT | —$N_3$/CAT | Mn cal | Mn m | DMn | % | MWD |
|---|---|---|---|---|---|---|---|---|
| 1* | 29.8 | 1/2.43 | 1/2.43 | 1829 | 1600 | 229 | 12.5 | 1.5 |
| 2 | 27.27 | 1/8.18 | 1/4.09 | 1771 | 1650 | 121 | 6.8 | 1.3 |
| 3 | 40.90 | 1/8.18 | 1/4.09 | 2535 | 2350 | 185 | 7.2 | 1.3 |
| 4 | 72.73 | 1/8.18 | 1/4.09 | 4317 | 4250 | 67 | 1.6 | 1.2 |
| 5 | 97.73 | 1/8.18 | 1/4.09 | 5717 | 5420 | 267 | 4.7 | 1.3 |
| 6* | 103.0 | 1/6 | 1/3 | 6012 | 5300 | 712 | 11.8 | 1.7 |
| 7* | 24.0 | 1/2.19 | 1/1.10 | 1585 | 2100 | 515 | 32.5 | 1.8 |
| 8 | 442 | 1/7.89 | 1/3.95 | 25001 | 24300 | 701 | 2.8 | 1.3 |

*Comparative Examples

Example 9

A three necked round bottom 250 ml flask, equipped with a magnetic stirrer and small graduated capillary tubes for the handling of small quantities of isobutylene, Teflon taps and rubber cap for the introduction of some of the reactants by a syringe, was connected to a vacuum line. The reactor was then flushed with dry nitrogen and 0.053 g of bis-1,4-(1-azido-1-methylethyl)benzene were introduced, followed by approximately 97 ml of methylene dichloride. This solvent was previously dried by distillation over phosphorous pentoxide and stored under vacuum before use. The reactor was rapidly pumped off and 1.0 ml of isobutylene, previously dried under calcium hydride, was condensed inside the flask. The reactor was then cooled down to −50° C., and 1.7 ml of a one molar solution of diethylaluminum chloride in heptane were introduced by a syringe through a rubber cap. Thus, the isobutene concentration was 0.11 mole/l, the concentration of initiator was $2.2.10^{-3}$ mole/l and the diethylaluminum chloride was $1.7.10^{-2}$ mole/l. Accordingly, the molar ratio Lewis acid/azide group was around 3.9. The system was allowed to stand for 50 minutes before the sampling of approximately 10 ml of the reaction medium. Quenching of the sample was carried out by the introduction of 1 ml of methanol. The resulting mixture was discarded for further analysis.

After sampling, a new charge of 0.32 ml isobutylene was added in the reactor kept at −50° C. The concentration of monomer units (previous polymer+new charge) was then 0.15 mole/l. The system was allowed to stand at −50° C. for a new period of 50 minutes and quenched. The sample was then treated by 10 ml of heptane filtrated to eliminate catalyst residues and concentrated. The final polymer, containing the polymer produced after the introduction of the second charge of monomer, was collected by precipitation in acetone, filtrated and dried under secondary vacuum to constant weight. The yield was considered as complete and the polymer was analysed by NMR and infrared spectroscopy and size exclusion chromatography (SEC).

The number average molecular weight (Mn) was 3,05Q for the initial sample, and Mn=4,062 for the final polymer, was determined by size exclusion chromatography which was calibrated with known samples. This was compared with the theoretical calculated molecular weight determined based on the molar monomer to diazide ratio (Mn=3,044 and 4,440) respectively for the sample and the main polymer). The subsequent polymerization agreement between the measured and calculated molecular weights shows living polymeric behavior. Using the peak at 2,100 cm$^{-1}$ on the infrared spectrum characteristic of the azide group, and by comparison with the peaks at 1,475, 1,390 and 1,365 cm$^{-1}$ characteristic of polyisobutylene and used as internal standard, an azide group functionality was found equal to 2.0 for both samples, indicating that there are two azide groups per macromolecule. The polydispersity index was found equal to 1.3 and 1.4 respectively for the initial sample and the final polymer. On the NMR spectrum, the aromatic nuclei content of the polymers was determined and was found to correspond to one aromatic nucleus per macromolecule within experimental accuracy. This incremental monomer addition technique was carried out within the useful range for the molar ratio of 3.9 of Lewis acid to pseudohalide group. This example demonstrates the apparently living character of the system since the addition of monomer resulted in continuing polymerization.

What is claimed is:

1. A method for the direct synthesis of polymeric materials functionalized with nitrogen-containing functional groups, comprising the steps of providing a cationically polymerizable monomer, and initiating living polymerization by the addition of a cationic polymerization catalyst, in the presence of a nitrogen-containing initiator compound having said nitrogen-containing functional group chemically bound to a release moiety, wherein the ratio of moles of catalyst to nitrogen-containing functional groups is greater than about 3.95:1 and wherein said nitrogen-containing functional group is at least one species selected from the group consisting of —NCO—, —OC≡N, —SC≡N, —CN and —NCS.

2. The method according to claim 1 wherein the ratio of moles said catalyst to nitrogen-containing functional groups is from about 4:1 to about 30:1.

3. The method according to claim 1 wherein said nitrogen-containing functional group is covalently bound to a tertiary or secondary carbon of said release moiety.

4. The method according to claim 1 wherein said release moiety is resonance stabilized.

5. The method according to claim 1 wherein said polymerizable monomer is selected from the group consisting of isobutene, styrene, and cationically polymerizable heterocyclic monomers.

6. The method according to claim 1 wherein said polymerization takes place at a temperature below about −20° C.

7. The method according to claim 1 wherein said equivalent ratio of catalyst to nitrogen-containing initiator compound is about 4:1 to about 10:1.

8. A polymer composition having the formula:

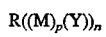

wherein

R is selected from at least one group consisting of H, a hydrocarbyl group, and a hydrocarbyl-substituted group;

Y is selected from at least one group consisting of an azido, cyano, carbonylamino, thiocarbonylamino, cyanato, and thiocyanato;

M is at least one repeat unit derived from a cationically polymerizable monomer;

p is an integer greater than one; and n is an integer of at least one wherein said polymer composition has a molecular weight distribution, Mw/Mn of less than 1.5.

9. The polymer composition according to claim 8 wherein R comprises a hydrocarbyl substituted silyl group of the formula:

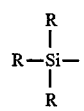

10. The polymer composition according to claim 8 wherein R is selected from the group consisting of: alkyl of from 3 to 100 carbon atoms, aryl of from 6 to 20 carbon atoms, alkaryl and aralkyl of from 7 to 100 carbon atoms, and cycloaliphatic of from 3 to 20 carbon atoms.

11. The polymer composition according to claim 8 wherein R has the formula:

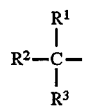

wherein $R^1$, $R^2$ and $R^3$ are the same or different and are H or hydrocarbyl selected from the group consisting of alkyl, aryl, alkaryl, aralkyl, heterocyclic or cycloalkyl with the proviso that at least two of $R^1$, $R^2$ and $R^3$ are hydrocarbyl.

12. The polymer composition according to claim 8, 9 or 10 wherein R is selected from the group consisting of $\phi CH_2-$, $CH_3\phi CH_2-$ $C_2H_5\phi-$, $CH_3\phi-$, $(CH_3)_2\phi-$.

13. The polymer composition according to claim 8 wherein the cationically polymerizable monomer is selected from the group consisting of straight and branched chain alpha olefins, isoolefins, alicyclic monoolefins, cycloaliphatic compounds, styrene derivatives, indene and derivatives thereof.

14. The polymer composition according to claim 13 wherein the cationically polymerizable monomer is selected from the group consisting of isoolefins of from 4 to 20 carbon atoms and mixtures thereof.

15. The polymer composition according to claim 13 wherein the cationically polymerizable monomer is selected from the group consisting of oxazolines.

16. The polymer composition according to claim 13 wherein n is from 1 to 10.

17. The polymer composition according to claim 8 wherein p is from 1 to 1,000,000.

18. The polymer composition according to claim 17 wherein p is from 25 to 10,000.

19. The polymer composition according to claim 8 having a number average molecular weight of from 350 to 15,000,000.

20. Polymeric material or polymer composition of claims 1 or 8 wherein the nitrogen containing functional group is further reacted to form a reactant functional group selected from carboxyl groups, cyanate groups, amine groups, hydroxyl groups, triazole groups, nitrile groups, nitrene groups and dimerized nitrene groups.

* * * * *